United States Patent
Nobumoto et al.

(10) Patent No.: US 7,524,266 B2
(45) Date of Patent: Apr. 28, 2009

(54) ENGINE STARTING SYSTEM FOR POWER TRAIN

(75) Inventors: Hidetoshi Nobumoto, Fuchu-cho (JP);
Taizou Shoya, Fuchu-cho (JP);
Takayuki Ueda, Fuchu-cho (JP);
Kiyotaka Mamiya, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 398 days.

(21) Appl. No.: 11/521,428

(22) Filed: Sep. 15, 2006

(65) Prior Publication Data
US 2007/0078040 A1 Apr. 5, 2007

(30) Foreign Application Priority Data
Sep. 30, 2005 (JP) .............................. 2005-289257
Sep. 30, 2005 (JP) .............................. 2005-289316

(51) Int. Cl.
*B60W 10/04* (2006.01)
(52) U.S. Cl. ........................................ 477/110; 477/107
(58) Field of Classification Search .................. 477/73, 477/77, 83, 107, 110
See application file for complete search history.

(56) References Cited

U.S. PATENT DOCUMENTS

| | | | | |
|---|---|---|---|---|
| 6,453,865 B2 * | 9/2002 | Hirose et al. | ............ | 123/179.4 |
| 6,702,718 B2 * | 3/2004 | Tani et al. | ............ | 477/203 |
| 6,722,332 B2 * | 4/2004 | Kojima | ............ | 123/179.3 |
| 6,793,059 B2 * | 9/2004 | Okada et al. | ............ | 192/84.1 |
| 2005/0211479 A1 | 9/2005 | Tamor | | |

FOREIGN PATENT DOCUMENTS

| | | | |
|---|---|---|---|
| EP | 1 227 230 A2 | | 7/2002 |
| EP | 1 403 512 A1 | | 3/2004 |
| EP | 1 600 629 A2 | | 11/2005 |
| EP | 1 707 803 A2 | | 10/2006 |
| JP | 11-351371 | | 12/1999 |
| JP | 2007100762 A | * | 4/2007 |

OTHER PUBLICATIONS

European Search Report Application No. EP 06 01 9713 dated Jan. 12, 2006.

* cited by examiner

*Primary Examiner*—Ha D. Ho
(74) *Attorney, Agent, or Firm*—Studebaker & Brackett PC; Donald R. Studebaker

(57) ABSTRACT

An engine starting system for a power train including an engine and an automatic transmission includes an engine stop/restart controller. The automatic transmission having special mode includes first and second planetary gear sets having respective sun gears, a turbine shaft, an output gear, a forward clutch and a 2-4 brake. The forward clutch sets the automatic transmission in a drive condition when engaged and in a neutral condition when disengaged. If the special mode is selected under conditions where the output gear is locked, the sun gear of the first planetary gear set is locked. During execution of automatic engine stop control operation, the engine stop/restart controller causes the automatic transmission to initiate a transfer to the special mode before fuel supply is interrupted and causes the forward clutch to completely engage at a specific point in time after the automatic transmission has completed the transfer to the special mode.

13 Claims, 27 Drawing Sheets

FIG. 4

| RANGE | GEAR POSITION | FORWARD CLUTCH (67) | REVERSE CLUTCH (68) | 3-4 CLUTCH (69) | 2-4 BRAKE (70) ENGAGEMENT | LOW REVERSE BRAKE (71) | ONE-WAY CLUTCH (72) |
|---|---|---|---|---|---|---|---|
| N | — | | | | | | |
| D | 1ST SPEED | ○ | | | | | ● |
|   | 2ND SPEED | ○ | | | ○ | | |
|   | 3RD SPEED | ○ | | ○ | | | |
|   | 4TH SPEED | | | ○ | ○ | | |
| SPECIAL MODE M | — | | | | ○ | | (●) |

COMPRESSION-STROKE CYLINDER

EXPANSION-STROKE CYLINDER

PISTON STOP POSITION
[ATDC° CA]

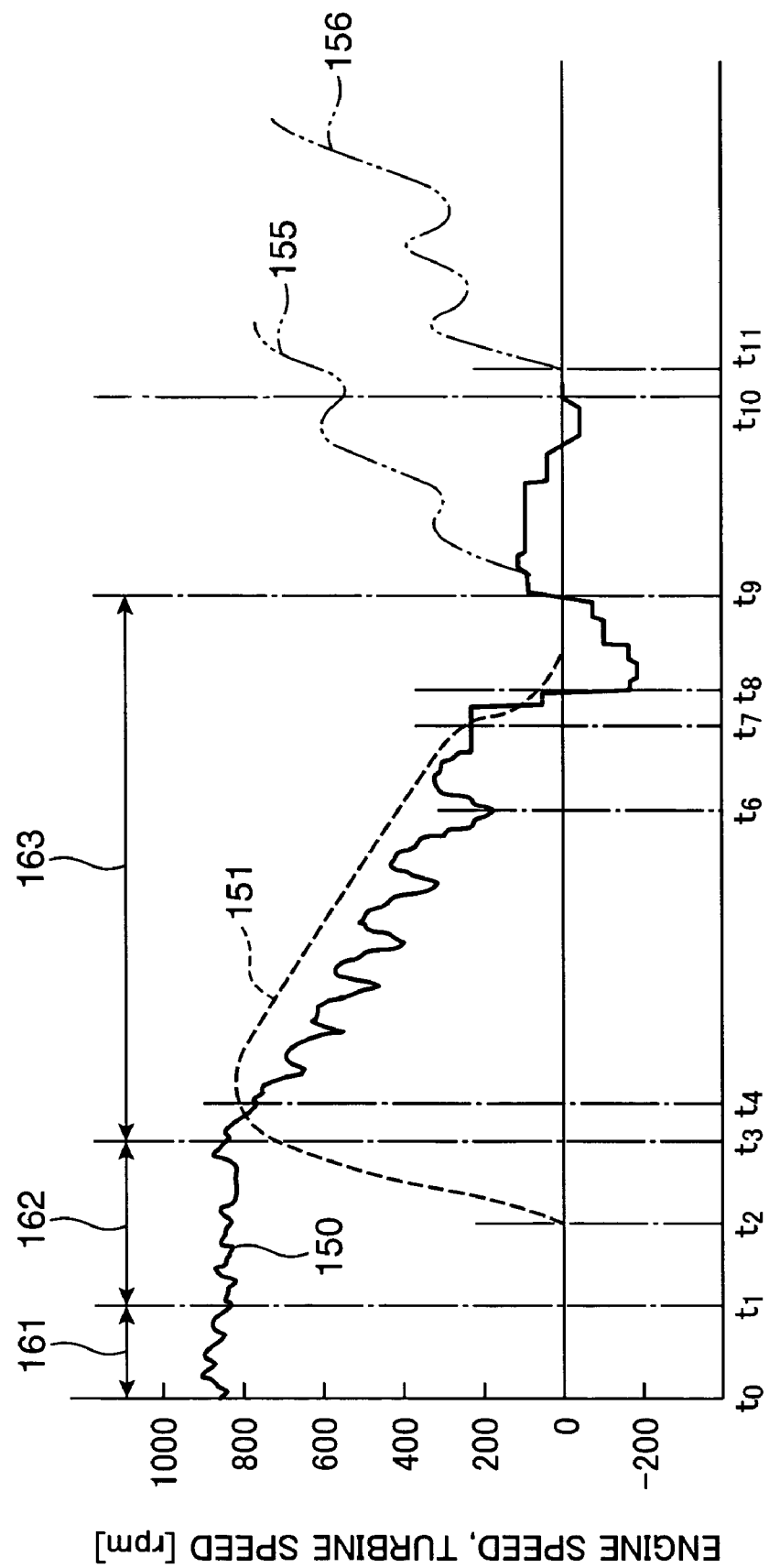

I: INTAKE STROKE
C: COMPRESSION STROKE
P: EXPANSION STROKE
H: EXHAUST STROKE

ENGINE STARTING SYSTEM FOR POWER TRAIN

BACKGROUND OF THE INVENTION

1. Field of the Invention

The present invention relates to an engine starting system for a power train which includes an engine and an automatic transmission for transmitting engine power while performing gear shifting operation in a prescribed manner, wherein the engine starting system is configured to automatically stop the engine when conditions for automatic engine stop are satisfied and to automatically restart the engine when conditions for engine restart are satisfied after automatic engine stop.

2. Description of the Related Art

Developments in recent years in automotive industry intended for reducing fuel consumption and carbon dioxide ($CO_2$) emissions provide an engine starting system which automatically stops the engine at idle and automatically restarts the engine when engine restart conditions are satisfied as a result of a driver's action taken after idle stop for starting a vehicle, for instance.

Generally, engine restart requires promptness to instantly restart the vehicle when the engine restart conditions are satisfied. Therefore, a conventional method of engine restart in which the engine is restarted by cranking an output shaft of the engine by means of a starter motor is not so preferable because the conventional engine restart method requires a good deal of time to complete an engine start sequence.

Thus, it is desirable to supply fuel into a particular cylinder which was on an expansion stroke at engine stop and cause ignition and combustion to occur in that cylinder so that the engine can be instantly started with resultant combustion energy. For the convenience of explanation to follow in this Specification, the cylinder which was on the expansion stroke at engine stop is hereinafter referred to as the "expansion stroke cylinder." Even if the fuel is supplied to and combusted in the expansion stroke cylinder, however, it will not always be possible to produce a sufficient torque for restarting the engine. For smooth engine restart, it is essential that the combustion in the cylinder produce a sufficient torque.

To ensure that the combustion in the expansion stroke cylinder produces a sufficient starting torque, a piston in the cylinder should preferably be located in an appropriate range at restarting. Generally, the appropriate range of stop position of the piston in the expansion stroke cylinder is a range at around 90 degrees after top dead center in terms of crank angle, that is, a range centered at a midpoint between the top dead center and bottom dead center or a range slightly offset therefrom. If the piston in the expansion stroke cylinder is stopped within this appropriate range at engine stop, air left in proper quantity in the cylinder and the fuel supplied thereinto would produce combustion in a desirable fashion, thus providing a sufficient torque for engine restart.

Aiming at a solution of the aforementioned problem, Japanese Unexamined Patent Publication No. 2004-124754 proposes an engine stop control technique for stopping a piston in a particular cylinder in an appropriate range. The technique described in this Publication is to regulate the amount of intake air during engine stop operation to provide a proper amount of in-cylinder air so that the piston in the cylinder can easily stop in the appropriate range. According to the Publication, an engine starting system employing this engine stop control technique can provide improved engine restartability as the piston in the particular cylinder can be controlled to stop in the appropriate range with high precision.

To perform the engine stop operation described in Japanese Unexamined Patent Publication No. 2004-124754 with yet higher precision, disturbances to a crankshaft of the engine should preferably be as low as possible during execution of the engine stop operation. One approach currently under study for reducing such disturbances is to disengage a starting clutch of an automatic transmission, or to shift the transmission from a drive condition to a neutral condition, when automatically stopping the engine.

The starting clutch disengagement approach however requires that the engine be instantly restarted and the automatic transmission be quickly shifted from the neutral condition back to the drive condition if there is made an engine restart request, such as depression of an accelerator pedal, when the automatic transmission is in the neutral condition during execution of the engine stop operation. To prevent a delay in this form of gear shifting operation, Japanese Unexamined Patent Publication No. 1999-351371 proposes an arrangement for setting a transmission in a precharged state during a process of automatic engine stop, the precharged state being a condition of the transmission in which a clutch is disengaged but a small amount of hydraulic pressure is supplied to the clutch to hold the same in a state immediately before engagement. This arrangement would make it possible to quickly engage the clutch in response to an engine restart request, such as depression of the accelerator pedal, thus ensuring quick restating and acceleration capabilities of the vehicle.

However, the aforementioned control operation (hereinafter referred to as precharge control operation) to maintain the automatic transmission in the neutral condition by precharging the clutch requires high-precision clutch engagement control. Holding the clutch in the precharged state is almost equal to, so to speak, keeping the clutch in balance at a boundary between engagement and disengagement. Keeping the clutch in such delicate balance is however not so easy in actuality, because engagement/disengagement operation of the clutch could be affected by variations in working fluid pressure and other factors. Additionally, if the clutch slightly deviates from an ideal precharged state to engagement side, the clutch will be brought into a loosely engaged state associated with slippage. Since the slippage would more or less lead to heat buildup in the clutch, the loosely engaged state may cause damage to the clutch. The precharge control operation of the aforementioned Publication requires high-precision clutch engagement control and poses a problem affecting reliability of the clutch as stated above and, thus, the precharge control operation is so difficult to carry out. Even if it is feasible to employ the precharge control operation of the clutch, implementation of the same in the automatic transmission would be possible only through engineering efforts undertaken over an enormously long period of time.

SUMMARY OF THE INVENTION

It is an object of the invention to provide an engine starting system for a power train configured to overcome the aforementioned problems of the prior art.

According to the invention, an engine starting system for a power train including an engine and an automatic transmission which transmits engine power while performing gear shifting operation in a prescribed manner includes an engine stop/restart controller for performing automatic engine stop control operation for automatically stopping the engine by interrupting fuel supply necessary for continued engine operation when automatic engine stop conditions are satisfied and for automatically restarting the engine by producing combustion at least in a cylinder which is on an expansion stroke at engine stop when engine restart conditions are satisfied after automatic engine stop. The automatic transmission includes a stationary member constituting an integral part of a transmission housing, a planetary gear mechanism including at least a first rotary member and a second rotary member, an input shaft of the planetary gear mechanism, an output shaft of the planetary gear mechanism, a clutch for engaging and disengaging the first rotary member and the input shaft to and from each other, and a brake for engaging and disengaging the second rotary member and the stationary member to and from each other, the automatic transmission having a special mode in which the clutch is disengaged and the brake is applied. The clutch is configured to set the automatic transmission in a drive condition in which the engine power can be transmitted to a driving wheel side when the clutch is engaged and in a neutral condition in which transmission of the engine power to the driving wheel side is interrupted when the clutch is disengaged at least under conditions where the automatic engine stop conditions are satisfied. If the special mode is selected under conditions where the output shaft is locked, the automatic transmission is brought to a condition in which the first rotary member is locked to the stationary member. During execution of the aforementioned automatic engine stop control operation, the engine stop/restart controller performs special clutch engagement control operation in which the automatic transmission is caused to initiate a transfer to the special mode before the fuel supply is interrupted and the clutch is caused to completely engage at a specific point in time at least after the automatic transmission has completed the transfer to the special mode.

These and other objects, features and advantages of the invention will become more apparent upon a reading of the following detailed description in conjunction with the accompanying drawings.

BRIEF DESCRIPTION OF THE DRAWINGS

FIG. 4 is a chart showing a relationship between engagement/disengagement states of individual engagement members of an automatic transmission of the power train of FIG. 3 and gear shift positions thereof;

FIG. 13 is a time chart showing how engine speed and turbine turning speed vary during a process of automatic engine stop;

DETAILED DESCRIPTION OF THE PREFERRED EMBODIMENTS OF THE INVENTION

The invention is now described in detail with reference to the accompanying drawings.

First Embodiment

Figure 1:
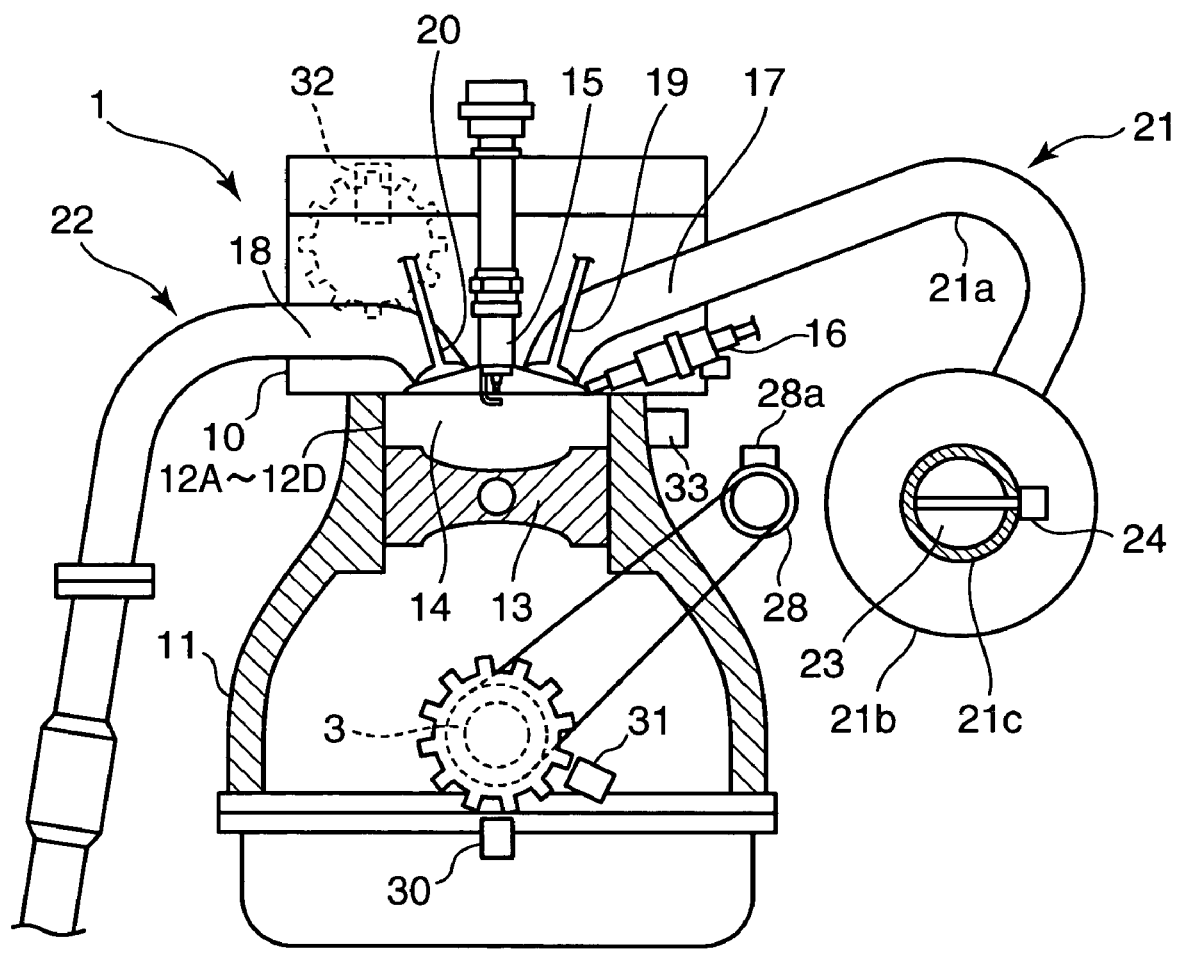
FIG. 1 is a cross-sectional diagram generally showing the structure of an engine employing an engine starting system according to a first embodiment of the invention.
Figure 2:
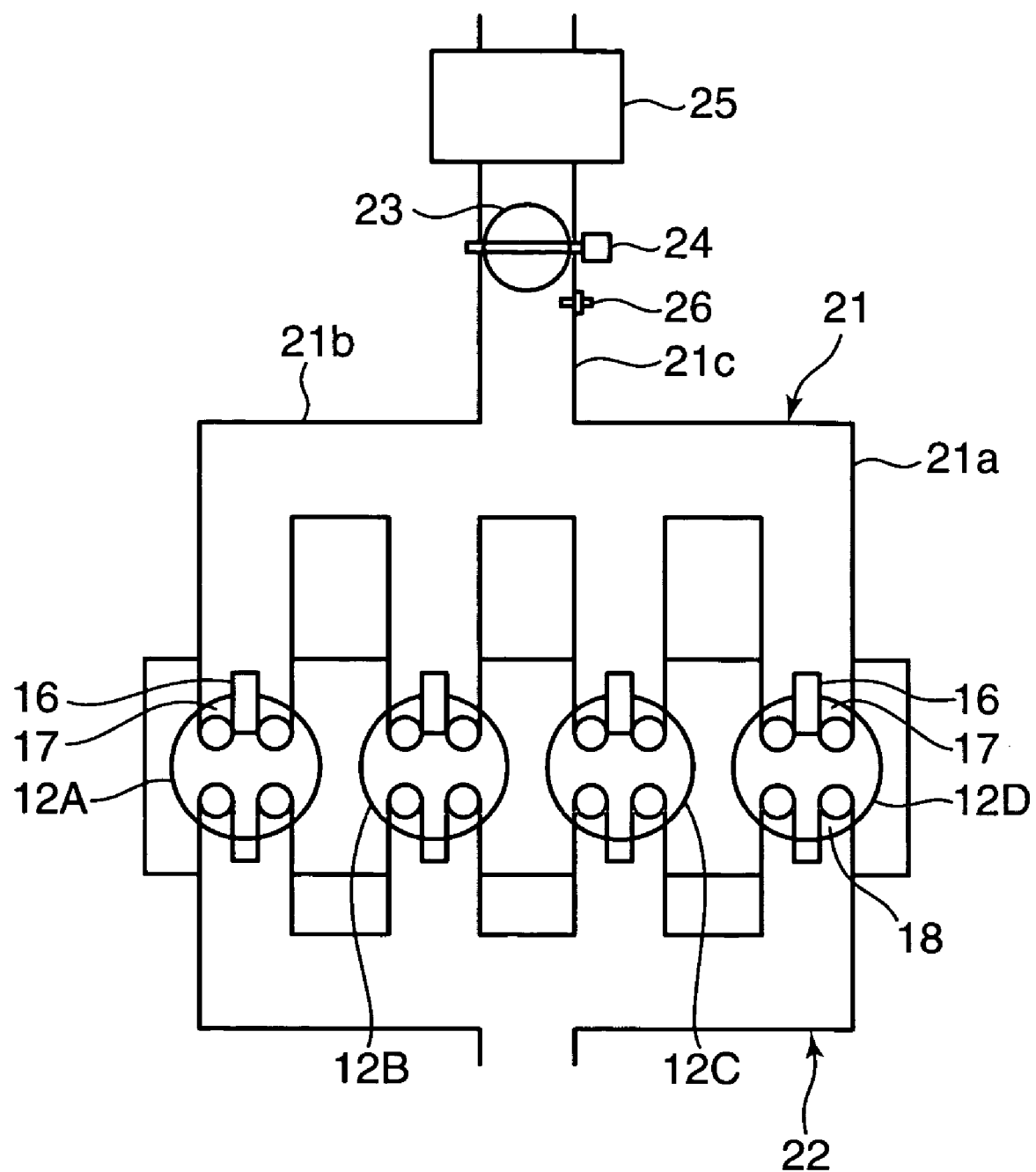
FIG. 2 is an explanatory diagram showing the structure of an intake system and an exhaust system of the engine of FIG. 1.

FIGS. 1 and 2 are diagrams generally showing the structure of a four-cycle spark ignition engine employing an engine starting system according to a first embodiment of the invention. This engine includes an engine body 1 having a cylinder head 10 and a cylinder block 11 and an electronic control unit (ECU) 2 (refer to FIG. 5) for performing overall engine control. The engine body 1 has a plurality of (four in the illustrated embodiment) cylinders 12A-12D, which may hereinafter be referred to as the first cylinder 12A, the second cylinder 12B, the third cylinder 12C and the fourth cylinder 12D, or simply as the cylinders 12 collectively. Pistons 13 connected to a crankshaft 3 by connecting rods are fitted in the individual cylinders 12A-12D whereby a combustion chamber 14 is formed above the piston 13 in each of the cylinders 12A-12D as shown in FIG. 1.

Disposed at the top of the combustion chamber 14 formed in each of the cylinders 12A-12D is a spark plug 15 with an electrode of the spark plug 15 at a far end thereof located in the combustion chamber 14. Each of the cylinders 12A-12D is provided with a fuel injector 16 installed on one side of the combustion chamber 14 for injecting fuel directly into the combustion chamber 14. Incorporating a needle valve and a solenoid which are not illustrated, the fuel injector 16 is actuated by a pulse signal. When this pulse signal is input, a nozzle of the fuel injector 16 opens for a period of time corresponding to the pulselength of the pulse signal to inject the fuel in a quantity corresponding to valve opening time into the combustion chamber 14. Each of the fuel injectors 16 is so disposed as to spray the fuel in a direction toward the vicinity of the spark plug 15. The fuel is supplied to each fuel injector 16 from a fuel pump (not shown) via a fuel supply channel. A fuel supply system is constructed to produce a fuel supply pressure higher than pressure in the combustion chamber 14 during each successive compression stroke.

There are formed intake ports 17 and exhaust ports 18 opening into the combustion chambers 14 of the individual cylinders 12A-12D at upper portions thereof with intake valves 19 and exhaust valves 20 provided in the intake ports 17 and the exhaust ports 18, respectively. The intake valves 19 and the exhaust valves 20 are actuated by valve actuating mechanisms (not shown) including camshafts. Opening and closing timings of the intake and exhaust valves 19, 20 of the individual cylinders 12A-12D are preset such that the cylinders 12A-12D undergo successive combustion cycles of intake, compression, expansion and exhaust strokes with a specific phase delay as will be later described in detail.

The intake ports 17 are connected to an intake passage 21 while the exhaust ports 18 are connected to an exhaust passage 22. A downstream part of the intake passage 21 close to the intake ports 17 is divided into four independent branched intake channels 21a which are connected to the individual cylinders 12A-12D as shown in FIG. 2. Upstream ends of these branched intake channels 21a are individually connected to a surge tank 21b. A portion of the intake passage 21 further upstream of the surge tank 21b constitutes a common intake passage portion 21c which supplies air to all of the cylinders 12A-12D. Provided in the common intake passage portion 21c is an intake air quantity regulator including a throttle valve 23 which is driven by an actuator 24. Also provided in the common intake passage portion 21c upstream and downstream of the throttle valve 23 are an airflow sensor 25 for detecting intake air quantity and outputting a resultant sensing signal to the ECU 2 and an intake air pressure sensor 26 for detecting intake air pressure (boost pressure) and outputting a resultant sensing signal to the ECU 2, respectively.

The engine body 1 is further provided with an alternator (generator) 28 which is connected to the crankshaft 3 by a timing belt or the like. The alternator 28 includes a regulator circuit 28a for regulating an output voltage of the alternator 28 by controlling a current flowing through a field coil (not shown). With this arrangement, an output current of the alternator 28 is controlled in accordance with a control signal fed from the ECU 2 to meet a target value determined based on the amount of electric loads mounted on a vehicle and voltage of an onboard battery under normal operating conditions.

The engine further includes a pair of first and second crank angle sensors 30, 31 for detecting the angle of rotation of the crankshaft 3. The ECU 2 determines engine speed Ne based on a sensing signal output from the first crank angle sensor 30. The ECU 2 also determines turning direction and angle of rotation of the crankshaft 3 from mutually phase-offset sensing signals (first crank angle signal CA1 and second crank angle signal CA2) output from the two crank angle sensors 30, 31.

Figure 5:
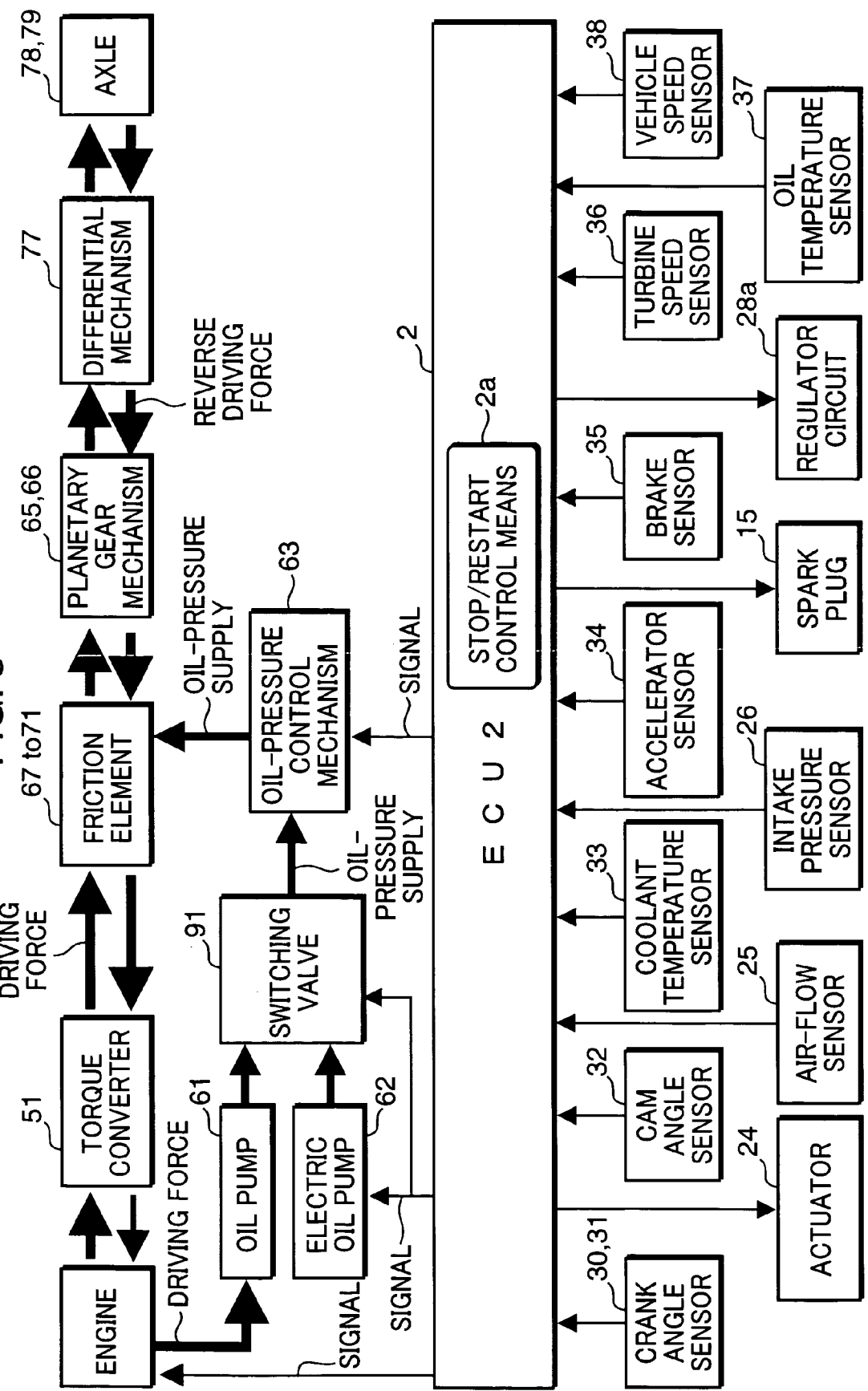
FIG. 5 is a block diagram of the engine starting system of the first embodiment for the power train of FIG. 3.

The engine also includes cam angle sensors 32 provided on the aforementioned camshafts for detecting specific rotational positions of the camshafts and outputting cylinder identification signals and a water temperature sensor 33 for detecting temperature of engine cooling water. The engine further includes an accelerator stroke sensor 34 for detecting throttle opening corresponding to the amount of depression of an accelerator pedal by a driver, a brake sensor 35 for detecting depression of a brake pedal by the driver and a vehicle speed sensor 38 for detecting vehicle speed as shown in FIG. 5. Sensing signals output from these sensors 32-35, 38 are input into the ECU 2.

Figure 3:
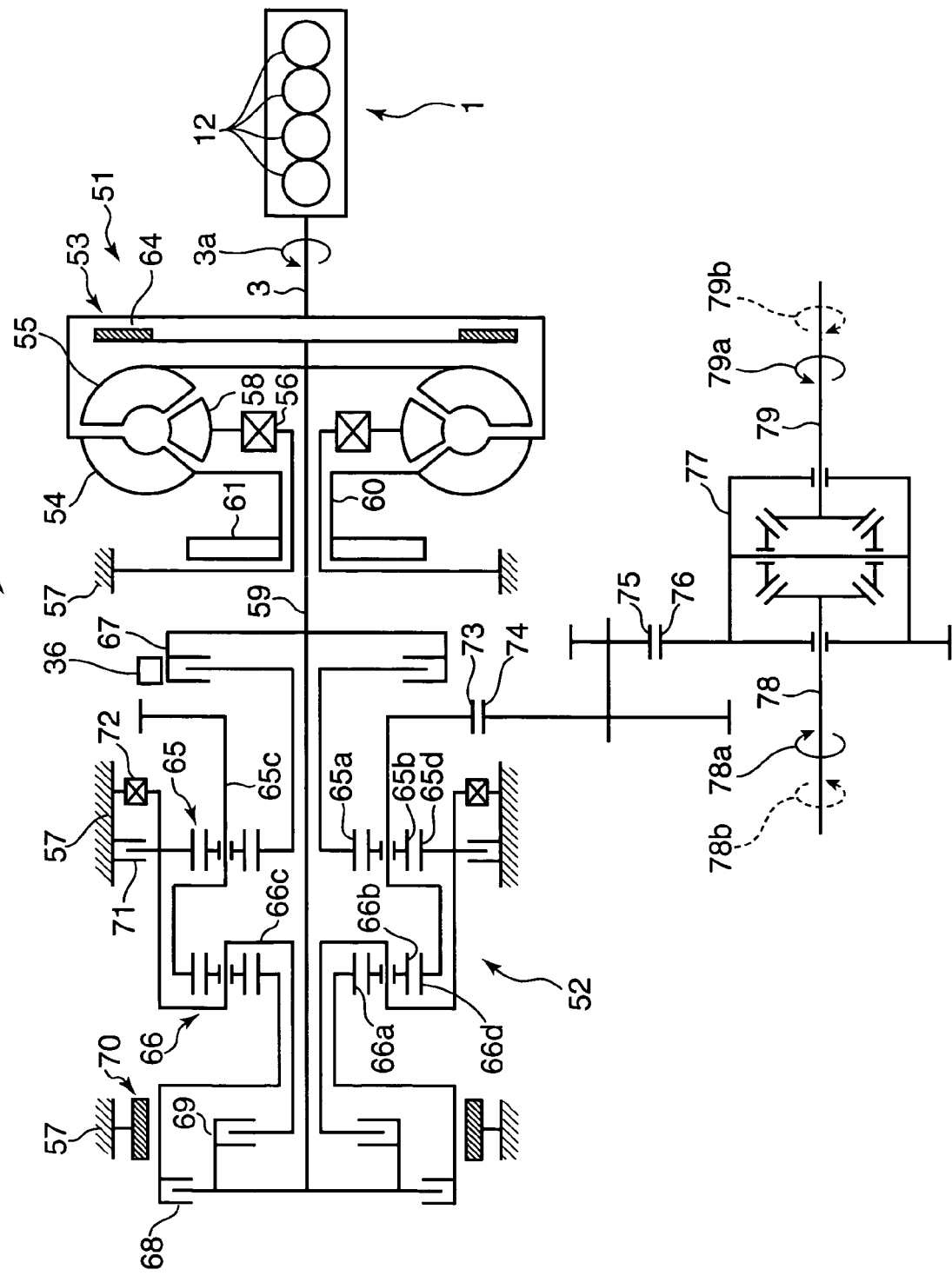
FIG. 3 is a diagram generally showing an exemplary configuration of a power train.

FIG. 3 is a diagram generally showing the configuration of a power train of the present embodiment including the engine body 1 and a drive line up to left and right drive axles 78, 79. The engine body 1 is connected to an automatic transmission 50 by the crankshaft 3 which serves as an output shaft of the engine body 1. When the automatic transmission 50 is in one of forward gears, rotary motion and engine power are transmitted to the drive axles 78, 79, causing the drive axles 78, 79 to rotate producing a forward driving force. In FIG. 3, an arrow 3a indicates a forward turning direction of the crankshaft 3 while arrows 78a and 79a indicate a forward turning direction of the drive axles 78, 79, respectively.

The automatic transmission 50 includes a torque converter 51 connected to the crankshaft 3 and a multi-gear shifting mechanism 52 linked to a turbine shaft 59 which is an output shaft of the torque converter 51 (or an input shaft of the multi-gear shifting mechanism 52). The multi-gear shifting mechanism 52 includes a plurality of friction members 67-71. The automatic transmission 50 can be switched between a drive condition in which the engine power is transmitted to driving wheels and a neutral condition in which transmission of the engine power to the driving wheels is interrupted as a result of engagement and disengagement of these friction members 67-71.

The torque converter 51 includes a pump cover 53 connected to the crankshaft 3, a pump impeller 54 formed as an integral part of the pump cover 53, a turbine (turbine liner) 55 disposed face to face with the pump impeller 54, and a stator 58 which is located between the pump impeller 54 and the turbine 55 and attached to a transmission housing 57 via a one-way clutch 56. An inner space of the pump cover 53 is filled with hydraulic fluid or oil, also known as automatic transmission fluid (ATF), so that a driving force exerted by the pump impeller 54 is transmitted to the turbine 55 by the ATF.

The driving force is then transmitted to the multi-gear shifting mechanism 52 through the turbine shaft 59 which is joined to the turbine 55.

The transmission housing 57 incorporates a turbine rotation sensor 36 for detecting turning speed of the turbine 55, the turbine rotation sensor 36 facing an outer surface of a forward clutch 67 (referred to simply as the clutch in the appended claims) which turns together with the turbine shaft 59. More specifically, the turbine rotation sensor 36 is mounted such that its extreme end is located at a position facing a curved outer surface of a drum of the forward clutch 67. The curved outer surface of the drum of the forward clutch 67 is splined to form a series of ridges and furrows therearound. As the drum of the forward clutch 67 rotates, the ridges and furrows formed around the drum induces a periodically changing voltage in the turbine rotation sensor 36. The turbine rotation sensor 36 detects periodic changes in the induced voltage and outputs a sensing signal to the ECU 2, whereby the ECU 2 determines turning speed of the turbine shaft 59, and thus the turning speed of the turbine 55.

The pump impeller 54 is connected to a hollow rotating shaft 60 and an oil pump 61 is attached to a rear end (or the end opposite the engine body 1) of the 0shaft 60. Besides the oil pump 61, there is also provided an electric oil pump 62 (FIG. 5) inside the transmission housing 57. The two oil pumps 61, 62 are connected to a hydraulic pressure control mechanism 63 through a directional control valve 91 (FIG. 5). The directional control valve 91 switches a line pressure source between the oil pump 61 and the electric oil pump 62 in accordance with a switching signal fed from the ECU 2. Also, the ECU 2 serves to control engagement and disengagement of the friction members 67-71 by switching oil channels (fluid channels) of the hydraulic pressure control mechanism 63, setting a line pressure (hydraulic pressure supplied during a period when the friction members 67-71 are engaged) and controlling a transient hydraulic pressure during engagement and disengagement of the friction members 67-71.

The electric oil pump 62 is provided in addition to the oil pump 61 to supply a sufficient line pressure when it is difficult to produce a desired level of line pressure by the oil pump 61 alone due to insufficient engine speed during idle stop or in an initial stage of engine starting. Switching timing of the oil pump 61 and the electric oil pump 62 is preset from this point of view.

The torque converter 51 is provided with a lockup clutch 64 which is fitted between the pump cover 53 and the turbine 55 to directly connect the turbine 55 to the crankshaft 3 through the pump cover 53. Linked to the oil pump 61 and the electric oil pump 62 through the hydraulic pressure control mechanism 63, the lockup clutch 64 is engaged and disengaged as various solenoid valves provided in the hydraulic pressure control mechanism 63 are turned on and off in a controlled fashion to switch the fluid channels of the hydraulic pressure control mechanism 63 according to the vehicle speed.

On the other hand, the multi-gear shifting mechanism 52 includes first and second planetary gear sets 65, 66 (referred to collectively as a planetary gear mechanism in the appended claims) as well as various engagement members (which include the multiple friction members 67-71, such as clutch plates and band brakes, and a one-way clutch 72) for altering a power transmitting line including the first and second planetary gear sets 65, 66. The individual engagement members 67-72 of the multi-gear shifting mechanism 52 are engaged or disengaged according to shift range settings (e.g., a drive (D) range, a neutral (N) range and a reverse (R) range) to set the automatic transmission 50 to forward gear, neutral condition or reverse gear, for example.

As used in the present Specification, the expression "drive condition" or "neutral condition" does not necessarily refer to a specific gear shift position, such as "D" or "N" position selected by a shift control lever, for instance. Instead, either the drive condition or the neutral condition refers to a substantial state of the automatic transmission 50 judged based on how transmission of the engine power is controlled. Accordingly, the neutral condition includes a condition in which transmission of the engine power through the automatic transmission 50 is interrupted by controlling the solenoid valves with the shift control lever held at the D range position, for instance.

The first planetary gear set 65 includes a sun gear 65a (first rotary member), a plurality of (e.g., three) planet gears 65b arranged around the sun gear 65a in mesh therewith, a career 65c supporting the planet gears 65b and a ring gear 65d arranged to surround the planet gears 65b in mesh therewith. Similarly, the second planetary gear set 66 includes a sun gear 66a (second rotary member), a plurality of (e.g., three) planet gears 66b arranged around the sun gear 66a in mesh therewith, a career 66c supporting the planet gears 66b and a ring gear 66d arranged to surround the planet gears 66b in mesh therewith. The ring gear 65d of the first planetary gear set 65 is connected to the career 66c of the second planetary gear set 66 while the career 65c of the second planetary gear set 66 is connected to the ring gear 66d of the second planetary gear set 66 so that the first and second planetary gear sets 65, 66 work in an interlocked fashion.

The aforementioned friction members include the forward clutch 67 which is disposed between the turbine shaft 59 and the sun gear 65a of the first planetary gear set 65, a reverse clutch 68 which is disposed between the turbine shaft 59 and the sun gear 66a of the second planetary gear set 66, a 3-4 clutch 69 which is disposed between the turbine shaft 59 and the career 66c of the second planetary gear set 66, a 2-4 brake 70 (referred to simply as the brake in the appended claims) for locking the sun gear 66a of the second planetary gear set 66, and a low reverse brake 71 for locking the career 66c of the second planetary gear set 66. The one-way clutch 72 is a device which allows the ring gear 65d and the career 66c to turn freely in one direction (i.e., forward turning direction of the crankshaft 3) but not in the other (i.e., reverse turning direction of the crankshaft 3). This means that the one-way clutch 72 is unlocked in the forward turning direction and locked in the reverse turning direction. The engagement members 67-72 including these friction members 67-71 are controllably engaged and disengaged to alter or interrupt the power transmitting line connected to an output gear 73 (which is referred to as an output shaft in the appended claims).

As the output gear 73 rotates, the engine power is transmitted to the driving wheels (not shown) through transmission gears 74, 75, 76, a differential gear 77 and the left and right drive axles 78, 79 which turn together with the driving wheels.

In the context of this Specification, the expression "locking" or "locked" means that any constituent element of the multi-gear shifting mechanism 52 is held immovable with respect to the transmission housing 57 or a stationary member constituting an integral part thereof. Although not illustrated in FIG. 3, the automatic transmission 50 further includes a transmission fluid temperature sensor 37 for detecting temperature of the ATF and outputting a resultant sensing signal to the ECU 2.

FIG. 4 is a chart showing a relationship between engagement/disengagement states of the individual engagement members 67-72 and gear shift positions of the automatic transmission 50. An open circle "○" shown in FIG. 4 indicates a state in which the engagement members 67-72 are engaged, whereas a solid circle "●" indicates a state in which the one-way clutch 72 is locked during forward running to allow the engine power (forward driving force) to be transmitted from the engine toward the driving wheels but unlocked during reverse running to prohibit a reverse driving force from being transmitted from the driving wheels back toward the engine. Each blank cell in FIG. 4 indicates that corresponding one of the engagement members 67-72 is released or unlocked. Accordingly, it can be seen from FIG. 4 that all of the engagement members 67-72 are released or unlocked in the N range, the forward clutch 67 is engaged while the one-way clutch 72 is locked in the forward direction but unlocked in the reverse direction in first gear in the D range, the forward clutch 67 and the 2-4 brake 70 are engaged (applied) in second gear in the D range, the forward clutch 67 and the 3-4 clutch 69 are engaged in third gear in the D range, and the 3-4 clutch 69 and the 2-4 brake 70 are engaged (applied) in fourth gear in the D range.

In addition, the automatic transmission 50 of this embodiment has special mode M. While the special mode M differs from the N range, the automatic transmission 50 is set to the neutral condition shifted to the special mode M. In the special mode M, the 2-4 brake 70 is applied and the one-way clutch 72 is locked where necessary as indicated by a bracketed solid circle "(●)" in FIG. 4. Specifically, the one-way clutch 72 is locked when the career 65*c* or the ring gear 66*d* begins to turn in a locking direction, and the one-way clutch 72 is otherwise unlocked.

It is to be noted that FIG. 4 does not show all combinations of shift ranges and gear shift positions of the automatic transmission 50 but shows only such combinations thereof that are related directly to explanation of the present embodiment of the invention.

FIG. 5 is a block diagram of the engine starting system of the first embodiment. The ECU 2 includes a microcomputer provided with a central processing unit (CPU), a read-only memory (ROM) and a random access memory (RAM). The CPU of the ECU 2 executes a program stored in the ROM or RAM to control various kinds of actions of the vehicle. Upon receiving the sensing signals from the individual sensors 25, 26, 30-38 mentioned above, the ECU 2 outputs a control signal (pulse signal) for controlling the quantity of fuel to be injected and fuel injection timing to each fuel injector 16, an ignition timing control signal for controlling ignition timing to each spark plug 15, a control signal for controlling the opening of the throttle valve 23 to the actuator 24, and a control signal for controlling the amount of electric power generated by the alternator 28 to the regulator circuit 28*a*.

Also, based on the sensing signals fed from the sensors 25, 26, 30-36, 38, the ECU 2 outputs the aforementioned switching signal used for switching the line pressure source of the hydraulic pressure control mechanism 63 between the oil pump 61 and the electric oil pump 62 to the directional control valve 91 as well as control signals for regulating pressures exerted on the individual friction members 67-71 to the hydraulic pressure control mechanism 63 (more particularly, to the solenoid valves provided in the hydraulic pressure control mechanism 63).

The ECU 2 includes an engine stop/restart controller 2*a* which causes the engine to automatically stop by interrupting fuel supply when predefined conditions for automatic engine stop are satisfied. Also, the engine stop/restart controller 2*a* causes the engine to automatically restart with energy produced by combustion when predefined conditions for engine restart (engine restart conditions) are satisfied as a result of depression of the accelerator pedal or the brake pedal during a process of automatic engine stop or upon completion of automatic engine stop.

Figure 6:
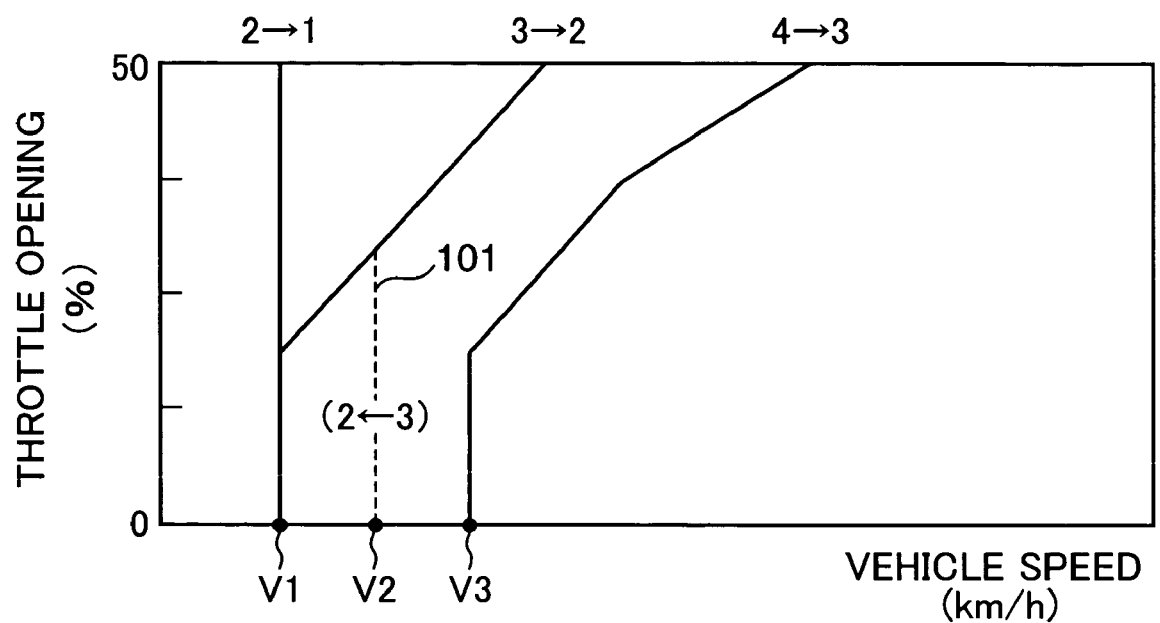
FIG. 6 is part of a shift map showing a gear shifting pattern of the automatic transmission of FIG. 3.

FIG. 6 is part of a shift map showing a gear shifting pattern of the automatic transmission 50, a horizontal axis representing vehicle speed (km/h) and a vertical axis representing the opening of the throttle valve 23, or throttle opening (%). For the sake of simplification, the gear shifting pattern of FIG. 6 shows only downshift lines covering a downshift from the second gear to the first gear (2-1 shift), a downshift from the third gear to the first gear (3-1 shift), a downshift from the third gear to the second gear (3-2 shift), and a downshift from the fourth gear to the third gear (4-3 shift). Based on the shift map of FIG. 6, the ECU 2 selects an optimum gear shift position appropriate for the vehicle speed and the throttle opening and outputs the control signals to the solenoid valves of the hydraulic pressure control mechanism 63. The ECU 2 controllably sets the automatic transmission 50 to a desired gear shift position in this fashion.

As shown in FIG. 6, the 2-1 shift line and the 3-2 shift line overlap each other in a low throttle opening region. This indicates that a 3-1 shift is performed in this region. This arrangement serves to prevent frequent gear shifting, such as 3-2-1 shifts, during deceleration of the vehicle in the low throttle opening region, thus providing improved driving comfort.

It is to be noted that there is a case where the automatic transmission 50 is controlled to perform the 3-2 shift even in the low throttle opening region as shown by a downshift line (broken line) 101 in FIG. 6. This situation occurs when the automatic engine stop conditions are satisfied (or expected to be satisfied) during deceleration in the third gear. As will be later described in detail, the automatic transmission 50 is shifted to the special mode M when the automatic engine stop conditions are satisfied. Thus, if the automatic engine stop conditions are satisfied (or expected to be satisfied) during deceleration in the third gear, the automatic transmission 50 is shifted to the special mode M by way of the second gear.

An instance in which the automatic engine stop conditions are expected to be satisfied is a situation where the automatic engine stop conditions, except for a condition concerning the vehicle speed (vehicle speed-related condition), are already fully satisfied and the vehicle speed-related condition is supposed to be shortly fulfilled taking into account the rate of decrease in the vehicle speed (or deceleration). In this situation, a 3-2 shift vehicle speed V2 at which the automatic transmission 50 is downshifted from the third gear to the second gear should be set at a point slightly higher than defined by the aforementioned vehicle speed-related condition (19 km/h in this embodiment) included in the automatic engine stop conditions.

Now, the working of the engine starting system of the first embodiment is described, starting from operation of the automatic transmission 50.

Figure 7:
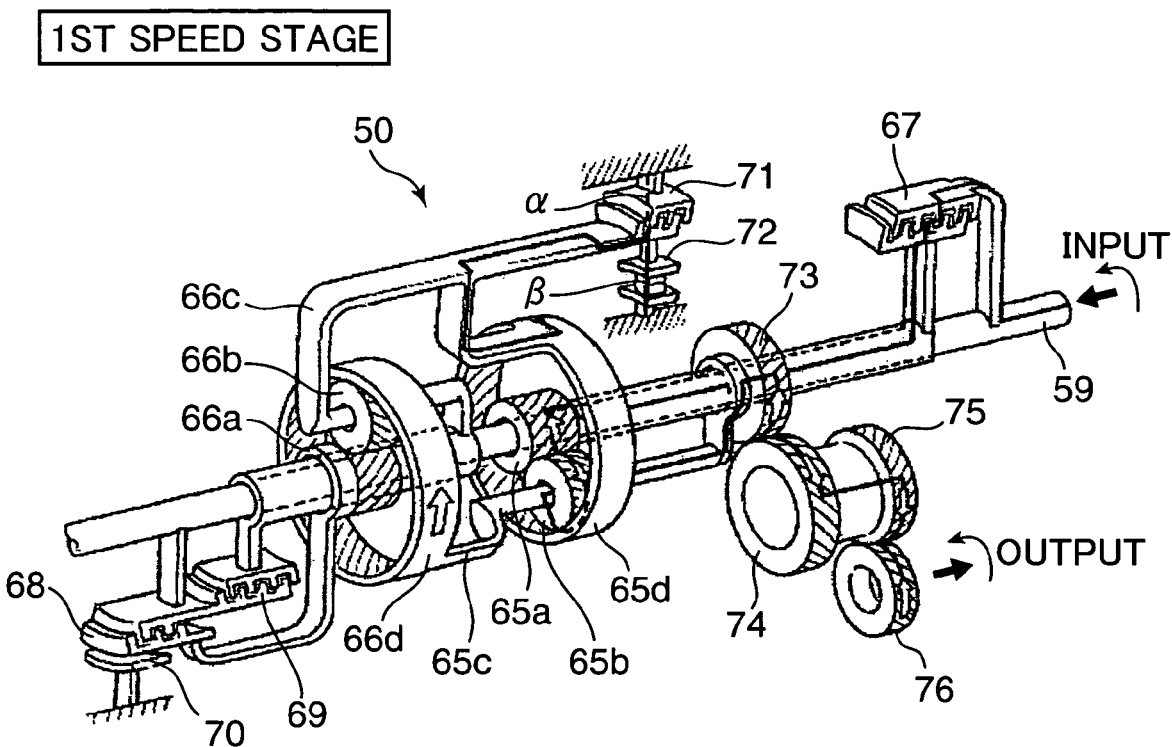
FIG. 7 is a schematic diagram showing a power transmission path through the automatic transmission and turning directions of individual elements thereof when the automatic transmission is in drive range-first gear.

FIG. 7 is a schematic diagram showing a power transmission path through the automatic transmission 50 and turning directions of the individual elements thereof when the automatic transmission 50 is in the D range-first gear. When referring to the turning direction of any element of the automatic transmission 50 illustrated in FIG. 7, a counterclockwise direction is regarded as a "forward turning direction" and a clockwise direction is regarded as a "reverse turning direction" as viewed obliquely from a frontal left side. The turbine shaft 59 turns in the forward turning direction when the engine is under normal operating conditions. Also, when the vehicle is running ahead, the transmission gear 76 turns in the forward turning direction together with the left and right drive axles 78, 79.

When the automatic transmission 50 is in the D range-first gear as shown in FIG. 7, the turbine shaft 59 turns in the forward turning direction, and rotary motion and driving force of the turbine shaft 59 are transmitted to the sun gear 65a via the forward clutch 67. The rotary motion and driving force are further transmitted to the planet gears 65b, causing the same to turn in the reverse turning direction. At this point, the one-way clutch 72 is locked as shown by "β" in FIG. 7, so that rotation of the ring gear 65d in the reverse turning direction is prohibited. In this situation, the planet gears 65b revolve around the sun gear 65a in the forward turning direction together with the career 65c while individually turning in the reverse turning direction about respective support shafts which constitute integral parts of the career 65c. As the career 65c turns in the forward turning direction in this way, rotary motion and driving force of the career 65c in the forward turning direction are transmitted to the transmission gears 74, 75, 76 via the output gear 73. The rotary motion and driving force are further transmitted to the left and right drive axles 78, 79 through the differential gear 77 as can be seen from FIG. 3.

Since the career 65c is interlocked with the ring gear 66d, the ring gear 66d turns in the forward turning direction. Also, the career 66c is interlocked with the ring gear 65d and the ring gear 65d is held stationary by the one-way clutch 72 which is locked or by the low reverse brake 71 which is applied as illustrated in FIG. 7, the career 66c is also held stationary. In this situation, the individual planet gears 66b turn in the forward turning direction, causing the sun gear 66a which is in mesh with planet gears 66b to turn in the reverse turning direction.

When the engine is reversed in the first gear, causing the crankshaft 3 to turn in the reverse direction, the engine power is not transmitted to the output gear 73 as the one-way clutch 72 is unlocked.

Figure 8:
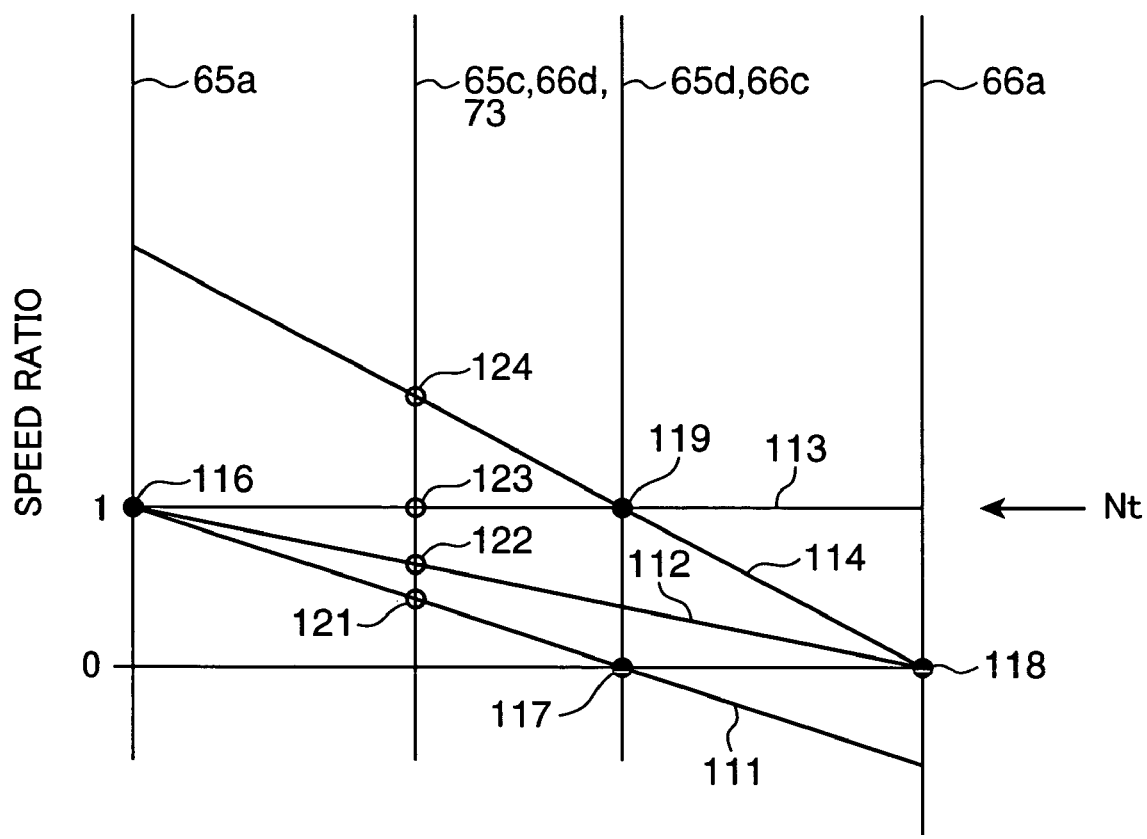
FIG. 8 is a gear speed diagram schematically showing turning speeds of the elements of planetary gear sets in first to fourth gears of the automatic transmission of FIG. 3.

FIG. 8 is a gear speed diagram of the first and second planetary gear sets 65, 66 schematically showing turning speeds of the elements of the first and second planetary gear sets 65, 66 in relation to the turning speed of the input shaft, or the turbine shaft 59, in the first to fourth gears of the automatic transmission 50. Four vertical lines in FIG. 8 correspond, from left to right, to the sun gear 65a (first rotary member), the career 65c (which turns together with the ring gear 66d and the output gear 73), the ring gear 65d (which turns together with the career 66c) and sun gear 66a (second rotary member). Spacings of these vertical lines are determined uniquely by the number of teeth on each of the planet gears 65b, 66b. A vertical axis of FIG. 8 represents the ratio (speed ratio) of the turning speed of each element of the automatic transmission 50 to the turning speed of the turbine shaft 59, or the turbine turning speed Nt. If the turning speed of a particular element is equal to the turbine turning speed Nt, the speed ratio is 1. If a particular element is held stationary, the speed ratio is 0.

A first speed line 111 shown in the gear speed diagram of FIG. 8 corresponds to the D range-first gear illustrated in FIG. 7. Since the sun gear 65a turns together with the turbine shaft 59 in the first gear due to engagement of the forward clutch 67, the speed ratio of the sun gear 65a becomes equal to 1 at an input point 116. Also, since the ring gear 65d is locked by the one-way clutch 72, the speed ratio becomes equal to 0 at a stationary point 117. In this case, the speed ratio at an output point 121 (i.e., the output gear 73) is between 0 and 1 (e.g., approximately 0.36).

Figure 9:
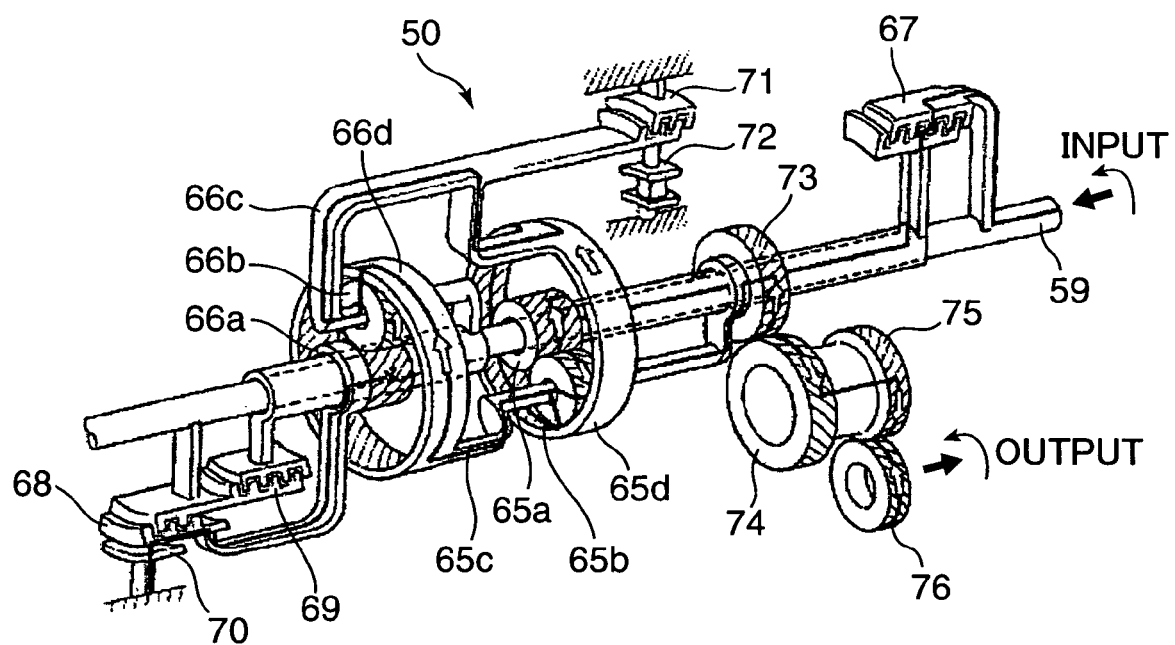
FIG. 9 is a schematic diagram showing a power transmission path through the automatic transmission and turning directions of the individual elements thereof when the automatic transmission is in drive range-second gear.

FIG. 9 is a schematic diagram showing a power transmission path through the automatic transmission 50 and turning directions of the individual elements thereof when the automatic transmission 50 is in the D range-second gear. The turning direction of any element of the automatic transmission 50 illustrated in FIG. 9 is referred to in the same way as in FIG. 7.

The automatic transmission 50 is shifted to the D range-second gear if the 2-4 brake 70 is applied in the D range-first gear in which the forward clutch 67 is engaged as shown in FIG. 4.

As already mentioned, the sun gear 66a turns in the reverse turning direction in the D range-first gear. If the 2-4 brake 70 is applied in this state, the sun gear 66a stops turning and, as a consequence, the planet gears 66b revolve around the sun gear 66a in the forward turning direction together with the career 66c while individually turning in the forward turning direction about respective support shafts which constitute integral parts of the career 66c. In the D range-second gear, the career 66c is prohibited from turning in the reverse turning direction so that the career 66c which was held stationary in the D range-first gear turns in the forward turning direction.

In this situation, the planet gears 65b revolve around the sun gear 65a in the forward turning direction together with the career 65c while individually turning in the reverse turning direction about the respective support shafts which constitute the integral parts of the career 65c as in the first gear. However, the situation in the D range-second gear differs from that in the D range-first gear in that the turning speed of the career 65c in the second gear higher than in the first gear because the ring gear 65d turns in the forward turning direction in the second gear, unlike the case in the first gear. The turning speed of the turbine shaft 59, however, is lower in the second gear than in the first gear. As in the D range-first gear, rotary motion and driving force of the career 65c in the forward turning direction are transmitted to the transmission gears 74, 75, 76 via the output gear 73.

When the engine is reversed in the second gear, causing the crankshaft 3 to turn in the reverse direction, the aforementioned elements of the automatic transmission 50 turn in opposite directions so that a reverse driving force is transmitted from the engine to the output gear 73.

A second speed line 112 shown in the gear speed diagram of FIG. 8 represents a state of the automatic transmission 50 in the D range-second gear illustrated in FIG. 9. Since the sun gear 65a turns together with the turbine shaft 59 in the second gear due to engagement of the forward clutch 67, the speed ratio of the sun gear 65a becomes equal to 1 at the input point 116. Also, since the sun gear 66a is locked by the 2-4 brake 70, the speed ratio becomes equal to 0 at a stationary point 118. In this case, the speed ratio at an output point 122 (i.e., the output gear 73) becomes larger than in the first gear (e.g., approximately 0.67).

Figure 10:
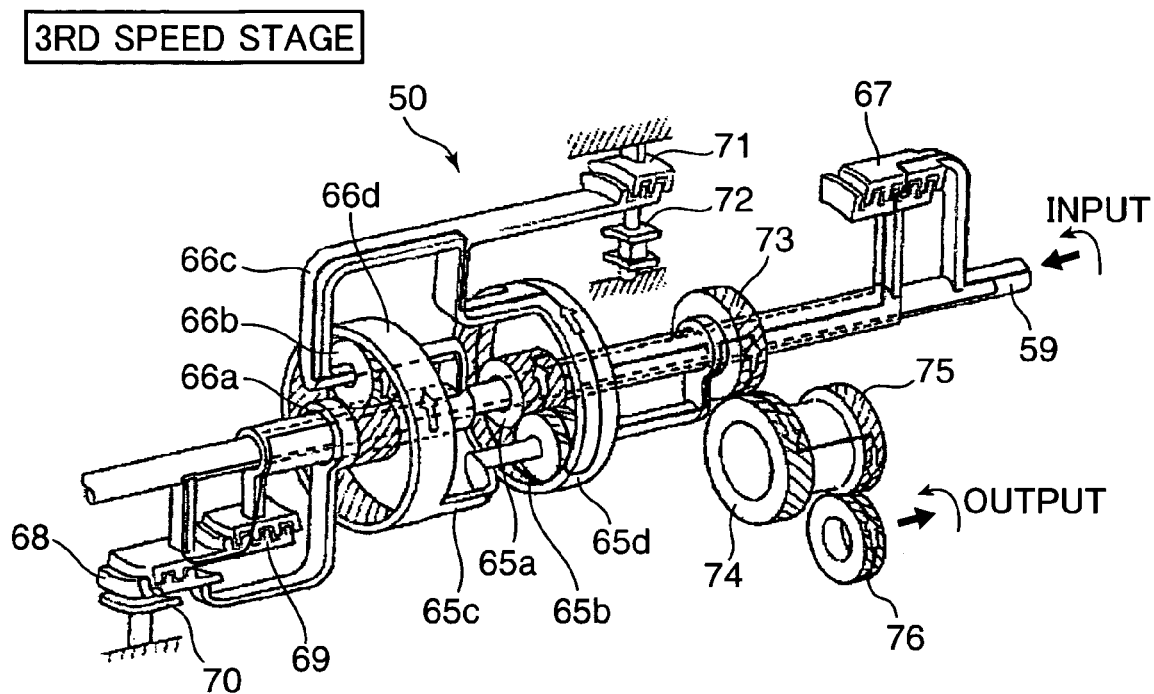
FIG. 10 is a schematic diagram showing a power transmission path through the automatic transmission and turning directions of the individual elements thereof when the automatic transmission is in drive range-third gear.

FIG. 10 is a schematic diagram showing a power transmission path through the automatic transmission 50 and turning directions of the individual elements thereof when the automatic transmission 50 is in the D range-third gear. The turning direction of any element of the automatic transmission 50 illustrated in FIG. 10 is referred to in the same way as in FIG. 7.

In the D range-third gear, the automatic transmission 50 is in a state in which both the forward clutch 67 and the 3-4 clutch 69 are engaged as shown in FIG. 4.

When the automatic transmission 50 is shifted to the D range-third gear, the turbine shaft 59 turns in the forward turning direction, and rotary motion and driving force of the turbine shaft 59 are divided into two ways, that is, a first path including the forward clutch 67 and a second path including the 3-4 clutch 69. Specifically, part of the driving force is transmitted to the sun gear 65a through the forward clutch 67 in the first path, and to the ring gear 65d via the planet gears 65b. This means that the sun gear 65a, the career 65c and the ring gear 65d turn together as a single structure at the same turning speed as the turbine shaft 59. On the other hand, remaining part of the driving force is transmitted to the career 66c through the 3-4 clutch 69 in the second path at the same turning speed.

In this configuration, the two divided parts of the driving force are rejoined at the ring gear 65d and eventually output from the career 65c to the output gear 73. After all, the driving force input through the turbine shaft 59 is output to the output gear 73 at the same turning speed so that the turbine shaft 59 and the output gear 73 are as if in a directly coupled state. Subsequently, the rotary motion and driving force are transmitted to the transmission gears 74, 75, 76 and then to the left and right drive axles 78, 79 through the differential gear 77 as can be seen from FIG. 3.

A third speed line 113 shown in the gear speed diagram of FIG. 8 represents a state of the automatic transmission 50 in the D range-third gear illustrated in FIG. 10. Since the sun gear 65a turns together with the turbine shaft 59 due to engagement of the forward clutch 67 and the career 66c turns together with the turbine shaft 59 due to engagement of the 3-4 clutch 69 in the third gear, the speed ratio becomes equal to 1 at the input point 116 and at an input point 119. In this case, the speed ratio also becomes equal to 1 at an output point 123 (i.e., the output gear 73) with the 59 and the output gear 73 held in the directly coupled state.

While the working of the individual elements of the automatic transmission 50 in the D range-fourth gear is not discussed in detail, both the 3-4 clutch 69 and the 2-4 brake 70 are engaged (applied) as shown in FIG. 4 so that the driving force input through the turbine shaft 59 is transmitted to the career 65c at a turning speed increased from the turning speed of the turbine shaft 59 in the D range-fourth gear. The rotary motion and driving force are further transmitted to the left and right drive axles 78, 79 through the differential gear 77.

A fourth speed line 114 shown in the gear speed diagram of FIG. 8 represents a state of the automatic transmission 50 in the D range-fourth gear. Since the career 66c turns together with the turbine shaft 59 due to engagement of the 3-4 clutch 69 in the fourth gear, the speed ratio of the career 66c becomes equal to 1 at the input point 119. Also, since the sun gear 66a is locked by the 2-4 brake 70, the speed ratio becomes equal to 0 at the stationary point 118. In this case, the speed ratio at an output point 124 (i.e., the output gear 73) becomes larger than 1 (e.g., approximately 1.38).

Figure 11:
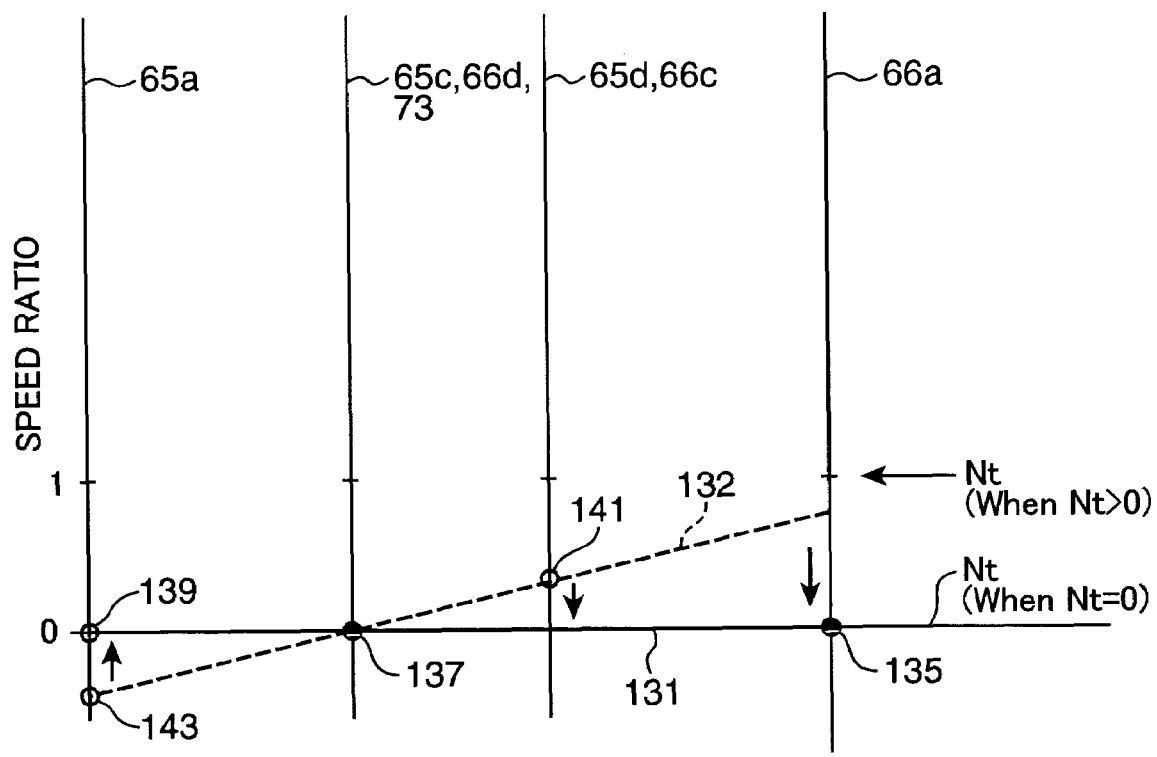
FIG. 11 is a gear speed diagram schematically showing turning speeds of the elements of the planetary gear sets in a neutral condition of the automatic transmission of FIG. 3 when a vehicle is at rest.

FIG. 11 is a gear speed diagram applicable to the neutral condition in which the vehicle is at rest (or zero speed). FIG. 11 shows turning speeds of the elements of the first and second planetary gear sets 65, 66 essentially in the same way as FIG. 8. It is to be noted that, in the present embodiment, there are two types of neutral conditions, that is, the ordinary neutral condition selected in the N range and the neutral condition selected in the special mode M (refer to FIG. 4).

First, a speed line 131 applied to the special mode M is defined by a stationary point 135 where the 2-4 brake 70 is applied and a stationary point 137 where the vehicle is at rest with the output gear 73 held stationary. The speed ratio is equal to 0 all along the speed line 131.

By comparison, only the stationary point 137 is defined in the ordinary neutral condition. Accordingly, although there is a possibility that the speed ratio remains equal to 0 all the way as with the speed line 131 for the special mode M, this situation does not occur in actuality but the speed ratio normally varies along an oblique speed line 132 passing through the stationary point 137 in the ordinary neutral condition corresponding to the N range. Generally, the speed line 132 for the ordinary neutral condition selected in the N range is not uniquely defined. The speed line 132 shown in FIG. 11 is just one example. A reason why the speed line 132 for the ordinary neutral condition selected in the N range inclines as shown in FIG. 11 is that some of the elements of the first and second planetary gear sets 65, 66 turn together in the ordinary neutral condition. In the example shown in FIG. 11, the career 66c turns together with the turbine shaft 59 so that the speed ratio is between 0 and 1 at an input point 141. In this case, the speed ratio of the sun gear 65a is negative so that the sun gear 65a turns in a direction opposite to the turning direction of the turbine shaft 59 as indicated by a point 143 in FIG. 11.

A situation in which the forward clutch 67 is engaged in each of the aforementioned two types of neutral conditions is now considered. As is apparent from FIG. 4, the automatic transmission 50 is set to the second gear if the forward clutch 67 is engaged in the special mode M, whereas the automatic transmission 50 is set to the first gear if the forward clutch 67 is engaged in the ordinary neutral condition in the N range. In either of these cases, the speed ratio of the output gear 73 is equal to 0 and, as a consequence, the turning direction of the turbine shaft 59 stops turning (turbine turning speed Nt=0).

In the case of the special mode M, the sun gear 65a is held stationary at the beginning (point 139). Thus, it is only necessary to stop rotary motion of the turbine shaft 59 and other elements turning integrally therewith by engaging the forward clutch 67, so that the amount of energy absorbed by the forward clutch 67 is relatively small.

In a case where the forward clutch 67 is engaged in the ordinary neutral condition, on the other hand, it is necessary to stop not only the rotary motion of the turbine shaft 59 and the other elements turning integrally therewith but also rotary motion of the sun gear 65a, 66a, the ring gear 65d, the career 66c and other elements turning integrally therewith. Referring to the gear speed diagram of FIG. 11, engagement of the forward clutch 67 in the ordinary neutral condition in the N range requires absorption of energy that is sufficient for shifting the inclined speed line 132 for the ordinary neutral condition to a horizontal position. Therefore, the amount of energy absorbed by the forward clutch 67 is relatively large in this case.

If the amount of energy to be absorbed is large, the forward clutch 67 requires a longer time for engagement and a greater shock load (N-D shock) occurs when the automatic transmission 50 is shifted from the neutral condition to the drive condition. It will be understood from the above that both clutch engagement time and N-D shock can be reduced if the forward clutch 67 is engaged in the special mode M than in the ordinary neutral condition in the N range.

Figure 12A:
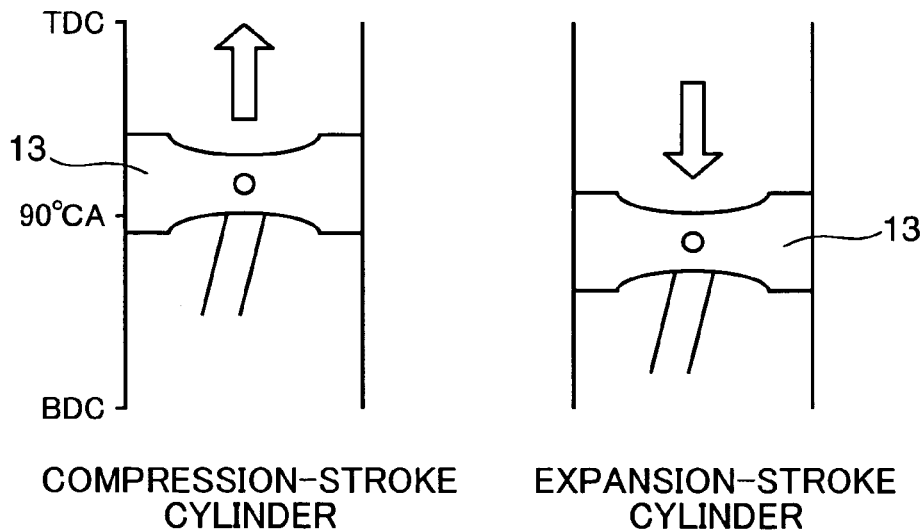
FIGS. 12A and 12B are explanatory diagrams showing a relationship between piston positions and the quantities of air in cylinders which are on an expansion stroke and on a compression stroke at automatic engine stop.
Figure 12B:
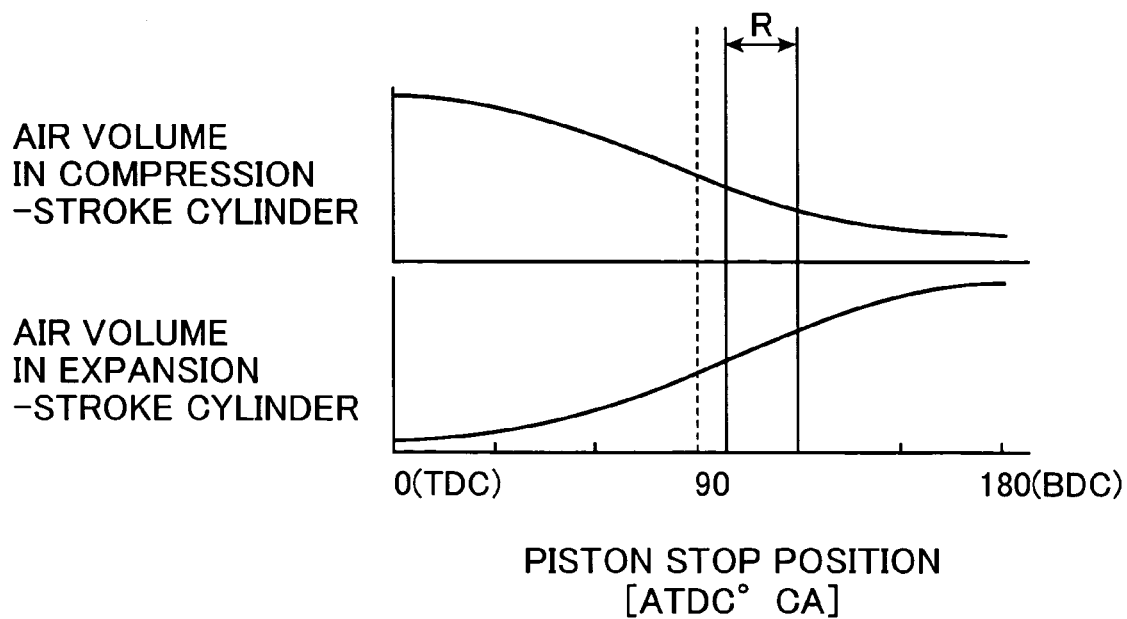

Now, automatic engine stop control operation is described. FIGS. 12A and 12B are diagrams showing a relationship between a state of a cylinder 12 which is on a compression stroke at automatic engine stop (hereinafter referred to as the compression stroke cylinder 12) and a state of a cylinder 12 which is on an expansion stroke at automatic engine stop (hereinafter referred to as the expansion stroke cylinder 12). In the following discussion, the "compression stroke cylinder 12" does not refer to a particular cylinder 12 but any one of the four cylinders 12A-12D which is on the compression stroke or expected to go to the compression stroke very shortly at engine stop. Similarly, the "expansion stroke cylinder 12" refers to any of the four cylinders 12A-12D which is on the expansion stroke or expected to go to the expansion stroke very shortly at engine stop. FIG. 12A shows a relationship between positions of the pistons 13 in the compression stroke cylinder 12 and the expansion stroke cylinder 12, and FIG. 12B shows a relationship between stop position of the piston 13 in the expansion stroke cylinder 12 and the quantities of air in the compression stroke cylinder 12 and in the expansion stroke cylinder 12.

Since the engine of the present embodiment is a four-cycle spark ignition engine, the compression stroke cylinder 12 and the expansion stroke cylinder 12 are offset in phase from each other by as much as 180 degrees in terms of crank angle so that the positions and moving directions of the pistons 13 in these cylinders 12 are in opposite phase as depicted in FIG. 12A. More specifically, when the piston 13 in the compression stroke cylinder 12 moves toward a top dead center (TDC), the piston 13 in the expansion stroke cylinder 12 moves toward a bottom dead center (BDC) as shown by open arrows in FIG. 12A.

To restart the engine which has completely stopped at automatic engine stop by using this behavior of the pistons 13, the engine starting system of the present embodiment first produces combustion in the compression stroke cylinder 12 before producing combustion in the expansion stroke cylinder 12, so that the piston 13 in the compression stroke cylinder 12 moves down backward toward BDC but not beyond BDC (thus causing the crankshaft 3 to slightly turn in the reverse turning direction). The initial combustion in the compression stroke cylinder 12 also causes the piston 13 in the expansion stroke cylinder 12 to move backward toward TDC. As a result of this backward piston movement, the air (a mixture after fuel injection) in the expansion stroke cylinder 12 is compressed. The mixture thus compressed in the expansion stroke cylinder 12 is ignited to produce combustion therein. A resultant strong force produced by combustion in the expansion stroke cylinder 12 alters the turning direction of the crankshaft 3 (from the reverse turning direction to the forward turning direction) and causes the piston 13 in the expansion stroke cylinder 12 to move toward BDC. It is possible to obtain a strong forward driving torque by producing combustion in the expansion stroke cylinder 12 after once reversing the engine as discussed above than by simply producing combustion in the expansion stroke cylinder 12. This arrangement of the embodiment makes it possible to achieve improved engine restartability.

Although the engine starting system of the embodiment is configured to properly restart the engine by just igniting the fuel injected into a particular cylinder 12 as mentioned above without using a starter motor, for instance, combustion energy obtained by combustion of the mixture in the expansion stroke cylinder 12 is not entirely output through the crankshaft 3. The combustion energy is partly consumed to allow those cylinders 12 (the compression stroke cylinder 12 and intake stroke cylinder 12 in this embodiment) which approach the compression stroke TDC after the compression stroke cylinder 12 to go beyond the compression stroke TDC overwhelming a compressive reaction force acting on the respective pistons 13. Therefore, a driving force for turning the crankshaft 3 in the forward turning direction must be left even after part of the combustion energy is consumed to allow those cylinders 12 to go beyond the compression stroke TDC. For this purpose, it is necessary for the expansion stroke cylinder 12 to initially hold a sufficient amount of air at engine stop. On the other hand, it is necessary for the compression stroke cylinder 12 to initially hold such an amount of air that is sufficient to compress the air in the expansion stroke cylinder 12 by turning the crankshaft 3 in the reverse turning direction at the beginning.

In FIG. 12B, a horizontal axis represents the stop position of the piston 13 in the expansion stroke cylinder 12 in terms of crank angle after TDC (ATDC) in degrees and a vertical axis represents the quantities of air in the compression stroke cylinder 12 and in the expansion stroke cylinder 12. FIG. 12B shows a situation in which a slight period of time has passed after engine stop, so that the quantities of air graphed in FIG. 12B are obtained under conditions where the individual cylinders 12 are approximately at atmospheric pressure. Since the positions and moving directions of the pistons 13 in the compression stroke cylinder 12 and the expansion stroke cylinder 12 are in opposite phase as mentioned above, the quantity of air in one of these cylinders 12 decreases with the piston 13 moving toward TDC when the quantity of air in the other increases with the piston 13 moving toward BDC.

In order to obtain a large amount of combustion energy from the expansion stroke cylinder 12 while obtaining a certain amount of combustion energy form the compression stroke cylinder 12, it would be preferable if it is possible to cause the piston 13 in the expansion stroke cylinder 12 to stop at a position slightly closer to BDC than a midpoint of the expansion stroke, or within a range of 100 degrees to 120 degrees ATDC as indicated by a range R in FIG. 12B, for example. This range R is hereinafter referred to as an appropriate piston stop range.

While there exist a variety of practical control methods for stopping the piston 13 in the expansion stroke cylinder 12 in the appropriate piston stop range R, the engine stop/restart controller 2a of the present embodiment controllably increases or decreases the intake air quantity to achieve this objective mainly by regulating the opening of the throttle valve 23 as will be later described in detail.

FIG. 13 is a time chart showing how the engine is automatically stopped, a horizontal axis representing time t (second) and a vertical axis representing both the engine speed Ne (rpm) and the turbine turning speed Nt (rpm). Now, an outline of engine stop/restart control operation performed by the engine stop/restart controller 2a is described with reference to an engine speed curve 150 and a turbine speed curve 151 shown in FIG. 13. One main purpose of the engine stop/restart control operation is to cut off fuel supply at a point in time t3 after a point in time t0 when idle stop conditions (automatic engine stop conditions) are satisfied, and to cause the piston 13 in the expansion stroke cylinder 12 to stop within the appropriate piston stop range R at a point in time t10 when the engine completely stops as a result of the automatic engine stop control operation. Another main purpose of the engine stop/restart control operation is to restart the engine instantly and smoothly by producing combustion at least in the expansion stroke cylinder 12 as indicated by an engine speed curve 156 when the aforementioned engine restart conditions are satisfied as a result of a subsequent engine restart request entered by depression of the accelerator pedal, for instance, at a point in time t11. Still another main purpose of the engine stop/restart control operation is to restart the engine as soon as possible as indicated by an engine speed curve 155, for instance, if an engine restart request is made between the point in time t0 and the point in time t10. The engine stop/restart control operation will be later discussed in further detail with reference to flowcharts.

Figure 14:
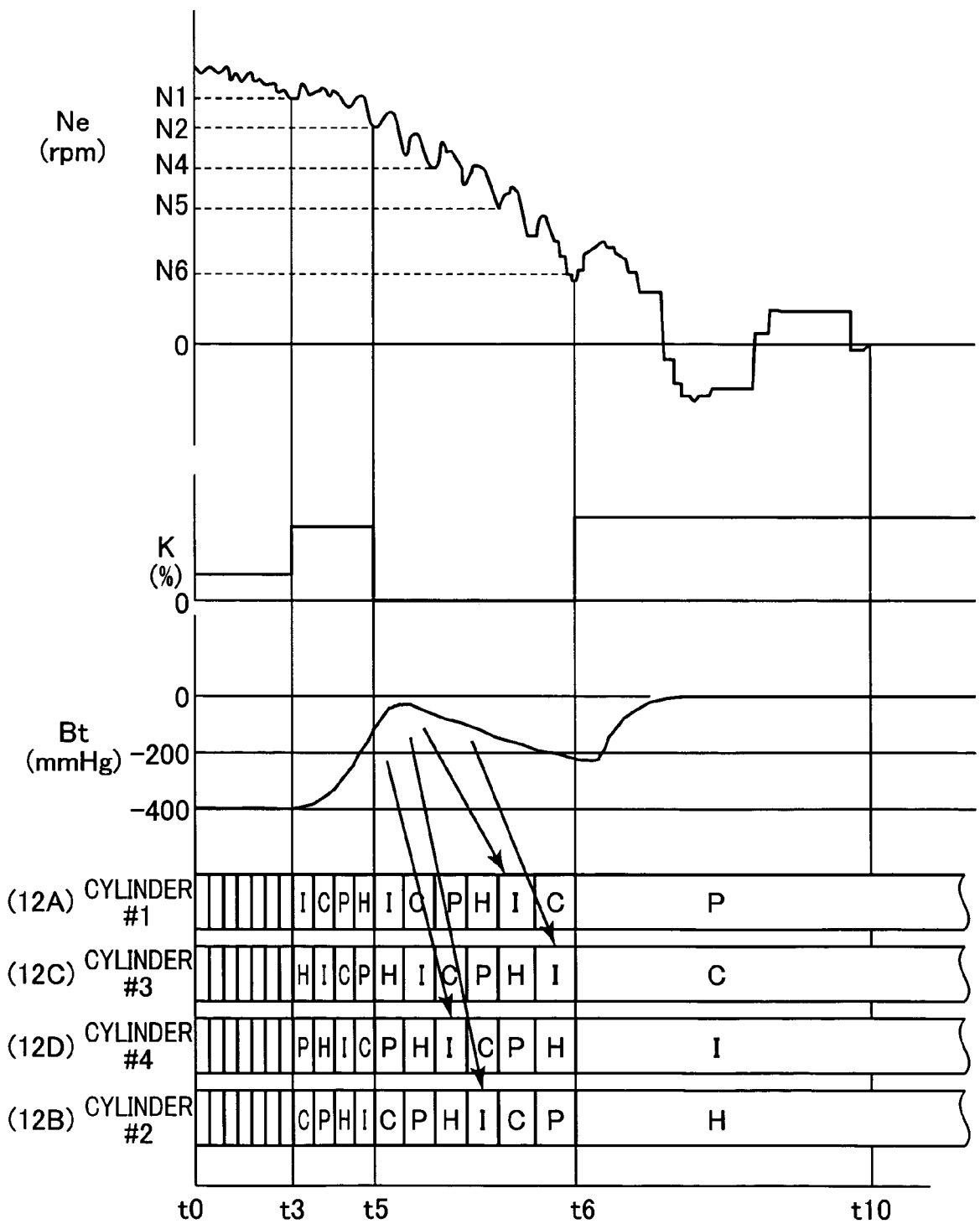
FIG. 14 is a time chart of automatic engine stop control operation, particularly showing how the engine speed, throttle opening and boost pressure vary with time over successive strokes of individual cylinders.

FIG. 14 is a time chart particularly showing details of the automatic engine stop control operation, horizontal axes representing time t (second) and vertical axes representing the engine speed Ne (rpm), throttle opening K (%) and boost pressure Bt (mmHg) over successive strokes of the individual cylinders 12A-12D. As illustrated in FIG. 14, the cylinder 12A is on the expansion stroke when the engine completely stops at the point in time t10. For the convenience of explanation, the following discussion is based on the assumption that the cylinder 12A is the expansion stroke cylinder 12A. Similarly, the cylinder 12C on the compression stroke at complete engine stop is referred to as the compression stroke cylinder 12C, the cylinder 12D on the intake stroke at complete engine stop is referred to as the intake stroke cylinder 12D, and the cylinder 12B on the exhaust stroke at complete engine stop is referred to as the exhaust stroke cylinder 12B in the following discussion.

When the idle stop conditions are satisfied at the point in time t0, the engine stop/restart controller 2a performs a series of prescribed operations (which will be later described) and, then, preparatory operation for fuel cut-off. Specifically, the engine stop/restart controller 2a sets a target engine speed N1 (e.g., N1=860 rpm) of the engine speed Ne and regulates the boost pressure Bt by adjusting the throttle opening K such that the boost pressure Bt matches a specific target value (e.g., −400 to −600 mmHg). At the same time, the engine stop/restart controller 2a retards ignition timing so that the engine speed Ne would not increase excessively. The amount of ignition timing retardation is fed back so that the engine speed Ne becomes equal to the target engine speed N1.

When the engine speed Ne becomes equal to the target engine speed N1 and the boost pressure Bt reaches the aforementioned target value, the engine stop/restart controller 2a judges that conditions for fuel cut-off (fuel cut-off conditions) have been satisfied. Then, the engine stop/restart controller 2a increases the throttle opening K to approximately 30%, for instance, and cuts off fuel injection (point in time t3).

When the fuel injection is interrupted at the point in time t3, kinetic energy possessed by the crankshaft 3 and other elements is consumed by mechanical loss due to frictional resistance and by pumping work of the individual cylinders 12A-12D. Consequently, the crankshaft 3 of the engine stops after turning several times by inertia. In the four-cycle spark ignition engine of the embodiment, the crankshaft 3 stops turning after the pistons 13 have gone through approximately ten successive compression stroke TDCs.

The stop position of the piston 13 in each cylinder 12 is generally determined by a balance between the quantity of air in the expansion stroke cylinder 12A and the quantity of air in the compression stroke cylinder 12C immediately before complete engine stop. Additionally, the stop position of the piston 13 in each cylinder 12 is affected by frictional resistance in the engine as well as by rotational inertia of the engine, or engine speed N6 at a point in time t6 when the piston 13 in the expansion stroke cylinder 12A lastly goes beyond the compression stroke TDC.

Therefore, to cause the piston 13 in the expansion stroke cylinder 12A to stop within the aforementioned appropriate piston stop range R, it is necessary to regulate the quantities of air introduced into the cylinders 12A and 12C while supplying sufficient air into the two cylinders 12A and 12C such that the quantity of air in the expansion stroke cylinder 12A eventually becomes larger than the quantity of air in the compression stroke cylinder 12C.

To achieve this objective, the engine stop/restart controller 2a first sets the throttle opening K at a large value (e.g., approximately 30% of a full throttle position) to increase the boost pressure Bt at the point in time t3 when the fuel supply is cut off. Then, after specific quantities of air have been introduced into the expansion stroke cylinder 12A and the compression stroke cylinder 12C, the engine stop/restart controller 2a decreases the throttle opening K to regulate the quantities of air introduced into the two cylinders 12A and 12C as stated above at a point in time t5 when it is verified that the engine speed Ne has dropped to a preset reference engine speed N2 (e.g., approximately 790 rpm).

The inventors conducted experiments in which the fuel injection was interrupted at the point in time t3 when the engine speed Ne became equal to the target engine speed N1, and the throttle valve 23 was subsequently held at the full throttle position for a specific period of time. Under such conditions, the inventors measured TDC engine speed ne, which is the engine speed measured when any of the pistons 13 in the cylinders 12A-12D moving by inertia just goes beyond the compression stroke TDC, and examined the stop position of the piston 13 in the expansion stroke cylinder 12A at a point of engine stop. Results of these experiments indicate that the stop position of the piston 13 in the expansion stroke cylinder 12A lies in the appropriate piston stop range R (FIG. 12B) if TDC engine speeds ne measured at points of sixth to second TDCs preceding the point of engine stop fall within particular ranges which are shown by hatching in FIG. 15.

Figure 15:
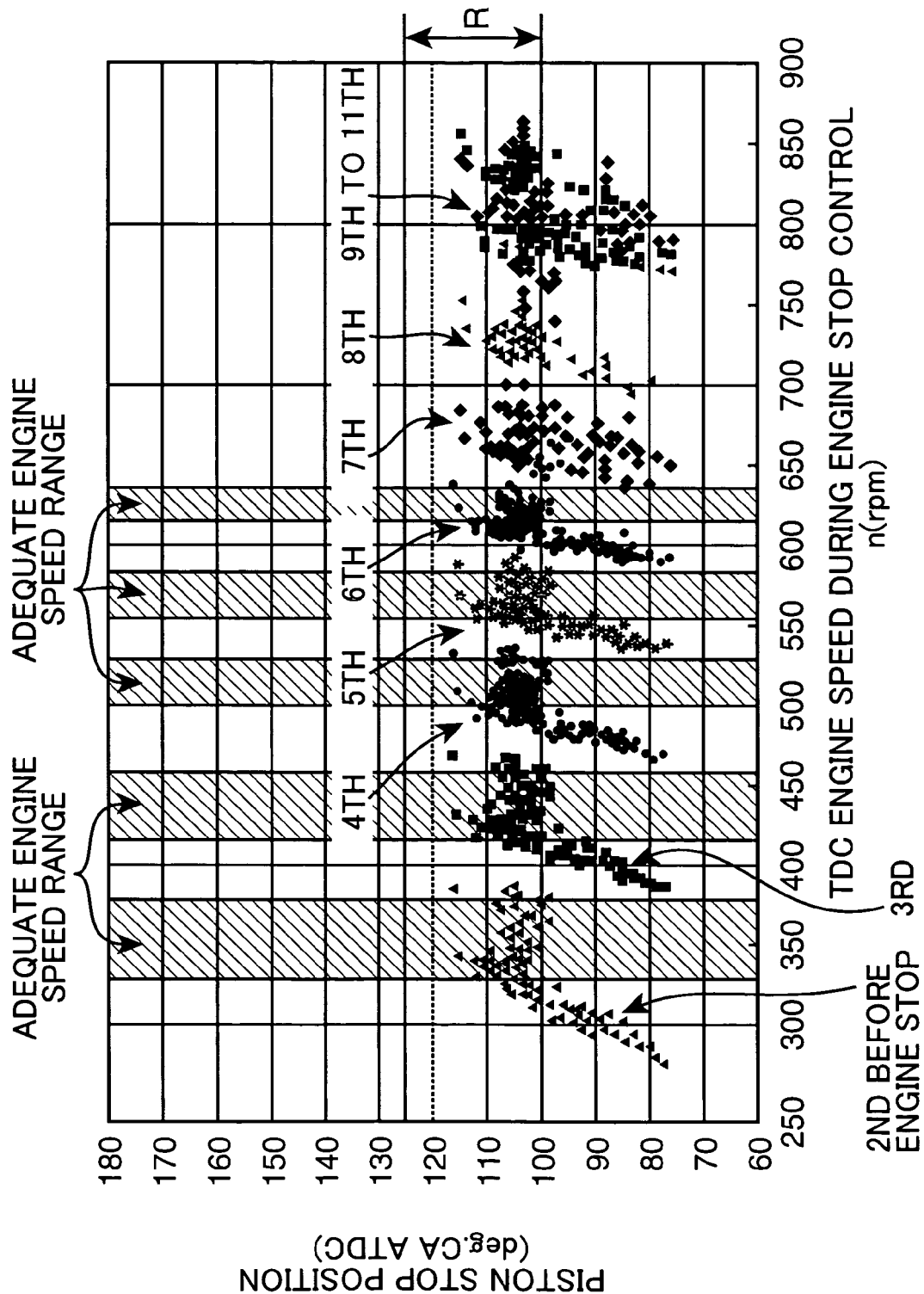
FIG. 15 is a distribution chart showing how the engine speed during the process of automatic engine stop is correlated with piston stop positions at complete engine stop.

To ensure that the piston 13 in the expansion stroke cylinder 12A eventually stops in the appropriate piston stop range R, the engine speed Ne should be controlled to decrease such that the TDC engine speed ne falls within the aforementioned particular ranges hatched in FIG. 15 at the points of the sixth to second TDCs preceding the point of engine stop. It is therefore preferable to preclude any disturbances to the crankshaft 3 as much as possible during the process of automatic engine stop for performing such delicate control operation.

Under such circumstances, the engine stop/restart controller 2a of the ECU 2 of the present embodiment shifts the automatic transmission 50 from the drive condition in the D range to the neutral condition in the special mode M before the point in time t3 when the fuel supply is cut off to substantially isolate the crankshaft 3 from any influence from a driving wheel side during the engine stop control operation. This approach of the embodiment makes it possible to stop the pistons 13 at desired positions with higher precision by the engine stop control operation and thereby achieve improved engine restartability. Since the engine stop/restart controller 2a of the ECU 2 controls the engine to stop the piston 13 in the expansion stroke cylinder 12A within the aforementioned appropriate piston stop range R with high accuracy even when the vehicle is running, it is possible to execute automatic engine stop more often whenever desired. This allows more reductions in fuel consumption and $CO_2$ emissions.

Additionally, the engine stop/restart controller 2a of the ECU 2 controls a load exerted on the crankshaft 3 such that the TDC engine speed ne successively falls within the aforementioned particular ranges shown by hatching in FIG. 15. Specifically, the load exerted on the crankshaft 3 is controlled by properly increasing and/or decreasing the amount of electric power generated by the alternator 28.

As the engine speed Ne gradually decreases after the point in time t3 when the fuel supply was cut off, the engine stop/restart controller 2a successively reads out the TDC engine speed ne. At the point in time t6 when the TDC engine speed ne becomes lower than the engine speed N6, which is referred to also as last TDC judgment threshold N6 (set at N6=260 rpm, for example), the engine stop/restart controller 2a judges that the piston 13 in the expansion stroke cylinder 12A is at the last compression stroke TDC (last TDC). While the pistons 13 in the individual cylinders 12A-12D slightly move even after the point in time t6, none of the pistons 13 goes into further strokes beyond a succeeding TDC or BDC.

Although not mentioned in the later discussed flowcharts, the throttle opening K may be increased again after the point in time t6 as illustrated. If the throttle opening K is re-increased, the boost pressure Bt increases, so that flow resistance of intake air into the intake stroke cylinder 12D decreases, resulting in a reduction in the load exerted on the crankshaft 3. This allows the pistons 13 in the expansion stroke cylinder 12A and the compression stroke cylinder 12C to move smoothly and, as a consequence, it becomes easier to cause the piston 13 in the expansion stroke cylinder 12A to stop within the appropriate piston stop range R. Since none of the pistons 13 in the individual cylinders 12A-12D goes into further strokes after the point in time t6 as mentioned above, the intake valves 19 in the expansion stroke cylinder 12A and the compression stroke cylinder 12C do not open any longer. Therefore, even if the boost pressure Bt is increased, there occurs no change in the already well-balanced quantities of air in the expansion stroke cylinder 12A and the compression stroke cylinder 12C.

After the point in time t6, the pistons 13 in the individual cylinders 12A-12D move up and down several times and stop completely at the point in time t10. The engine stop/restart controller 2a monitors the behavior of the pistons 13 during a period from the point in time t6 (last TDC) to the point in time t10 (engine stop) using the crank angle signals CA1, CA2 fed from the crank angle sensors 30, 31 and detects stop positions of the pistons 13.

Figure 16:
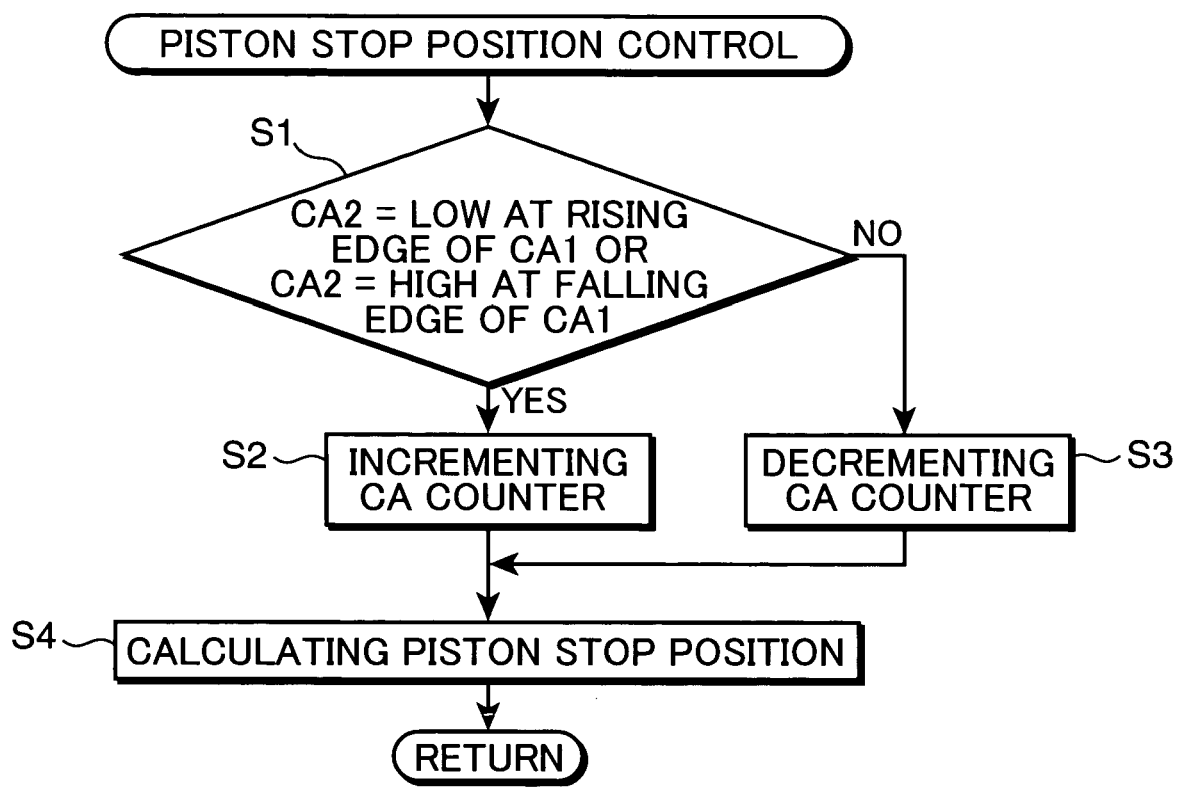
FIG. 16 is a flowchart showing a piston stop position detecting routine for detecting the stop position of the piston in an expansion stroke cylinder.

FIG. 16 is a flowchart showing a piston stop position detecting routine for detecting the stop position of the piston 13 in the expansion stroke cylinder 12A. Upon commencement of the piston stop position detecting routine, the engine stop/restart controller 2a first judges, based on the first crank angle signal CA1 fed from the first crank angle sensor 30 and the second crank angle signal CA2 fed from the second crank angle sensor 31, whether the second crank angle signal CA2 is Low at each rising edge of the first crank angle signal CA1 (High at each falling edge of the first crank angle signal CA1) in step S1. In other words, the engine stop/restart controller 2a judges whether the first and second crank angle signals CA1, CA2 are phase-offset as shown in FIG. 17A indicating that the engine is running in a forward direction or the first and second crank angle signals CA1, CA2 are phase-offset as shown in FIG. 17B indicating that the engine is running in a reverse direction in step S1.

Figure 17A:
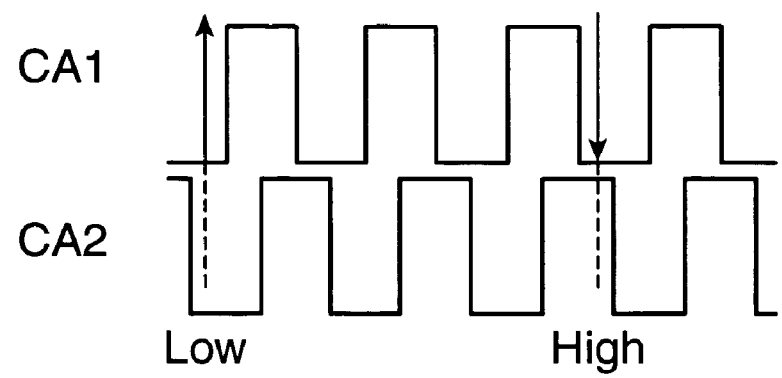
FIGS. 17A and 17B are diagrams showing how crank angle signals output from a pair of crank angle sensors are related in phase, FIG. 17A showing a phase relation observed when the engine runs in a forward direction, and FIG. 17B showing a phase relation observed when the engine runs in a reverse direction.
Figure 17B:
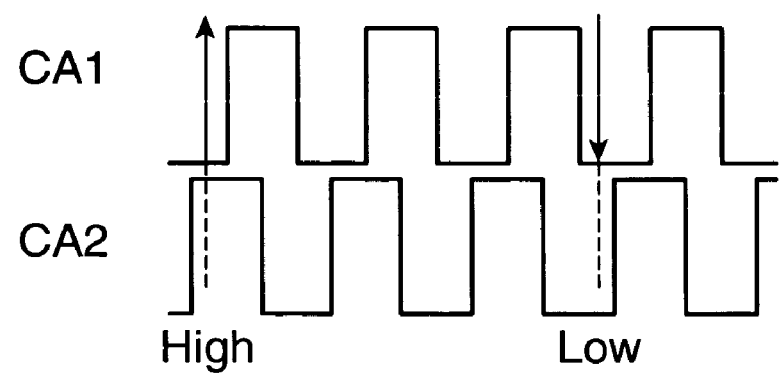

More specifically, when the engine runs in the forward direction, the second crank angle signal CA2 lags the first crank angle signal CA1 in phase by about half a pulselength and, therefore, the second crank angle signal CA2 becomes Low at the rising edge of each successive pulse of the first crank angle signal CA1 and High at the falling edge of each successive pulse of the first crank angle signal CA1 as shown in FIG. 17A. When the engine runs in the reverse direction, on the contrary, the second crank angle signal CA2 leads the first crank angle signal CA1 in phase by about half the pulselength and, therefore, the second crank angle signal CA2 becomes High at the rising edge of each successive pulse of the first crank angle signal CA1 and Low at the falling edge of each successive pulse of the first crank angle signal CA1 as shown in FIG. 17B.

If the judgment result in step S1 is in the affirmative, the engine stop/restart controller 2a increments a count value of a crank angle counter for measuring changes in the crank angle (step S2). If the judgment result in step S1 is in the negative, on the contrary, the engine stop/restart controller 2a decrements the count value of the crank angle counter (step S3). Upon completing the process of automatic engine stop, the engine stop/restart controller 2a determines, or calculates, the stop position of the piston 13 in the expansion stroke cylinder 12A from the count value of the crank angle counter (step S4).

Now, the engine stop/restart control operation performed by the engine stop/restart controller 2a is described in detail together with the working of the automatic transmission 50 with reference to the flowcharts shown in the accompanying drawings. The following discussion includes a description of a case where an engine restart request is made before the engine completely stops.

Figure 18:
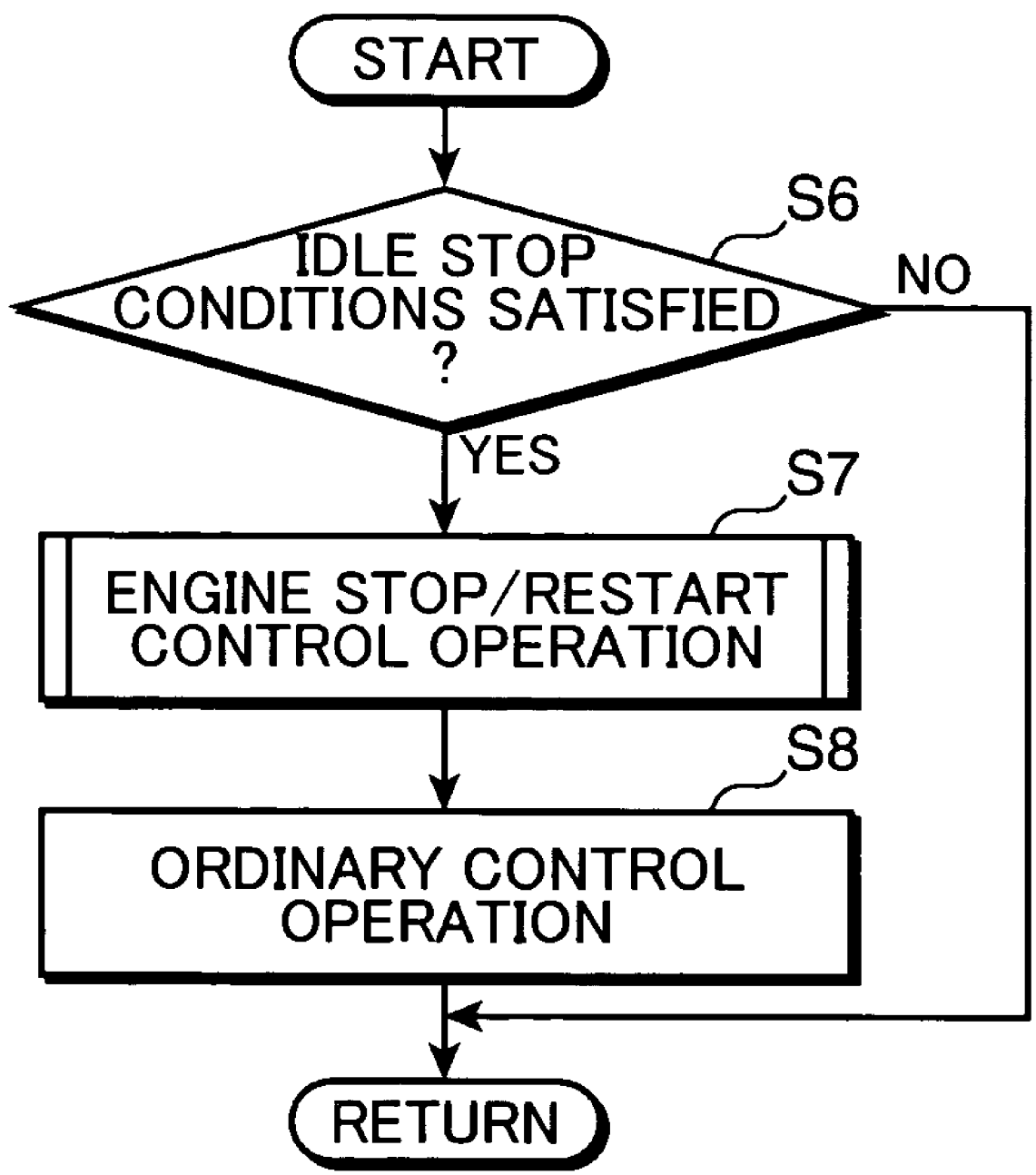
FIG. 18 is a flowchart generally showing a main routine including engine stop/restart control operation performed by an engine stop/restart controller of the first embodiment (applied also to second and third embodiments)

FIG. 18 is a flowchart generally showing a main routine including an engine stop/restart control operation subroutine performed by the engine stop/restart controller 2a.

Upon commencement of the main routine of FIG. 18, the engine stop/restart controller 2a judges whether the idle stop conditions (automatic engine stop conditions) have been satisfied during execution of ordinary control operation based on the sensing signals fed from the earlier-mentioned various sensors (step S6). For example, the engine stop/restart controller 2a judges that the idle stop conditions have been satisfied at fulfillment of all such conditions as the accelerator pedal is released, the brake pedal is depressed, the vehicle speed is 19 km/h or less (including zero speed), steering angle is equal to or smaller than a specific value, turn signals are all off, battery voltage is equal to or higher than a specific value, temperature in an engine room is 10 degrees Centigrade or less (as measured near the battery) and ATF temperature is 40 degrees Centigrade or above.

If the judgment result in step S6 is in the affirmative, the engine stop/restart controller 2a proceeds to step S7 and performs the engine stop/restart control operation subroutine which will be later described in great detail. Briefly stated, the engine stop/restart control operation subroutine includes the earlier-mentioned automatic engine stop control operation for automatically stopping the engine by interrupting the fuel supply necessary for continued engine operation and engine restart control operation for automatically restarting the engine by producing combustion at least in the expansion stroke cylinder 12A when the engine restart conditions are satisfied after automatic engine stop. After executing the engine stop/restart control operation subroutine, the engine stop/restart controller 2a proceeds to step S8 to resume the ordinary control operation. If the judgment result in step S6 is in the negative, the engine stop/restart controller 2a directly returns to the ordinary control operation.

Figure 19:
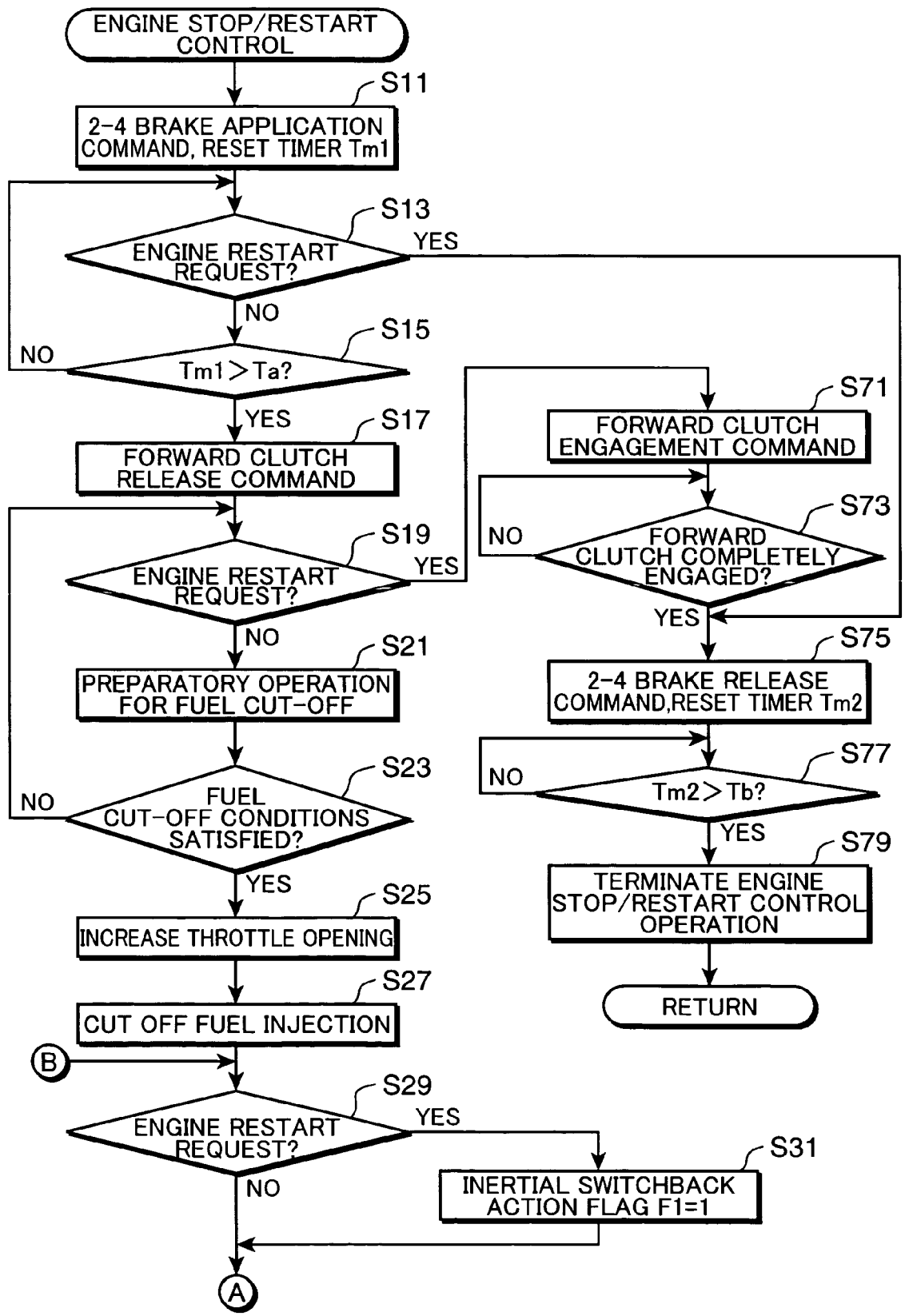
FIG. 19 is a flowchart showing a first part of an engine stop/restart control operation subroutine executed in step S7 of FIG. 18 in the first embodiment (applied also to the second and third embodiments)
Figure 20:
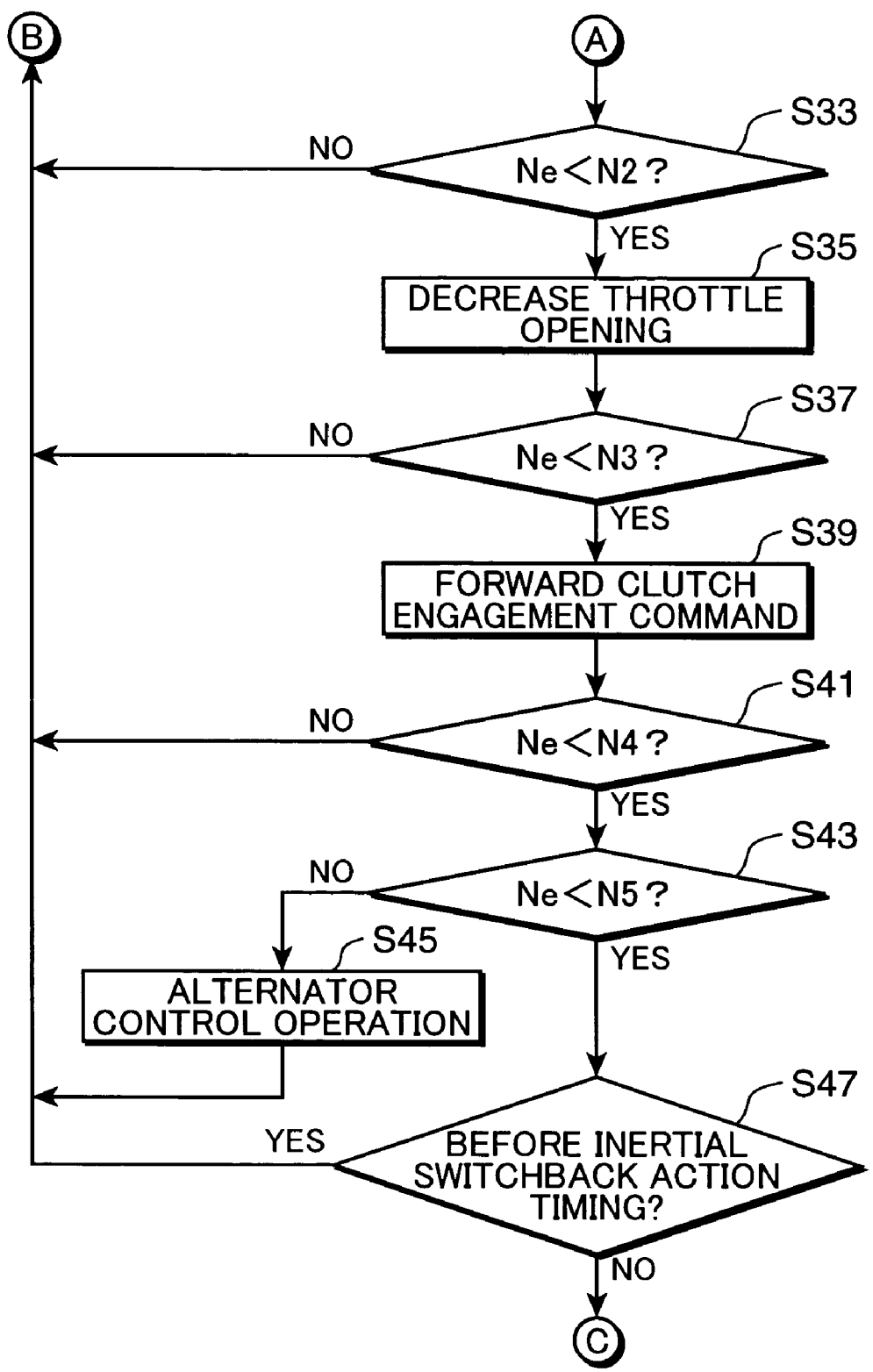
FIG. 20 is a flowchart which follows FIG. 19 showing a second part of the engine stop/restart control operation subroutine performed in the first embodiment.
Figure 21:
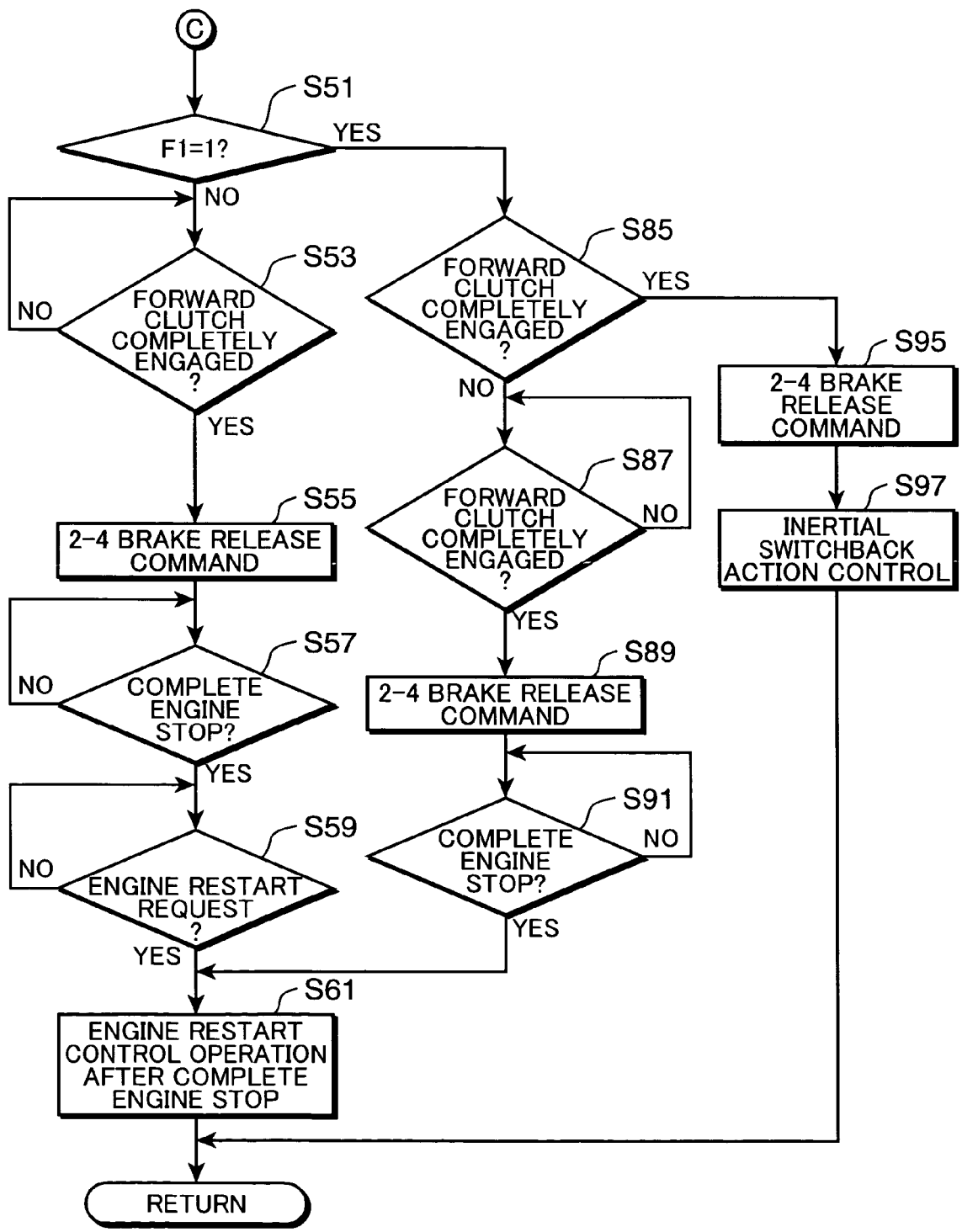
FIG. 21 is a flowchart which follows FIG. 20 showing a third part of the engine stop/restart control operation subroutine performed in the first embodiment.

FIGS. 19 to 21 are flowcharts together showing the engine stop/restart control operation subroutine executed in step S7 of FIG. 18. In the following discussion, already described parts of the automatic engine stop control operation will not be explained again as appropriate. Also, the points in time t0 through t11 mentioned in the following discussion correspond to those shown in FIGS. 13 and 14.

For the sake of simplicity in the following discussion, it is assumed that the automatic transmission 50 is in the first gear when the idle stop conditions (automatic engine stop conditions) are satisfied.

When the idle stop conditions are satisfied and the engine stop/restart controller 2a begins to execute the engine stop/restart control operation subroutine (point in time t0), the engine stop/restart controller 2a causes the automatic transmission 50 to shift to the special mode M. Specifically, the engine stop/restart controller 2a issues a 2-4 brake application command and resets a timer Tm1 (step S11). Next, the engine stop/restart controller 2a judges whether an engine restart request has been made (step S13). To be more specific, the engine stop/restart controller 2a judges that the engine restart request has been made when the predefined engine restart conditions (for example, fulfillment of at least one of such conditions as the accelerator pedal is depressed, the brake pedal is released and the battery voltage is lower than the specific value) have been satisfied.

If the judgment result in step S13 is in the negative indicating that there has been made no engine restart request, the engine stop/restart controller 2a proceeds to step S15 to judge whether the timer Tm1 has reached a first preset time count Ta (set at Ta=0.3 s, for example). If the judgment result in step S15 is in the negative, the engine stop/restart controller 2a returns to step S13. If the judgment result in step S15 is in the affirmative indicating that the preset time count Ta has elapsed after the 2-4 brake application command, the engine stop/restart controller 2a issues a forward clutch release command to the automatic transmission 50 in step S17 (point in time t1). Upon receiving this command, the automatic transmission 50 releases the forward clutch 67 (point in time t2). When the forward clutch 67 is released, the turbine turning speed Nt increases (approaches the engine speed Ne) as shown in FIG. 13. The aforementioned time count Ta defines a time lag which is set to ensure that the forward clutch 67 is completely released after the 2-4 brake 70 has been completely applied.

As a result, the automatic transmission 50 is shifted to the special mode M in which the forward clutch 67 is released and the 2-4 brake 70 is applied. As previously mentioned, the automatic transmission 50 is set to the neutral condition when shifted to the special mode M. Therefore, disturbances to the engine from the driving wheel side are substantially interrupted from the point in time t2 onward, thus allowing execution of the automatic engine stop control operation in a stable fashion.

In step S19, the engine stop/restart controller 2a judges again whether an engine restart request has been made as in step S13. If the judgment result in step S19 is in the negative, the engine stop/restart controller 2a proceeds to step S21 to carry out the earlier-described preparatory operation for fuel cut-off. Specifically, the engine stop/restart controller 2a sets the target engine speed N1 of the engine speed Ne and regulates the boost pressure Bt by adjusting the throttle opening K such that the boost pressure Bt matches the aforementioned specific target value. At the same time, the engine stop/restart controller 2a retards the ignition timing.

The engine stop/restart controller 2a judges that the fuel cut-off conditions have been satisfied when the engine speed Ne becomes equal to the target engine speed N1 and the boost pressure Bt reaches the aforementioned target value (Yes in step S23 at the point in time t3). When the fuel cut-off conditions have been satisfied, the engine stop/restart controller 2a increases the throttle opening K in step S25 and cuts off fuel injection in step S27.

In succeeding step S29, the engine stop/restart controller 2a judges again whether an engine restart request has been made as in step S13. If the judgment result in step S29 is in the affirmative, the engine stop/restart controller 2a sets an inertial switchback action flag F1 (of which default value is "0") to "1" in step S31. Here, "inertial switchback action" refers to a back-and-forth motion of the engine produced immediately before engine stop. The engine starting system of the embodiment enables the engine to restart smoothly by using inertia produced when the engine once reversed resumes forward running if the engine restart request is made before complete engine stop as shown by the engine speed curve 155 in FIG. 13. If the inertial switchback action flag F1 is set to "1," the engine can restart successfully by using the inertial switchback action in the subsequent engine restart control operation except in a few exceptional cases.

In step S33 of FIG. 20 which follows step S29 or step S31 of FIG. 19, the engine stop/restart controller 2a judges whether the engine speed Ne has dropped to the reference engine speed N2 (preset to approximately 790 rpm). If the engine speed Ne is judged to have dropped to the preset reference engine speed N2 in step S33 (point in time t5), the engine stop/restart controller 2a decreases the opening K of the throttle valve 23 in step S35.

Next, the engine stop/restart controller 2a judges whether the engine speed Ne has dropped to an N-D shift engine speed N3 (preset to approximately 750 rpm) in step S37. At a point in time t4 when the engine speed Ne is judged to have dropped to the preset N-D shift engine speed N3 in step S37, the engine stop/restart controller 2a performs special clutch engagement control operation. Specifically, the engine stop/restart controller 2a issues a forward clutch engagement command to the automatic transmission 50 which is currently in the special mode M in step S39 to engage the forward clutch 67.

When the engine stop/restart controller 2a initiates the special clutch engagement control operation, the forward clutch 67 begins to engage. In carrying out the special clutch engagement control operation, the engine stop/restart controller 2a aims to control the automatic transmission 50 in such a fashion that the forward clutch 67 begins to substantially engage at a point in time t7 (or substantial engagement starting point when the forward clutch 67 begins to transmit engine torque in actuality) set at or after the point in time t6 of the last TDC and to complete engagement during a period of initial engine reversing (or at an engagement ending point) between a point in time t8 and a point in time t9 shown in FIG. 13. The aforementioned N-D shift engine speed N3 is preset to a value which has already been verified from experimental results, for instance, as being suitable for achieving the above aim of the special clutch engagement control operation with respect to the engagement starting point and the engagement ending point. Generally, the period of time required for engagement of the forward clutch 67 more or less varies with the ATF temperature. Thus, in carrying out the special clutch engagement control operation, the engine stop/restart controller 2a may detect the ATF temperature based on the sensing signal of fed from the transmission fluid temperature sensor 37, for instance, and adjust the N-D shift engine speed N3 according to the ATF temperature.

When the forward clutch 67 is engaged by the special clutch engagement control operation, the automatic transmission 50 is shifted from the neutral condition to the drive condition (second gear in the present embodiment). This transmission shifting from the neutral condition to the drive condition differs from an ordinary N-D shift in that the forward clutch 67 is engaged under conditions where the automatic transmission 50 is in the special mode M. As previously mentioned, it possible to reduce the amount of energy absorbed by the forward clutch 67 at clutch engagement, and thus the clutch engagement time, if the forward clutch 67 is engaged when the automatic transmission 50 is in the special mode M. The aforementioned special clutch engagement control operation of the embodiment is therefore advantageous for quick engine restart as well as for reducing the N-D shock, or abrupt torque variations at the N-D shift.

If the substantial engagement starting point of the forward clutch 67 is set at or after the point in time t6 of the last TDC as mentioned above, it is possible to keep the automatic transmission 50 in the neutral condition during a period preceding the point in time t6 when it is particularly desirable to preclude disturbances to the crankshaft 3 in the process of automatic engine stop. This enables more stable execution of the automatic engine stop control operation.

Reverting to the flowchart of FIG. 20, the engine stop/restart controller 2a judges after step S39 whether the engine speed Ne has dropped to a specific engine speed N4 (Ne<N4) in step S41 and to a specific engine speed N5 (Ne<N5) in step S43. As an example, the specific engine speed N4 and the specific engine speed N5 are set to 650 rpm and 400 rpm (N4=650 rpm, N5=400 rpm), respectively. If N4>Ne>N5 (Yes in step S41 and No in step S43), the engine stop/restart controller 2a executes alternator control operation in step S45.

The alternator control operation performed by the engine stop/restart controller 2a is intended to increase and/or decrease the amount of electric power generated by the alternator 28 by properly controlling the regulator circuit 28a. By increasing and/or decreasing the amount of electric power generated by the alternator 28, the engine stop/restart controller 2a regulates the load exerted on the crankshaft 3. This in effect permits the engine stop/restart controller 2a to adjust engine deceleration, or the rate of reduction in the engine speed Ne. Specifically, the engine stop/restart controller 2a increases and/or decreases the amount of electric power generated by the alternator 28 such that the engine speed Ne drops along a predefined deceleration pattern as previously discussed with reference to FIG. 15. The engine stop/restart controller 2a enables the piston 13 in the expansion stroke cylinder 12A to eventually stop within the earlier-mentioned appropriate piston stop range R (FIG. 12B) with higher probability by performing the alternator control operation as discussed above.

When the engine speed Ne becomes lower than the specific engine speed N5 (Yes in step S43, or Ne<N5), the engine stop/restart controller 2a completes the alternator control operation and proceeds to step S47.

In step S47, the engine stop/restart controller 2a judges whether the engine is still before a timing for producing the aforementioned inertial switchback action (inertial switchback action timing). The inertial switchback action timing may be regarded as a timing at which the engine stop/restart controller 2a judges whether the engine is ready to produce the inertial switchback action or as a timing at which the engine stop/restart controller 2a causes the engine to produce the inertial switchback action when the engine is ready to produce the inertial switchback action. In this embodiment, the inertial switchback action timing is set at the point in time t9 when the engine completes initial reversing motion immediately before engine stop or at a point immediately preceding the point in time t9.

If it is judged that the engine is before the inertial switchback action timing t9 (Yes in step S47), the engine stop/restart controller 2a returns to step S29 of FIG. 19 and reexecutes steps S29 through step S47. Similarly, if the judgment result in step S33, S37, S41 or S43 is in the negative (the alternator control operation is in progress), the engine stop/restart controller 2a returns to step S29 of FIG. 19 and reexecutes steps S29 through step S47. If the engine restart request is made (Yes in step S29) during this cyclical operation, the engine stop/restart controller 2a sets the inertial switchback action flag F1 to "1" in step S31.

If the inertial switchback action timing t9 is reached and the judgment result in step S47 is in the negative, the engine stop/restart controller 2a proceeds to step S51 of FIG. 21 and judges whether the inertial switchback action flag F1 is set to "1" or not. If the inertial switchback action flag F1 is not "1" (No in step S51), the engine stop/restart controller 2a does not cause the engine to produce the inertial switchback action because the engine restart request has not been made yet.

In succeeding step S53, the engine stop/restart controller 2a judges whether the forward clutch 67 has been completely engaged. Specifically, the engine stop/restart controller 2a judges that the forward clutch 67 has been completely engaged if the turbine turning speed Nt has a value corresponding to the current vehicle speed and gear shift position. As already mentioned, the automatic transmission 50 is shifted to the second gear when the forward clutch 67 is engaged by the special clutch engagement control operation in this embodiment. The turbine turning speed Nt is proportional to the vehicle speed and a constant of this proportionality is uniquely determined by such parameters as tire diameter and second gear ratio. Therefore, the engine stop/restart controller 2a can judge that the forward clutch 67 has been completely engaged if the turbine turning speed Nt has reached the value corresponding to the current vehicle speed and gear shift position. In the present embodiment, the engine stop/restart controller 2a judges that the forward clutch 67 has been completely engaged when the turbine turning speed Nt is 0 rpm at a vehicle speed of 0 km/h (at reset) and when the turbine turning speed Nt is approximately 560 rpm at a vehicle speed of 10 km/h, for example.

If it is difficult for the engine stop/restart controller 2a to judge whether the forward clutch 67 has been completely engaged in a way described above, the embodiment may be modified to use a different judgment criterion or method. For example, the engine stop/restart controller 2a may judge that the forward clutch 67 has been completely engaged when a specific period of time (e.g., 0.4 second) has elapsed after the forward clutch release command was issued.

The above method of judging completion of engagement of the forward clutch 67 discussed in step S53 is similarly applied to other steps (steps S73, S85 and S87) which will be described in the following.

If the forward clutch 67 is judged to have been completely engaged (Yes in step S53), the engine stop/restart controller 2a immediately issues a 2-4 brake release command to release the 2-4 brake 70 in step S55. If the forward clutch 67 is judged to have not been completely engaged (No in step S53), the engine stop/restart controller 2a waits until the forward clutch 67 performs the same operation in step S55. When the 2-4 brake 70 is completely released, the automatic transmission 50 is shifted to the first gear in which only the forward clutch 67 is engaged.

After step S55, the engine stop/restart controller 2a waits until the engine completely stops (Yes in step S57) and then the engine stop/restart controller 2a waits for an engine restart request in step S59. At a point in time when the engine restart request is made (Yes in step S59), the engine stop/restart controller 2a executes engine restart control operation to be performed after complete engine stop in step S61 as shown by the engine speed curve 156 in FIG. 13.

Here, the engine restart control operation (step S61) to be performed after complete engine stop is described with reference to time charts of FIGS. 22 and 23. In this connection, it is to be noted that the invention is not limited to the engine restart control operation depicted in FIGS. 22 and 23 but may employ another type of engine restart control operation which is known in the prior art.

Figure 22:
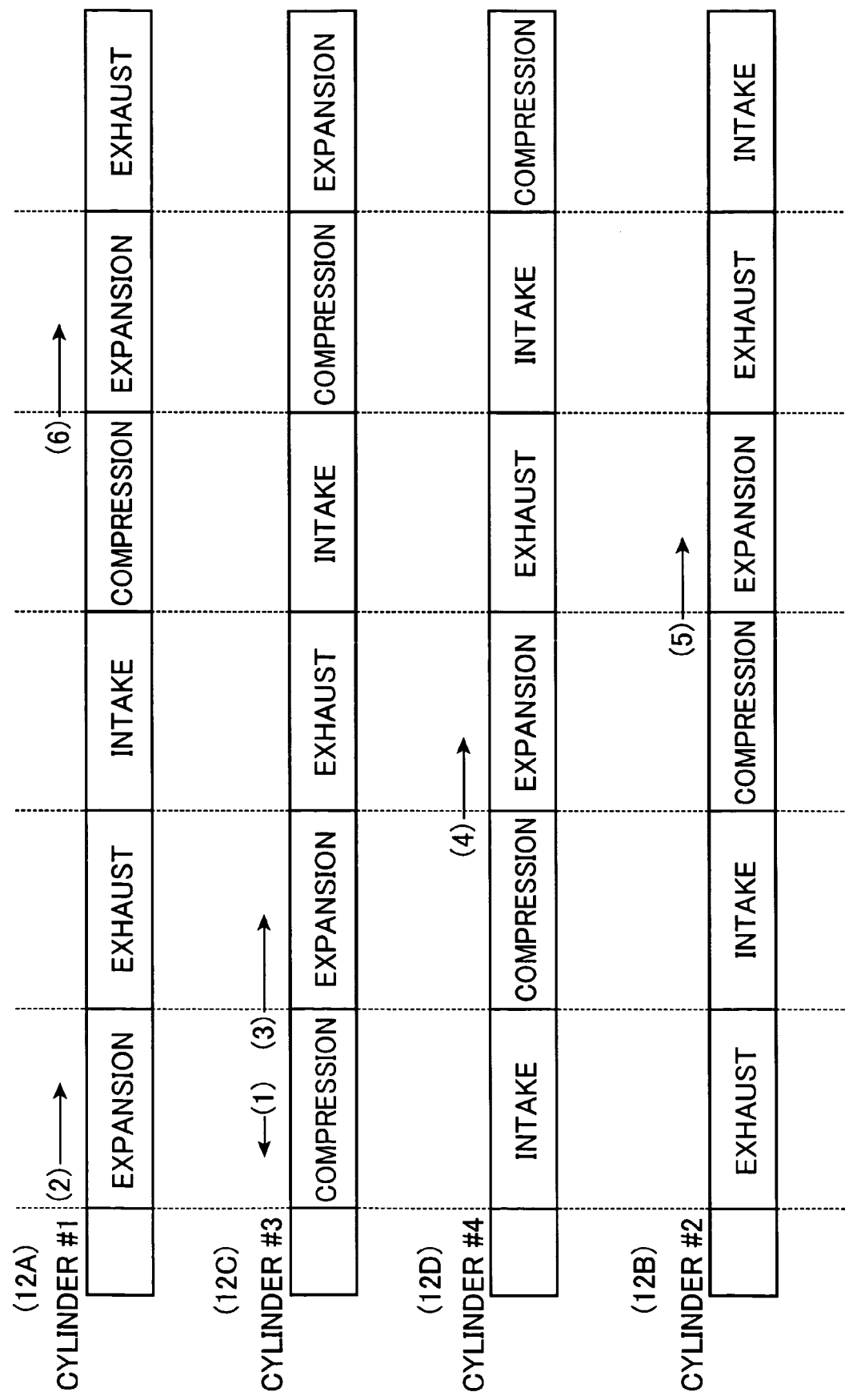
FIG. 22 is a time chart showing a sequence of combustion cycles performed during engine restart.
Figure 23:
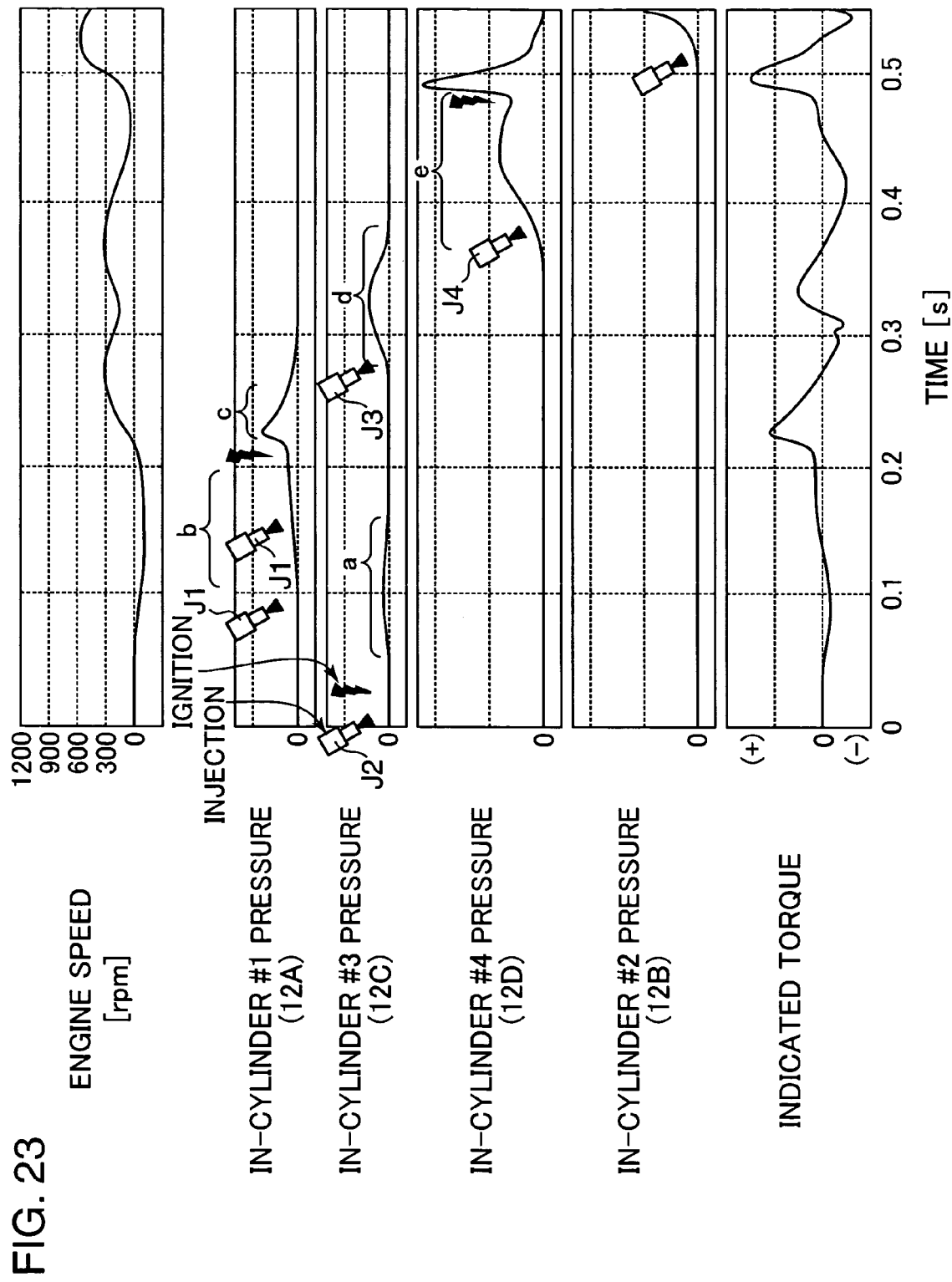
FIG. 23 is a time chart showing how the engine works, including variations in engine speed with time, during engine restart.

Referring to FIGS. 22 and 23, the engine stop/restart controller 2a first causes the fuel injector 16 of the compression stroke cylinder (third cylinder) 12C to inject the fuel thereinto (initial fuel injection J2) and then causes the spark plug 15 of the same cylinder 12C to ignite a mixture produced therein as marked by (1) in FIG. 22. With the aid of combustion pressure (part "a" shown in FIG. 23) produced by this combustion (1), the piston 13 in the compression stroke cylinder 12C is forced down toward BDC, causing the engine to run in the reverse direction.

Consequently, the piston 13 in the expansion stroke cylinder (first cylinder) 12A begins to move upward toward TDC. When the piston 13 in the expansion stroke cylinder 12A moves upward, air in the expansion stroke cylinder 12A is compressed. At a point in time when the piston 13 in the expansion stroke cylinder 12A has approached TDC (preferably, closer to TDC than a mid-stroke position), compressing the air in the cylinder 12A, the engine stop/restart controller 2a causes the fuel injector 16 of the cylinder 12A to inject the fuel thereinto (fuel injection J1). The fuel injected into the expansion stroke cylinder 12A serves to reduce compressive force in the cylinder 12A due to latent heat absorption. As a result, the piston 13 in the expansion stroke cylinder 12A approaches further toward TDC, so that the density of the compressed air (mixture) in the cylinder 12A increases (part "b" shown in FIG. 23).

At a point in time when the piston 13 in the expansion stroke cylinder 12A has sufficiently approached TDC, the engine stop/restart controller 2a causes the spark plug 15 of the same cylinder 12A to ignite the mixture produced therein to cause combustion marked by (2) in FIG. 22, thereby driving the engine to run in the forward direction with combustion pressure produced in the expansion stroke cylinder 12A (part "c" shown in FIG. 23).

Subsequently, the engine stop/restart controller 2a causes the fuel injector 16 of the compression stroke cylinder 12C to inject the fuel thereinto with proper timing marked by (3) in FIG. 22 (fuel injection J3) to produce a mixture of an air-fuel ratio lower than an air-fuel ratio which can produce combustion. Although the fuel thus injected into the compression stroke cylinder 12C is not combusted in this cylinder 12C, the injected fuel serves to reduce compressive force in the compression stroke cylinder 12C due to latent heat absorption (part "d" shown in FIG. 23). As a consequence, the amount of initial combustion energy of the expansion stroke cylinder 12A consumed by the piston 13 in the compression stroke cylinder 12C for going beyond a first compression stroke TDC after the beginning of the engine restart control operation is decreased.

Furthermore, since timing of fuel injection J4 into the intake stroke cylinder 12D in which next combustion will be made is set at a proper point marked by (4) in FIG. 22 in the middle part of the compression stroke or later, for instance, the point (4) being appropriate for reducing in-cylinder temperature and compressive force by latent heat absorption, it is possible to prevent autoignition (spontaneous combustion) on the compression stroke (before the compression stroke TDC) of the intake stroke cylinder 12D. Also, since ignition timing for the intake stroke cylinder 12D is set at a point corresponding to the compression stroke TDC or later (part "e" shown in FIG. 23), it is possible to prevent combustion in the intake stroke cylinder 12D before the compression stroke TDC. Since the fuel injection J4 into the intake stroke cylinder 12D serves to reduce the compressive force and a mixture produced in the same cylinder 12D is not combusted before the compression stroke TDC, it is possible to prevent the initial combustion energy of the expansion stroke cylinder 12A from being consumed by the piston 13 in the intake stroke cylinder 12D for going beyond a second compression stroke TDC after the beginning of the engine restart control operation.

It will be understood from above that the pistons 13 in the compression stroke cylinder 12C and the intake stroke cylinder 12D can go beyond the first and second compression stroke TDCs after the beginning of the engine restart control operation, respectively, by using the energy produced by the initial combustion in the expansion stroke cylinder 12A marked by (2) in FIG. 22. This feature of the embodiment serves to ensure smooth and reliable engine restart. Upon completion of the above-described engine restart control operation (step S61), the engine returns to normal operating conditions.

The foregoing discussion of the flowcharts of FIGS. 19 to 21 has been confined to a case where no engine restart request is made until the engine completely stops and the engine is restarted in accordance with an engine restart request made after complete engine stop. The following discussion deals with cases where the engine restart request is made before the engine completely stops.

Firstly, a case where it is judged that an engine restart request has been made in step S13 is discussed. This situation occurs when the engine restart request is made during a period 161 shown in FIG. 13. Since the 2-4 brake 70 has just begun to apply in this case, the engine stop/restart controller 2a immediately interrupts application of the 2-4 brake 70 and resumes the ordinary control operation.

Specifically, the engine stop/restart controller 2a issues a 2-4 brake release command and resets a timer Tm2 in step S75. Next, the engine stop/restart controller 2a judges whether the timer Tm2 has reached a second preset time count Tb (set at Tb=0.2 s, for example) in step S77. If the judgment result in step S77 is in the affirmative indicating that the preset time count Tb has elapsed after the 2-4 brake release command, the engine stop/restart controller 2a proceeds to step S79 to terminate the engine stop/restart control operation and return to the ordinary control operation. The time count Tb defines a period of time which would be required for releasing the 2-4 brake 70. For example, this period of time is experimentally determined and preset as the time count Tb.

Secondly, a case where it is judged that an engine restart request has been made in step S19 is discussed. This situation occurs when the engine restart request is made during a period 162 shown in FIG. 13. Since the 2-4 brake 70 has begun to apply and the forward clutch 67 has begun to disengage in this case, the engine stop/restart controller 2a immediately interrupts application of the 2-4 brake 70 and the forward clutch 67 and resumes the ordinary control operation.

Specifically, the engine stop/restart controller 2a issues a forward clutch engagement command to engage the forward clutch 67 in step S71. When the forward clutch 67 has been completely engaged (Yes in step S73), the engine stop/restart controller 2a proceeds to step S75. Thereafter, the engine stop/restart controller 2a performs the same operations as in the case where it is judged that the engine restart request has been made in step S13.

Thirdly, a case where it is judged that an engine restart request has been made in step S29 is discussed. This situation occurs when the engine restart request is made during a period 163 shown in FIG. 13. In this case, the engine stop/restart controller 2a does not proceed to the engine restart control operation but waits at least until the inertial switchback action timing t9 is reached. Then, the engine stop/restart controller 2a judges whether the forward clutch 67 has been completely engaged in step S85. The engine stop/restart controller 2a issues the forward clutch engagement command with such timing that the forward clutch 67 completes engagement during the period between the point in time t8 and the point in time t9 as previously discussed with reference to step S39. Therefore, the judgment result in step S85 is in the affirmative in most cases.

If the judgment result in step S85 is in the affirmative, the engine stop/restart controller 2a issues a 2-4 brake release command in step S95, causing the automatic transmission 50 to initiate the 2-1 shift, and performs inertial switchback action control operation in step S97 for producing the earlier-mentioned inertial switchback action. During the period of the initial engine reversing between the point in time t8 and the point in time t9, the piston 13 in the expansion stroke cylinder 12A moves upward so that the air in the cylinder 12A is compressed. The engine once reversed resumes forward running at the point in time t9. In other words, the piston 13 in the expansion stroke cylinder 12A begins move downward at the point in time t9. At this timing, the engine stop/restart controller 2a causes the fuel injector 16 of the expansion stroke cylinder 12A to inject the fuel and the spark plug 15 of the expansion stroke cylinder 12A to ignite a mixture produced therein. (Alternatively, the fuel injector 16 may be controlled to inject the fuel slightly before the inertial switchback action timing t9 to accelerate evaporation and atomization of the fuel in advance.) Combustion produced in the expansion stroke cylinder 12A as discussed above adds combustion pressure to inertial force of the engine resuming forward running, thus causing the piston 13 in the cylinder 12A to move downward with great force and speed. The engine starting system of the present embodiment can restart the engine with ease and stability in the above-described manner.

The engine starting system of the embodiment can restart the engine more quickly by using the inertial switchback action of the engine at the point in time t9 than by initiating engine restart operation after complete engine stop at the point in time t10.

The inventors have experimentally verified that the period of time from the point in time t3 when the fuel supply is cut off to a point when the 2-1 shift after engine restart is completed is 0.85 second at maximum. This is a sufficiently short period of time from a practical point of view. Considering that the aforementioned inertial switchback action control operation is relatively simple and capable of restarting the engine without executing the earlier-described precharge control operation of the prior art, it is appreciated that the inertial switchback action control operation of the embodiment is extremely workable in practical applications.

In practice, however, there may occur such a case that the forward clutch 67 is not completely engaged before the point in time t9 due to variations in transmission characteristics or other factors. In such a case (No in step S85), the engine stop/restart controller 2a does not forcibly initiate the inertial switchback action control operation but waits until the forward clutch 67 is completely engaged (Yes in step S87). Then, the engine stop/restart controller 2a issues a 2-4 brake release command to release the 2-4 brake 70 in step S89. Subsequently, the engine stop/restart controller 2a waits until the engine completely stops (Yes in step S91) and then the engine stop/restart controller 2a executes the engine restart control operation to be performed after complete engine stop in step S61. The engine starting system of this embodiment can effectively prevent uncomfortable feeling potentially given to a driver as well as damage to the forward clutch 67 which may be caused if the vehicle restarts or accelerates under conditions where the forward clutch 67 is not completely engaged.

While the foregoing discussion has described the engine stop/restart control operation subroutine on the assumption that the automatic transmission 50 is in the first gear when the idle stop conditions are satisfied, the same subroutine is essentially applicable even if the automatic transmission 50 is in the second gear when the idle stop conditions are satisfied. In the second gear, however, the 2-4 brake 70 is already applied, so that the above-described process of applying the 2-4 brake 70 is omitted in a case where the automatic transmission 50 is shifted to the special mode M immediately after the idle stop conditions have been satisfied. Specifically, steps S11, S13 and S15 of FIG. 19 are omitted in the latter case. It is therefore possible to quickly shift the automatic transmission 50 to the special mode M with ease.

In a case where the automatic transmission 50 is in the third gear when the idle stop conditions are satisfied or expected to be satisfied, the automatic transmission 50 is controlled to perform the 3-2 shift which is not made during ordinary deceleration as previously mentioned with reference to the downshift line 101 shown in FIG. 6. This makes it possible to keep the 2-4 brake 70 applied and smoothly shift the automatic transmission 50 to the special mode M by just releasing the forward clutch 67 subsequently.

Second Embodiment

Now, an engine starting system according to a second embodiment of the invention is described. While a power train of the second embodiment has the same configuration as that of the first embodiment (FIG. 3), engine stop/restart control operation of the second embodiment slightly differs. The following discussion focuses on differences in the engine stop/restart control operation between the first and second embodiments.

In the foregoing first embodiment, the vehicle speed-related condition for the 3-2 shift defined as part of the idle stop conditions (automatic engine stop conditions) is that "the vehicle speed equals 19 km/h." In the second embodiment, the vehicle speed-related condition for the 3-2 shift is that "the vehicle speed equals 0 km/h."

According to the second embodiment, the engine stop/restart controller 2a controls the automatic transmission 50 such that the forward clutch 67 completes engagement during a period of initial engine reversing immediately before engine stop and the 2-4 brake 70 is released after the period of the initial engine reversing.

The engine stop/restart control operation of the second embodiment is performed by a procedure described below. The main routine of FIG. 18 described in the first embodiment applies also to the second embodiment except that one of the idle stop conditions is the aforementioned vehicle speed-related condition that "the vehicle speed equals 0 km/h." This means that the automatic transmission 50 is in the first gear when the idle stop conditions are satisfied (Yes in step S6) in this embodiment.

In the second embodiment, the engine stop/restart control operation subroutine performed in step S7 of FIG. 18 is carried out as shown in the flowchart of FIG. 19 (commonly used in the second embodiment) followed by flowcharts of FIGS. 24 and 25, in which steps identical to those shown in FIGS. 20 and 21 are designated by the same symbols and a detailed description of these steps is not provided in the following.

Figure 26:
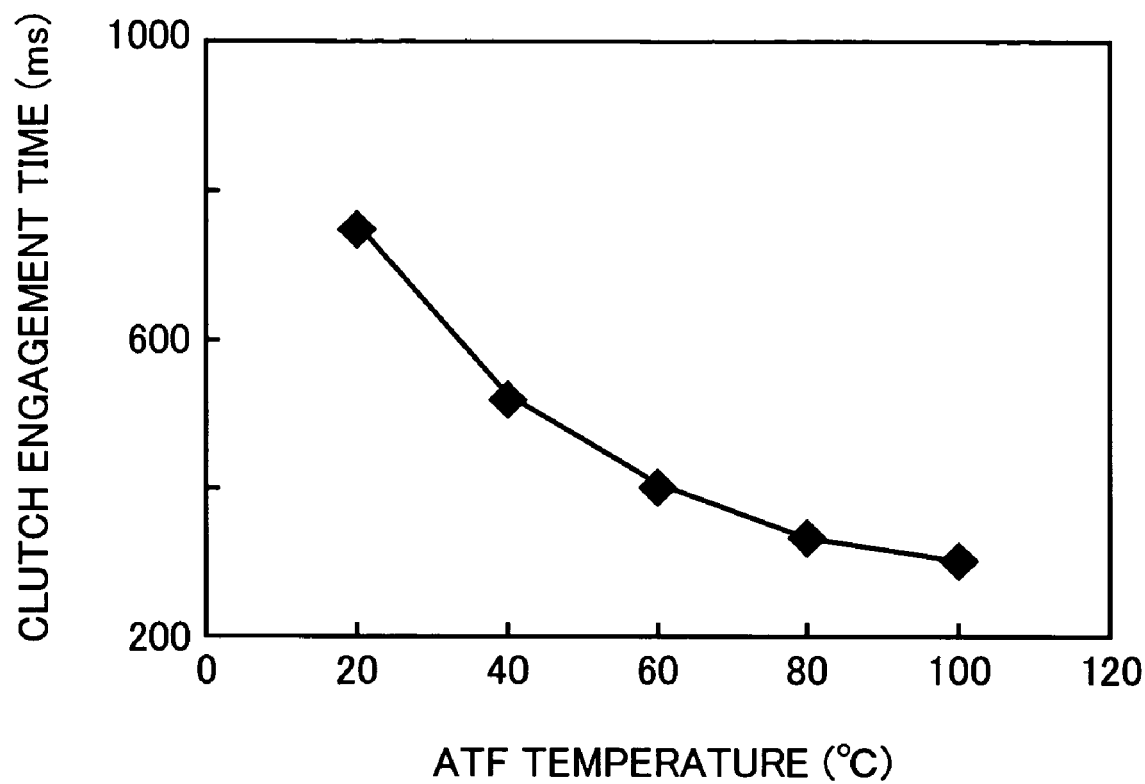
FIG. 26 is a graph showing a relationship between clutch engagement time and automatic transmission fluid (ATF) temperature.

Following step S29 or S31 of FIG. 19, the engine stop/restart controller 2a of the second embodiment determines the N-D shift engine speed N3 according to the ATF temperature detected by the transmission fluid temperature sensor 37 in step S133. The N-D shift engine speed N3 is set to approximately 750 rpm when the ATF temperature is about 80 degrees Centigrade or above, and to an increasingly higher engine speed with a decrease in the ATF temperature when the ATF temperature is lower than 80 degrees Centigrade based on information obtained from a map previously stored in the engine stop/restart controller 2a. The N-D shift engine speed N3 is set in this way to compensate for changes in the clutch engagement time. The clutch engagement time increases as the ATF temperature decreases as shown in FIG. 26. The lower the ATF temperature, the earlier (that is, when the engine speed Ne is higher) the engine stop/restart controller 2a issues a forward clutch engagement command in order to minimize changes in the clutch engagement time.

In succeeding step S134, the engine stop/restart controller 2a judges whether the engine speed Ne has become equal to or lower than the N-D shift engine speed N3 determined in step S133. If the judgment result in step S134 is in the affirmative (point in time t4), the engine stop/restart controller 2a performs the special clutch engagement control operation. Specifically, the engine stop/restart controller 2a issues a forward clutch engagement command to the automatic transmission 50 which is currently in the special mode M in step S135 to engage the forward clutch 67.

When the engine stop/restart controller 2a initiates the special clutch engagement control operation, the forward clutch 67 begins to engage. In carrying out the special clutch engagement control operation, the engine stop/restart controller 2a aims to control the automatic transmission 50 in such a fashion that the forward clutch 67 begins to substantially engage at the point in time t7 (or substantial engagement starting point when the forward clutch 67 begins to transmit engine torque in actuality) set at or after the point in time t6 of the last TDC and to complete engagement during a period of initial engine reversing (or at an engagement ending point) between the point in time t8 and the point in time t9 shown in FIG. 13. The aforementioned information obtained from the map for determining the N-D shift engine speed N3 in step S133 is a set of values which have been experimentally verified as being suitable for achieving the above aim of the special clutch engagement control operation with respect to the engagement starting point and the engagement ending point.

When the forward clutch 67 is engaged by the special clutch engagement control operation, the automatic transmission 50 is shifted from the neutral condition to the drive condition (second gear in the present embodiment). This transmission shifting from the neutral condition to the drive condition differs from the ordinary N-D shift in that the forward clutch 67 is engaged under conditions where the automatic transmission 50 is in the special mode M. As previously mentioned, it possible to reduce the amount of energy absorbed by the forward clutch 67 at clutch engagement, and thus the clutch engagement time, if the forward clutch 67 is engaged when the automatic transmission 50 is in the special mode M. The aforementioned special clutch engagement control operation of the embodiment is therefore advantageous for quick engine restart as well as for reducing the N-D shock, or abrupt torque variations at the N-D shift.

If the substantial engagement starting point of the forward clutch 67 is set at or after the point in time t6 of the last TDC as mentioned above, it is possible to keep the automatic transmission 50 in the neutral condition during a period preceding the point in time t6 when it is particularly desirable to preclude disturbances to the crankshaft 3 in the process of automatic engine stop. This enables more stable execution of the automatic engine stop control operation.

When the forward clutch 67 is engaged by the special clutch engagement control operation of step S135, the automatic transmission 50 is shifted to the second gear as mentioned above. Consequently, the automatic transmission 50 transmits a reverse driving force of the engine to the drive axles 78, 79. Since the vehicle is at rest (the driving wheels do not turn) at this point, however, the reverse driving force of the engine is stored in the form of torsional energy in a drive system (mainly in the drive axles 78, 79 in the front-engine, front-drive vehicle of this embodiment as indicated by arrows 78b and 79b of FIG. 3).

If the 2-4 brake 70 is released at this point, the automatic transmission 50 is shifted to the first gear. Since the one-way clutch 72 is unlocked in the first gear, the reverse driving force of the engine is no longer transmitted to the drive axles 78, 79 and, as a consequence, the torsional energy stored in the drive system is released, thus producing torsional vibration (clutch disengagement shock) due to the twisting back of the drive system. In the present embodiment, however, the 2-4 brake 70 is controlled not to disengage during a period of engine reversing so that the occurrence of the clutch disengagement shock is effectively avoided.

Figure 24:
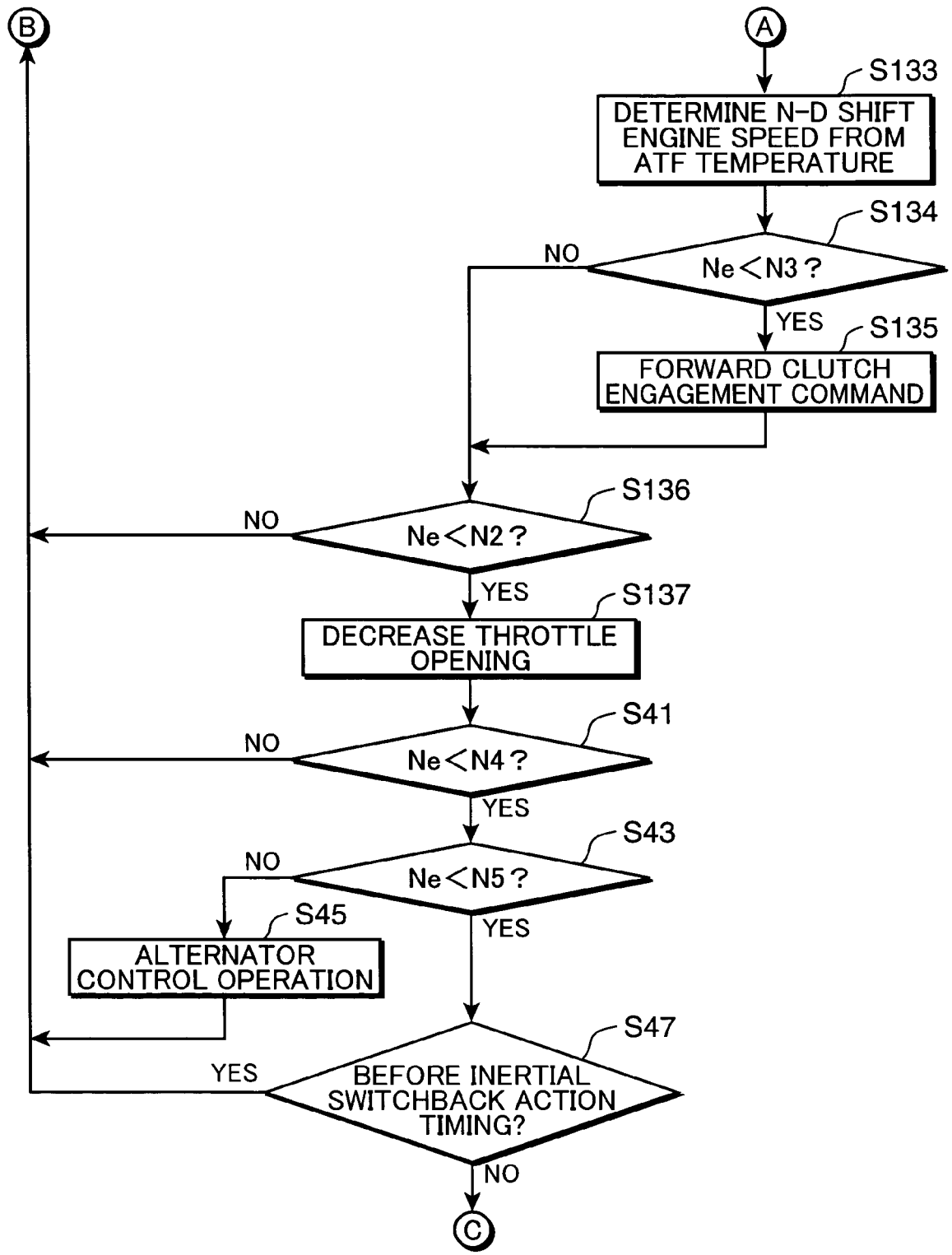
FIG. 24 is a flowchart which follows FIG. 19 showing a second part of the engine stop/restart control operation subroutine performed in the second embodiment (applied also to a third embodiment)

In step S136 of FIG. 20 which follows step S134 or step S135 of FIG. 24, the engine stop/restart controller 2a judges whether the engine speed Ne has dropped to the reference engine speed N2 (preset to approximately 790 rpm). If the engine speed Ne is judged to have dropped to the preset reference engine speed N2 in step S136 (point in time t5), the engine stop/restart controller 2a decreases the opening K of the throttle valve 23 in step S137.

Subsequently, the engine stop/restart controller 2a judges whether the engine speed Ne has dropped to the specific engine speed N4 (Ne<N4) in step S41 and to the specific engine speed N5 (Ne<N5) in step S43. As an example, the specific engine speed N4 and the specific engine speed N5 are set to 650 rpm and 400 rpm (N4=650 rpm, N5=400 rpm), respectively. If N4>Ne>N5 (Yes in step S41 and No in step S43), the engine stop/restart controller 2a executes the earlier-mentioned alternator control operation in step S45. When the engine speed Ne becomes lower than the specific engine speed N5 (Yes in step S43, or Ne<N5), the engine stop/restart controller 2a completes the alternator control operation and proceeds to step S47.

In step S47, the engine stop/restart controller 2a judges whether the engine is still before the timing for producing the aforementioned inertial switchback action (inertial switchback action timing). In this embodiment, the inertial switchback action timing is set at the point in time t9 when the engine completes initial reversing motion immediately before engine stop or at a point immediately preceding the point in time t9.

If it is judged that the engine is before the inertial switchback action timing t9 (Yes in step S47), the engine stop/restart controller 2a returns to step S29 of FIG. 19 and reexecutes steps S29 through step S47. Similarly, if the judgment result in step S136, S41 or S43 is in the negative (the alternator control operation is in progress), the engine stop/restart controller 2a returns to step S29 of FIG. 19 and reexecutes steps S29 through step S47. If the engine restart request is made (Yes in step S29) during this cyclical operation, the engine stop/restart controller 2a sets the inertial switchback action flag F1 to "1" in step S31.

Figure 25:
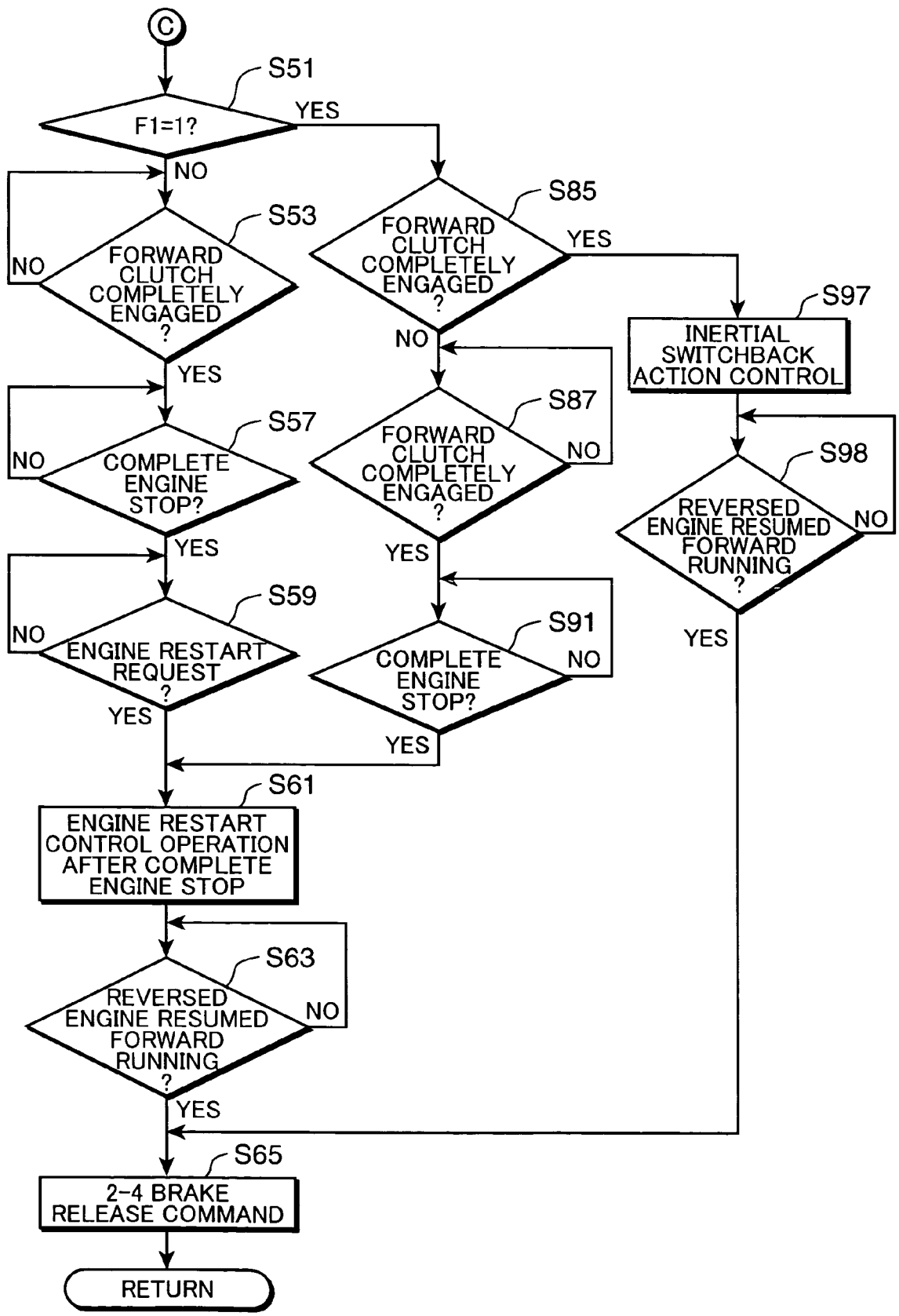
FIG. 25 is a flowchart which follows FIG. 24 showing a third part of the engine stop/restart control operation subroutine performed in the second embodiment.

If the inertial switchback action timing t9 is reached and the judgment result in step S47 is in the negative, the engine stop/restart controller 2a proceeds to step S51 of FIG. 25 and judges whether the inertial switchback action flag F1 is set to "1" or not. If the inertial switchback action flag F1 is not "1" (No in step S51), the engine stop/restart controller 2a does not cause the engine to produce the inertial switchback action because the engine restart request has not been made yet.

In succeeding step S53, the engine stop/restart controller 2a judges whether the forward clutch 67 has been completely engaged. Specifically, the engine stop/restart controller 2a judges that the forward clutch 67 has been completely engaged if the turbine turning speed Nt has a value corresponding to the current vehicle speed and gear shift position. In the present embodiment, the vehicle speed is 0 km/h (at reset) at this point and, thus, the engine stop/restart controller 2a can judge that the forward clutch 67 has been completely engaged when the turbine turning speed Nt becomes 0 rpm.

If it is difficult for the engine stop/restart controller 2a to judge whether the forward clutch 67 has been completely engaged in a way described above, the embodiment may be modified to use a different judgment criterion or method. For example, the engine stop/restart controller 2a may judge that the forward clutch 67 has been completely engaged when a specific period of time (e.g., 0.4 second) has elapsed after the forward clutch release command was issued.

The above method of judging completion of engagement of the forward clutch 67 discussed in step S53 is similarly applied to other steps (steps S73, S85 and S87) which will be described in the following.

If the forward clutch 67 is judged to have been completely engaged (Yes in step S53), the engine stop/restart controller 2a waits until the engine completely stops (Yes in step S57) and then the engine stop/restart controller 2a waits for an engine restart request in step S59. At a point in time when the engine restart request is made (Yes in step S59), the engine stop/restart controller 2a executes the engine restart control operation to be performed after complete engine stop in step S61. The engine restart control operation performed after complete engine stop in step S61 is the same as that of the first embodiment.

While executing the engine restart control operation in step S61, the engine stop/restart controller 2a judges whether the engine once reversed after the beginning of the engine restart control operation has resumed forward running in step S63. If the judgment result in step S63 is in the affirmative (point in time t11 shown in FIG. 13), the engine stop/restart controller 2a issues a 2-4 brake release command to release the 2-4 brake 70 in step S65. The 2-4 brake 70 is thus released while the engine is running in the forward direction, so that the aforementioned clutch disengagement shock can be effectively avoided.

When the 2-4 brake 70 is completely released, the automatic transmission 50 is shifted to the first gear in which only the forward clutch 67 is engaged. Therefore, even if the engine restart request is made by depression of the accelerator pedal requiring the vehicle to start off, it is possible to achieve a quick restating capability.

The foregoing discussion of the second embodiment has dealt with a case where no engine restart request is made until the engine completely stops and the engine is restarted in accordance with an engine restart request made after complete engine stop. The following discussion deals with cases where the engine restart request is made before the engine completely stops.

In a case where it is judged that an engine restart request has been made in step S13 or S19 of FIG. 19, the engine stop/restart controller 2a performs the same operation as already discussed with reference to the first embodiment.

If it is judged that an engine restart request has been made in step S29, the engine stop/restart controller 2a performs steps S31 through S85 in the same way as in the first embodiment. If the judgment result in step S85 is in the affirmative, the engine stop/restart controller 2a performs the aforementioned inertial switchback action control operation in step S97. The engine starting system by using the inertial switchback action of the engine than by initiating engine restart operation after complete engine stop as in the first embodiment.

In subsequent step S98, the engine stop/restart controller 2a judges whether the engine once reversed has resumed forward running as a result of the inertial switchback action control operation. If the judgment result in step S98 is in the affirmative, the engine stop/restart controller 2a issues a 2-4 brake release command to release the 2-4 brake 70 in step S65. The 2-4 brake 70 is thus released while the engine is running in the forward direction, so that the aforementioned clutch disengagement shock can be effectively avoided.

When the 2-4 brake 70 is completely released, the automatic transmission 50 is shifted to the first gear in which only the forward clutch 67 is engaged. Therefore, even if the engine restart request is made by depression of the accelerator pedal requiring the vehicle to start off, it is possible to achieve a quick restating capability.

In practice, however, there may occur such a case that the forward clutch 67 is not completely engaged before the point in time t9 due to variations in transmission characteristics or other factors. In such a case (No in step S85), the engine stop/restart controller 2a does not forcibly initiate the inertial switchback action control operation but waits until the forward clutch 67 is completely engaged (Yes in step S87). Subsequently, the engine stop/restart controller 2a waits until the engine completely stops (Yes in step S91) and then the engine stop/restart controller 2a executes the engine restart control operation to be performed after complete engine stop in step S61. The engine starting system of this embodiment can effectively prevent uncomfortable feeling potentially given to the driver and damage to the forward clutch 67 which can be caused if the vehicle restarts or accelerates under conditions where the forward clutch 67 is not completely engaged.

Third Embodiment

Now, an engine starting system according to a third embodiment of the invention is described. While a power train of the third embodiment has the same configuration as those of the first and second embodiments (FIG. 3), engine stop/restart control operation of the third embodiment slightly differs. The following discussion focuses on differences between the engine stop/restart control operation performed in the third embodiment and that performed in the first and second embodiments.

Figure 27:
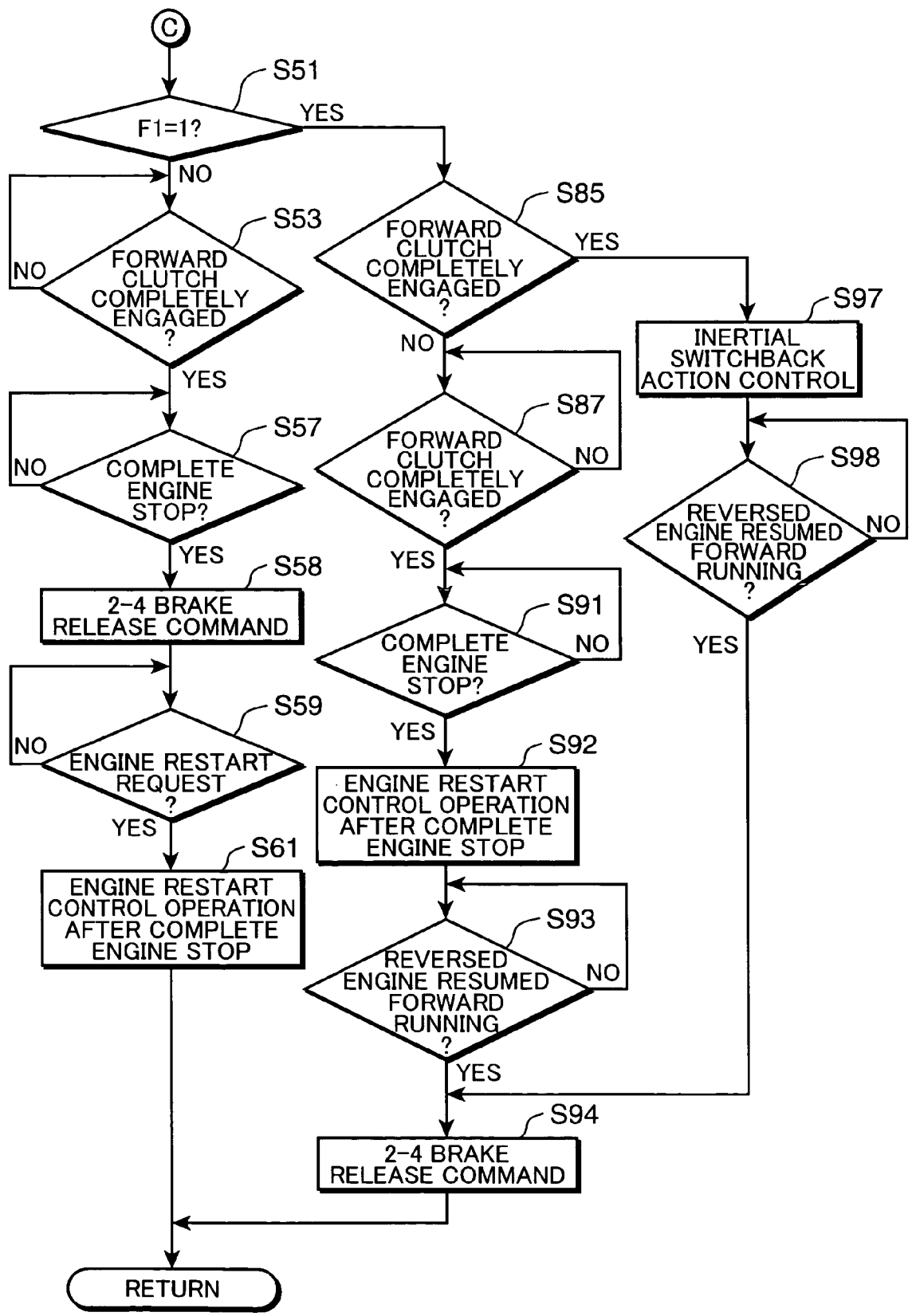
FIG. 27 is a flowchart which follows FIG. 24 showing a third part of the engine stop/restart control operation subroutine performed in the third embodiment.

FIG. 27 is a flowchart showing a third part of an engine stop/restart control operation subroutine used in the third embodiment corresponding to the flowchart of FIG. 25 used in the second embodiment. In the flowchart of FIG. 27, steps identical to those shown in FIG. 25 are designated by the same symbols and a detailed description of these steps is not provided in the following.

A substantial difference of the engine stop/restart control operation subroutine of the third embodiment from that of the second embodiment lies in release timing of the 2-4 brake 70 when the engine stop/restart controller 2a executes the engine restart control operation after complete engine stop (step S61). While the engine stop/restart controller 2a releases the 2-4 brake 70 after the engine once reversed after the beginning of the engine restart control operation has resumed forward running in the second embodiment (steps S63, S65 of FIG. 25), the engine stop/restart controller 2a releases the 2-4 brake 70 after the engine has completely stopped in the third embodiment (steps S57, S58 of FIG. 27).

It is also possible to effectively avoid the aforementioned clutch disengagement shock by releasing the 2-4 brake 70 after the engine has completely stopped as stated above. When the engine is automatically stopped, the engine produces a gradually damped oscillatory motion, alternately turning in the forward and reverse directions after the initial engine reversing. This means that the engine can be reversed twice or more times after the initial engine reversing. (FIGS. 13 and 14 show a case where the engine slightly runs in the reverse direction a second time after the initial engine reversing.) As the 2-4 brake 70 is released upon complete engine stop in this embodiment, it is possible to eliminate the possibility of causing the clutch disengagement shock which may occur if the 2-4 brake 70 is released during the second or later engine reversing.

While the invention has thus far been discussed, by way of example, with reference to the first to third embodiments, various changes and variations may be made to these embodiments without departing from the scope and spirit of the invention. Given below are some specific examples of such variations.

(1) According to the foregoing embodiments, the engine restart control operation performed after complete engine stop causes the engine to be once reversed before turning in the forward direction at engine restart. This engine restart control operation may be modified to restart the engine by just turning in the forward direction (without reversing). It is to be noted however that if the engine is once reversed, the amount of initial combustion energy produced by the expansion stroke cylinder 12A increases, making it possible to restart the engine in a more reliable fashion.

(2) According to the foregoing embodiments, the engine starting system supplies the fuel to the expansion stroke cylinder 12A and the compression stroke cylinder 12C at least after the engine restart conditions have been satisfied. The embodiments may be modified to supply the fuel to these cylinders 12A, 12C before the engine restart conditions are satisfied. For example, the fuel may be supplied on an intake stroke immediately preceding automatic engine stop during execution of the automatic engine stop control operation. This modification serves to accelerate evaporation and atomization of the fuel prior to engine restart, enabling the engine starting system to instantly produce combustion in a proper manner by just igniting a mixture when executing the engine restart operation.

(3) Although the automatic transmission 50 is a four-gear shift type automatic transmission in the foregoing embodiments, the invention is not limited thereto. The invention is also applicable to a three-gear shift type automatic transmission as well as automatic transmissions having five or more gears. In addition, the invention is not limited to the foregoing embodiments with respect to a combination of input elements, fixed elements and output elements of each planetary gear set 65, 66.

(4) Although not incorporated in the foregoing embodiments, the engine starting system may be provided with a starter motor or the like (e.g., an integrated starter generator, or ISG, in which a starter and an alternator are integrated) which will assist when the stop position of the piston 13 in the expansion stroke cylinder 12 is out of the aforementioned appropriate piston stop range R or within the appropriate piston stop range R but close to a boundary thereof, the engine speed Ne does not reach a specific value within a specific period of time after the beginning of the engine restart control operation, or initial combustion after the beginning of the engine restart control operation is produced in the expansion stroke cylinder 12 at engine stop, for example, even if the specific engine restart conditions has been satisfied. Combustion energy produced in the engine helps reduce a load on the starter motor in this case as well. In this modification, however, it is preferable that the fuel injectors 16 inject the fuel on the intake stroke to accelerate evaporation and atomization of the fuel and mixing of the fuel with air in each cylinder 12.

(5) Although the fuel injectors 16 used in the engine of the foregoing embodiments are of a type which injects the fuel directly into the individual cylinders 12, the invention is also applicable engines employing port-injection type fuel injectors.

In summary, an engine starting system for a power train including an engine and an automatic transmission which transmits engine power while performing gear shifting operation in a prescribed manner includes an engine stop/restart controller for performing automatic engine stop control operation for automatically stopping the engine by interrupting fuel supply necessary for continued engine operation when automatic engine stop conditions are satisfied and for automatically restarting the engine by producing combustion at least in a cylinder which is on an expansion stroke at engine stop when engine restart conditions are satisfied after automatic engine stop. The automatic transmission includes a stationary member constituting an integral part of a transmission housing, a planetary gear mechanism including at least a first rotary member and a second rotary member, an input shaft of the planetary gear mechanism, an output shaft of the planetary gear mechanism, a clutch for engaging and disengaging the first rotary member and the input shaft to and from each other, and a brake for engaging and disengaging the second rotary member and the stationary member to and from each other, the automatic transmission having a special mode in which the clutch is disengaged and the brake is applied. The clutch is configured to set the automatic transmission in a drive condition in which the engine power can be transmitted to a driving wheel side when the clutch is engaged and in a neutral condition in which transmission of the engine power to the driving wheel side is interrupted when the clutch is disengaged at least under conditions where the automatic engine stop conditions are satisfied. If the special mode is selected under conditions where the output shaft is locked, the automatic transmission is brought to a condition in which the first rotary member is locked to the stationary member. During execution of the aforementioned automatic engine stop control operation, the engine stop/restart controller performs special clutch engagement control operation in which the automatic transmission is caused to initiate a transfer to the special mode before the fuel supply is interrupted and the clutch is caused to completely engage at a specific point in time at least after the automatic transmission has completed the transfer to the special mode.

The aforementioned engine starting system of the present invention makes it possible to perform the automatic engine stop control operation in a stable fashion by switching the automatic transmission from the drive condition to the neutral condition when automatically stopping the engine, although the control operation is relatively simple and develops almost no worrisome problem related to the reliability of the clutch. Additionally, the engine starting system can switch the automatic transmission to the drive condition as soon as possible even if an engine restart request is entered by depression of the accelerator pedal, for instance, when the automatic transmission is in the neutral condition.

According to the aforementioned configuration of the invention, the engine stop/restart controller causes the automatic transmission to initiate a transfer to the special mode before the fuel supply is interrupted during execution of the aforementioned automatic engine stop control operation. Since the clutch is completely disengaged in the special mode, the automatic transmission is switched to the neutral condition. As the automatic engine stop control operation is performed in the neutral condition, the engine stop/restart controller can carry out the automatic engine stop control operation in a stable fashion. In addition, the engine stop/restart controller causes the automatic transmission to initiate the transfer to the special mode before interruption of the fuel supply as stated above. This enables the engine stop/restart controller to control the automatic transmission such that the automatic transmission is already in the neutral condition when the fuel supply is interrupted by transferring the automatic transmission to the special mode at a point preceding the interruption of the fuel supply at least by a period of time required for disengagement of the clutch and then issuing a clutch release command. Therefore, the engine stop/restart controller can perform the automatic engine stop control operation with higher stability.

Furthermore, as it is not necessary to precharge the clutch in the neutral condition of the automatic transmission, there is almost no worrisome problem concerning the reliability of the clutch. This feature of the invention eliminates the need for a complicated mechanism for ensuring the reliability of the clutch, thus allowing for a relatively simple clutch structure. In addition, this feature obviates the need to conduct experiments for verifying the reliability of the clutch, thus contributing to shortening overall development time.

The aforementioned special clutch engagement control operation for engaging the clutch is carried out when the automatic transmission is in the special mode, in which the first rotary member is locked to the stationary member when the output shaft is locked (with the vehicle stopped). In this condition, the output shaft is regarded as a stationary member. Consequently, the clutch engages the first rotary member with the input shaft (e.g., a turbine shaft), causing the input shaft to stop turning. This means that the clutch serves to absorb rotational energy of an input shaft system which includes the input shaft and elements together turning therewith by converting the rotational energy into thermal energy in the form of frictional heat produced by clutch engagement.

In a generally known mechanism of a conventional automatic transmission, elements of a planetary gear mechanism turn together with an input shaft even when the automatic transmission is in a neutral condition. This means that, even when disengaged, clutches and associated elements transmit a slight amount of power due to a so-called "drag" phenomenon. Although it is possible to significantly decrease the drag by providing a sufficiently large plate-to-plate clearance when each clutch is disengaged, this approach results in an increase in the time required for clutch engagement. It is therefore necessary to decrease the plate-to-plate clearance to a certain extent to ensure quick clutch engagement. For this reason, a certain degree of drag of the clutches and the associated elements is unavoidable, making it inevitable to allow these elements to more or less turn together.

The aforementioned generally known mechanism of the conventional automatic transmission makes an N-D shift by engaging the clutch under conditions where the drag of the transmission elements is occurring. It is therefore necessary to absorb rotational energy of not only the input shaft system by all the elements of the planetary gear mechanism which are turning together with the input shaft.

According to the present invention, however, the first rotary member becomes a stationary member when the output shaft is locked in the special mode and, thus, the first rotary member does not turn together with the input shaft. Accordingly, the clutch of the invention need to absorb the rotational energy of the input shaft system only at engagement, so that the amount of the rotational energy to be absorbed at clutch engagement is small compared to that to be absorbed at the N-D shift in the generally known mechanism of the conventional automatic transmission. Therefore, the automatic transmission of the invention can make the N-D shift in a short time, enabling the engine starting system to quickly switch the automatic transmission to the drive condition even if an engine restart request is entered by depression of the accelerator pedal, for instance, when the automatic transmission is in the neutral condition.

Additionally, the amount of the rotational energy to be absorbed by the clutch is so small that the shock load (N-D shock) caused by abrupt torque variations occurring at the N-D shift can be effectively reduced.

In one feature of the invention, the engine stop/restart controller begins to perform the aforementioned special clutch engagement control operation during a process of automatic engine stop after interruption of the fuel supply in executing the automatic engine stop control operation.

This enables the clutch to complete engagement earlier than by initiating the special clutch engagement control operation after complete engine stop, so that the engine can quickly respond to an engine restart request entered by depression of the accelerator pedal, for instance.

In another feature of the invention, a substantial engagement starting point when the clutch begins to substantially engage is set at a specific point in time after a point in time when a piston in the cylinder which will be on the expansion stroke at engine stop lastly goes beyond top dead center (last TDC) immediately before engine stop during the process of automatic engine stop.

Here, the substantial engagement starting point of the clutch is a point in time when the clutch begins to transmit engine torque in actuality. Generally, the substantial engagement starting point of the clutch is slightly delayed from a point in time when the engine stop/restart controller issues a clutch engagement command. The present invention is not necessarily limited to an arrangement in which the engine stop/restart controller issues the clutch engagement command after the last TDC but includes an arrangement in which the engine stop/restart controller issues the clutch engagement command before the last TDC and the clutch begins to substantially engage after the last TDC.

This feature of the invention makes it possible to achieve a high level of stability in carrying out the automatic engine stop control operation. In the execution of the automatic engine stop control operation, the period of time required for the piston in the cylinder which will be on the expansion stroke at engine stop to go beyond the last TDC after the clutch engagement command is susceptible to an influence particularly from the driving wheel side. According to the present invention, however, the automatic transmission is held in the neutral condition during the aforementioned period of time. This makes it possible to perform the automatic engine stop control operation with a high level of stability without the influence of disturbances from the driving wheel side.

In order to achieve a quick engine response to the engine restart request entered by depression of the accelerator pedal, for instance, on the other hand, it is desirable that the substantial engagement starting point of the clutch occur as early as possible. Thus, the substantial engagement starting point of the clutch should preferably occur as early as possible after the last TDC.

In another feature of the invention, the engine stop/restart controller begins to perform the special clutch engagement control operation at a specific point in time such that an engagement ending point at which the clutch completes engagement as a result of the special clutch engagement control operation occurs at a point in time when engine speed becomes zero for the first time during the process of automatic engine stop.

This feature of the invention makes it possible to reduce the period of time from the point in time when the engine speed becomes zero for the first time (or from the beginning of initial engine reversing) to complete engine stop. During this period of time, the engine produces a gradually damped oscillatory motion alternately running in the forward and reverse directions with individual pistons moving up and down. It is possible to quicken the damping of the oscillatory motion by causing the clutch to complete engagement during this period of time with a proper amount of load applied to the engine.

Preferably, the clutch should complete engagement before the end of the initial engine reversing. This permits the engine to produce a smooth inertial switchback action, which enables the engine to smoothly restart by using inertia produced when the engine once reversed resumes forward running. The engine starting system of the invention can smoothly restart the engine by using the inertial switchback action even before complete engine stop, thus allowing a quicker engine restart.

In another feature of the invention, the engine stop/restart controller releases the brake after the clutch has completed engagement as a result of the special clutch engagement control operation when canceling the special mode upon fulfillment of the engine restart conditions.

This feature of the invention makes it possible to produce the earlier-mentioned effect (i.e., reductions in clutch engagement time and N-D shock) of the special clutch engagement control operation in which the engine stop/restart controller causes the clutch to completely engage in the special mode even when the special mode is being canceled upon fulfillment of the engine restart conditions. In addition, it becomes possible to ensure smooth engine restart (quick vehicle restarting and acceleration) under normal operating conditions (typically in first gear) by canceling the special mode.

In another feature of the invention, the engine stop/restart controller causes the brake to begin engagement before interruption of the fuel supply when transferring the automatic transmission to the special mode.

This allows for an early transfer of the automatic transmission to the special mode.

In another feature of the invention, the power train is mounted on a vehicle, and the automatic transmission is a multi-gear transmission having at least first gear, second gear and third gear, the automatic transmission being configured to apply the brake when in the second gear under normal running conditions of the vehicle and to directly shift from the third gear to the first gear at a specific vehicle speed during deceleration under the normal running conditions of the vehicle, wherein the engine stop/restart controller causes the automatic transmission to shift from the third gear to the second gear if the automatic engine stop conditions are at least expected to be satisfied when the vehicle is in ordinary deceleration, running at a speed not exceeding a specific vehicle speed, with the automatic transmission set in the third gear, and the engine stop/restart controller causes the automatic transmission to shift to the special mode after the automatic engine stop conditions have been satisfied.

This feature of the invention makes it possible to smoothly shift the automatic transmission to the special mode with ease by using engagement of the clutch in the second gear. This is because it is only necessary to keep the brake applied when shifting the automatic transmission to the special mode through the second gear.

In another feature of the invention, the automatic engine stop conditions include at least that the output shaft is not turning, wherein the engine stop/restart controller causes the automatic transmission to shift to the special mode during execution of the automatic engine stop control operation, the engine stop/restart controller performs the special clutch engagement control operation such that the clutch completes engagement while the automatic transmission is in the special mode and the engine is making an initial reversing motion immediately before engine stop, and the engine stop/restart controller releases the brake after the engine has completed initial reversing motion.

According to this feature of the invention, the clutch completes engagement at an optimum point in time when the engine is making the initial reversing motion under conditions where the output shaft is not turning after the automatic engine stop conditions have been satisfied. Consequently, the automatic transmission is kept in the neutral condition during most of a period preceding the beginning of the initial engine reversing, making it possible to perform the automatic engine stop control operation in a stable fashion. Since the clutch is already engaged when the engine resumes forward running upon completion of the initial engine reversing, it is possible to cause the engine to produce a smooth inertial switchback action when an engine restart request is made.

Even if the engine restart request is made by depression of the accelerator pedal requiring the vehicle to start off, for instance, it is possible to prevent an uncomfortable feeling potentially given to a driver as well as damage to the clutch which may be caused if the vehicle restarts under conditions where the clutch is not completely engaged.

In the above connection, attention should be paid to the fact that if the clutch is caused to complete engagement while the engine is making the initial reversing motion, the reversing motion of the engine is stored in the form of torsional energy in a drive system including a drive shaft. If the brake is released while the engine is running the reverse direction, the accumulated torsional energy is released, thus producing torsional vibration (clutch disengagement shock) due to the twisting back of the drive system.

According to the present invention, however, the clutch is disengaged after the engine has completed the initial reversing motion, so that the accumulated torsional energy is not released, making it possible to effectively prevent the occurrence of the clutch disengagement shock.

In the engine starting system in which the automatic engine stop conditions include at least that the output shaft is not turning, the engine stop/restart controller may release the brake at a point in time when the engine begins to run in a forward direction upon completion of the initial reversing motion.

In the engine starting system thus configured, the engine stop/restart controller releases the brake at the point in time when the engine begins to run in the forward direction upon completion of the initial reversing motion, that is, the earliest possible timing after the initial engine reversing. Thus, in a case where it is desirable that the brake be released at engine restart, the engine starting system can bring the engine to this kind of desirable condition as soon as possible.

The aforementioned case where it is desirable that the brake be released at engine restart refers to such a case that the automatic transmission is configured to be shifted to the second gear when the brake is applied and to the first gear when the brake is released and the engine restart request is made by depression of the accelerator pedal requiring the vehicle to start off, for example. It is to be noted, however, that the invention is not limited to such a case.

In the engine starting system in which the automatic engine stop conditions include at least that the output shaft is not turning, the engine stop/restart controller may release the brake when a specific period of time has elapsed from a point in time when the engine begins to run in a forward direction upon completion of the initial reversing motion in a case where the engine restart conditions have not been satisfied yet.

This configuration makes it possible to prevent the aforementioned clutch disengagement shock in a more reliable fashion. There arises no undesirable effect even if the brake is released with a slight delay when the engine restart conditions have not been satisfied, that is, when no engine restart request has been made. It becomes possible to decrease the possibility of causing the clutch disengagement shock by retarding brake release timing within a range in which no undesirable effect would occur.

It is to be noted in the above connection, however, that the reversing of the engine can occur not only when the engine is stopped. For example, the engine may be temporarily reversed even after restarting if the engine starting system restarts the engine in the same way as the earlier-mentioned conventional engine starting system shown in Japanese Unexamined Patent Publication No. 2004-124754. From this point of view, the aforementioned specific period of time after which the engine stop/restart controller releases the brake may be a period of time from the beginning of engine restart operation to the point in time when the engine begins to run in the forward direction.

If the brake release timing is set within the period of time from the beginning of the engine restart operation to the point in time when the engine begins to run in the forward direction as stated above, it is possible to preclude the possibility of the clutch disengagement shock occurring even during engine reversing after the beginning of the engine restart operation.

When the engine is automatically stopped, the engine produces a gradually damped oscillatory motion, alternately turning in the forward and reverse directions after the initial engine reversing. This means that the engine can be reversed twice or more times after the initial engine reversing. From this point of view, the aforementioned specific period of time after which the engine stop/restart controller releases the brake may be a period of time from the point in time when the engine begins to run in the forward direction upon completion of the initial reversing motion to a point in time when the engine completely stops.

If the brake release timing is retarded to the point in time when the engine completely stops as stated above, it is possible to preclude the possibility of the clutch disengagement shock occurring even during second and later engine reversing.

In the engine starting system in which the automatic engine stop conditions include at least that the output shaft is not turning, the engine stop/restart controller may adjust a timing at which the engine stop/restart controller issues a control command to at least the clutch or the brake.

With this arrangement, the engine starting system can control engagement and disengagement timings of the clutch and the brake with higher accuracy. Generally, clutches and brakes of the automatic transmission uses a hydraulic piston actuated by charging and discharging an automatic transmission fluid (ATF). There is always a delay time from the timing at which the engine stop/restart controller issues an engagement or disengagement control command to a point in time when the clutch or the brake completes engagement or disengagement, the delay time corresponding to the time required for fully charging or discharging the ATF. Accordingly, the engine stop/restart controller must issue the control command taking this delay time into account.

Generally, the higher the viscosity of the ATF, the larger the delay time of engagement and disengagement timings of the clutch and the brake. Also, the viscosity of the ATF greatly varies with variations in ATF temperature, that is, the lower the ATF temperature, the higher the viscosity of the ATF. It follows that the lower the ATF temperature, the larger the delay time. The engine starting system of the present invention is configured to control the engagement and disengagement timings of the clutch and the brake the with higher accuracy by adjusting the timing at which the engine stop/restart controller issues the control command to either of the clutch and the brake. Normally, the lower the ATF temperature, the earlier the engine stop/restart controller issues the control command.

This application is based on Japanese Patent Application Serial Nos. 2005-289257 and 2005-289316, filed with Japan Patent Office, both on Sep. 30, 2005, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An engine starting system for a power train including an engine and an automatic transmission which transmits engine power while performing gear shifting operation in a prescribed manner, said engine starting system comprising:

an engine stop/restart controller for performing automatic engine stop control operation for automatically stopping the engine by interrupting fuel supply necessary for continued engine operation when automatic engine stop conditions are satisfied and for automatically restarting the engine by producing combustion at least in a cylinder which is on an expansion stroke at engine stop when engine restart conditions are satisfied after automatic engine stop, wherein said automatic transmission includes a stationary member constituting an integral part of a transmission housing;

a planetary gear mechanism including at least a first rotary member and a second rotary member;

an input shaft of the planetary gear mechanism;

an output shaft of the planetary gear mechanism;

a clutch for engaging and disengaging the first rotary member and the input shaft to and from each other; and a brake for engaging and disengaging the second rotary member and the stationary member to and from each other;

said automatic transmission having a special mode in which the clutch is disengaged and the brake is applied;

wherein the clutch is configured to set said automatic transmission in a drive condition in which the engine power can be transmitted to a driving wheel side when the clutch is engaged and in a neutral condition in which transmission of the engine power to the driving wheel side is interrupted when the clutch is disengaged at least under conditions where the automatic engine stop conditions are satisfied;

wherein if the special mode is selected under conditions where the output shaft is locked, said automatic transmission is brought to a condition in which the first rotary member is locked to the stationary member; and wherein said engine stop/restart controller performs special clutch engagement control operation in which said automatic transmission is caused to initiate a transfer to the special mode before the fuel supply is interrupted and the clutch is caused to completely engage at a specific point in time at least after said automatic transmission has completed the transfer to the special mode during execution of the automatic engine stop control operation.

2. The engine starting system according to claim 1, wherein said engine stop/restart controller begins to perform the special clutch engagement control operation during a process of automatic engine stop after interruption of the fuel supply in executing the automatic engine stop control operation.

3. The engine starting system according to claim 2, wherein a substantial engagement starting point when the clutch begins to substantially engage is set at a specific point in time after a point in time when a piston in the cylinder which will be on the expansion stroke at engine stop lastly goes beyond top dead center immediately before engine stop during the process of automatic engine stop.

4. The engine starting system according to claim 1, wherein said engine stop/restart controller begins to perform the special clutch engagement control operation at a specific point in time such that an engagement ending point at which the clutch completes engagement as a result of the special clutch engagement control operation occurs at a point in time when engine speed becomes zero for the first time during the process of automatic engine stop.

5. The engine starting system according to claim 1, wherein said engine stop/restart controller releases the brake after the clutch has completed engagement as a result of the special clutch engagement control operation when canceling the special mode upon fulfillment of the engine restart conditions.

6. The engine starting system according to claim 1, wherein said engine stop/restart controller causes the brake to begin engagement before interruption of the fuel supply when transferring said automatic transmission to the special mode.

7. The engine starting system according to claim 1, wherein the power train is mounted on a vehicle, said automatic transmission is a multi-gear transmission having at least first gear, second gear and third gear, said automatic transmission being configured to apply the brake when in the second gear under normal running conditions of the vehicle and to directly shift from the third gear to the first gear at a first specific vehicle speed during deceleration under the normal running conditions of the vehicle, and wherein said engine stop/restart controller causes said automatic transmission to shift from the third gear to the second gear if the automatic engine stop conditions are at least expected to be satisfied when the vehicle is in ordinary deceleration, running at a speed not exceeding a second specific vehicle speed, with said automatic transmission set in the third gear, and said engine stop/restart controller causes said automatic transmission to shift to the special mode after the automatic engine stop conditions have been satisfied.

8. The engine starting system according to claim 1, wherein the automatic engine stop conditions include at least that the output shaft is not turning, and wherein said engine stop/restart controller causes said automatic transmission to shift to the special mode during execution of the automatic engine stop control operation, said engine stop/restart controller performs the special clutch engagement control operation such that the clutch completes engagement while said automatic transmission is in the special mode and the engine is making an initial reversing motion immediately before engine stop, and said engine stop/restart controller releases the brake after the engine has completed initial reversing motion.

9. The engine starting system according to claim 8, wherein said engine stop/restart controller releases the brake at a point in time when the engine begins to run in a forward direction upon completion of the initial reversing motion.

10. The engine starting system according to claim 8, wherein said engine stop/restart controller releases the brake when a specific period of time has elapsed from a point in time when the engine begins to-run in a forward direction upon completion of the initial reversing motion in a case where the engine restart conditions have not been satisfied yet.

11. The engine starting system according to claim 10, wherein said specific period of time is a period of time from the beginning of engine restart operation to the point in time when the engine begins to run in the forward direction.

12. The engine starting system according to claim 10, wherein said specific period of time is a period of time from the point in time when the engine begins to run in the forward direction upon completion of the initial reversing motion to a point in time when the engine completely stops.

13. The engine starting system according to claim 8, wherein said engine stop/restart controller adjusts a timing at which said engine stop/restart controller issues a control command to at least one of the clutch and the brake.

* * * * *